(12) United States Patent
Tsuboi et al.

(10) Patent No.: US 6,458,878 B1
(45) Date of Patent: Oct. 1, 2002

(54) SILYL (METH) ACRYLATE COPOLYMERS, PROCESSES FOR PREPARING THE SAME, ANTIFOULING PAINT COMPOSITIONS CONTAINING THE SILYL (METH) ACRYLATE COPOLYMERS, ANTIFOULING COATING FILMS FORMED FROM THE ANTIFOULING PAINT COMPOSITIONS, ANTIFOULING METHODS USING THE ANTIFOULING PAINT COMPOSITIONS, AND HULLS OR UNDERWATER STRUCTURES COATED WITH THE ANTIFOULING COATING FILMS

(75) Inventors: Makoto Tsuboi; Eiichi Yoshikawa; Hidetaka Arimura; Fumio Hamazu; Naoya Nakamura; Yasuto Hikiji; Masaaki Oya; Satoshi Hiyoshi; Yukio Kozono, all of Ohtake (JP)

(73) Assignee: Chuogoku Marine Paints, Ltd., Hiroshima (JP)

( * ) Notice: Subject to any disclaimer, the term of this patent is extended or adjusted under 35 U.S.C. 154(b) by 0 days.

(21) Appl. No.: 09/472,229

(22) Filed: Dec. 27, 1999

(30) Foreign Application Priority Data

| Dec. 28, 1998 | (JP) | 10-374875 |
| Dec. 28, 1998 | (JP) | 10-374876 |
| Jan. 11, 1999 | (JP) | 11-004372 |
| May 13, 1999 | (JP) | 11-133184 |
| May 13, 1999 | (JP) | 11-133307 |

(51) Int. Cl.⁷ .................. C08K 3/18; C08K 3/22; C08F 30/08
(52) U.S. Cl. ............ 524/432; 523/122; 526/279
(58) Field of Search ............ 523/122; 524/432; 526/279

(56) References Cited

U.S. PATENT DOCUMENTS

| 4,593,055 A | 6/1986 | Gitlitz et al. |
| 4,594,365 A | 6/1986 | Russell et al. |
| 4,687,792 A | 8/1987 | Russell et al. |
| 4,898,895 A | 2/1990 | Masuoka et al. |
| 4,957,989 A | 9/1990 | Saito |
| 5,116,611 A | 5/1992 | Masuoka et al. |
| 5,436,284 A | 7/1995 | Honda et al. |
| 5,514,731 A | 5/1996 | Nakai |
| 5,795,374 A | 8/1998 | Itoh et al. |

FOREIGN PATENT DOCUMENTS

| EP | 0364272 | 4/1990 |
| EP | 0550998 | 7/1993 |
| EP | 0608132 | 7/1994 |
| EP | 0646630 | 4/1995 |
| EP | 0651034 | 5/1995 |
| EP | 0714957 | 6/1996 |
| EP | 0775733 | 5/1997 |
| EP | 0802243 | 10/1997 |
| GB | 2192400 | 1/1988 |
| JP | 5032433 B | 8/1984 |
| JP | 63057675 | 3/1988 |
| JP | 63215780 | 9/1988 |
| JP | 63314219 | 12/1988 |
| JP | 1146808 | 6/1989 |
| JP | 2196869 | 4/1990 |
| JP | 4264168 | 9/1992 |
| JP | 4264169 | 9/1992 |
| JP | 4264170 | 9/1992 |
| JP | 06157940 | 6/1994 |
| JP | 06157941 | 6/1994 |
| JP | 07018216 | 1/1995 |
| JP | 07102193 | 4/1995 |
| JP | 08199095 | 8/1996 |
| JP | 08269388 | 10/1996 |
| JP | 08269389 | 10/1996 |
| JP | 08269390 | 10/1996 |
| JP | 08277372 | 10/1996 |
| JP | 09048947 | 2/1997 |
| JP | 09048948 | 2/1997 |
| JP | 09048949 | 2/1997 |
| JP | 09048950 | 2/1997 |
| JP | 09048951 | 2/1997 |
| JP | 10030071 | 2/1998 |
| JP | 10168350 | 6/1998 |
| WO | WO09114743 | 10/1991 |

OTHER PUBLICATIONS

Patent Abstracts of Japan, vol. 1995, No. 09, Oct. 31, 1995 of JP 07 150076 A, Jun. 13, 1995.

*Primary Examiner*—Kriellion A. Sanders

(57) ABSTRACT

Disclosed is a silyl (meth)acrylate copolymer which comprises 20 to 80% by weight of (a) silyl (meth)acrylate constituent units (I), 0.01 to 40% by weight of (b) acrylic unsaturated monomer constituent units (II) and 5 to 79.9% by weight of ⓒ unsaturated monomer constituent units other than the constituent units (a) and (b). Also disclosed is a process for preparing the silyl (meth)acrylate copolymer, an antifouling paint composition comprising the copolymer, a coating film formed from the paint composition, a hull with the coating film and an antifouling method using the paint composition.

30 Claims, 35 Drawing Sheets

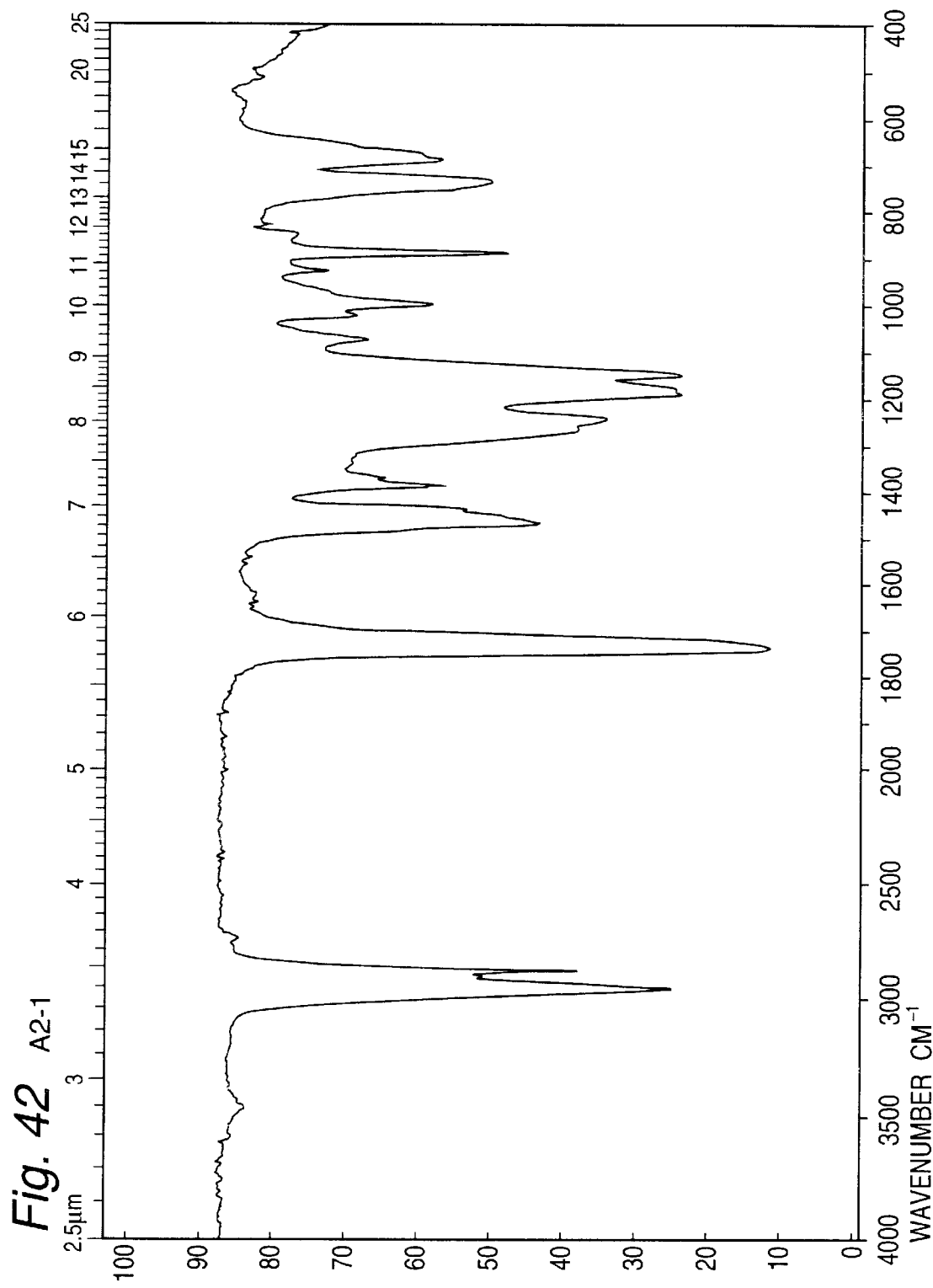
Fig. 42 A2-1

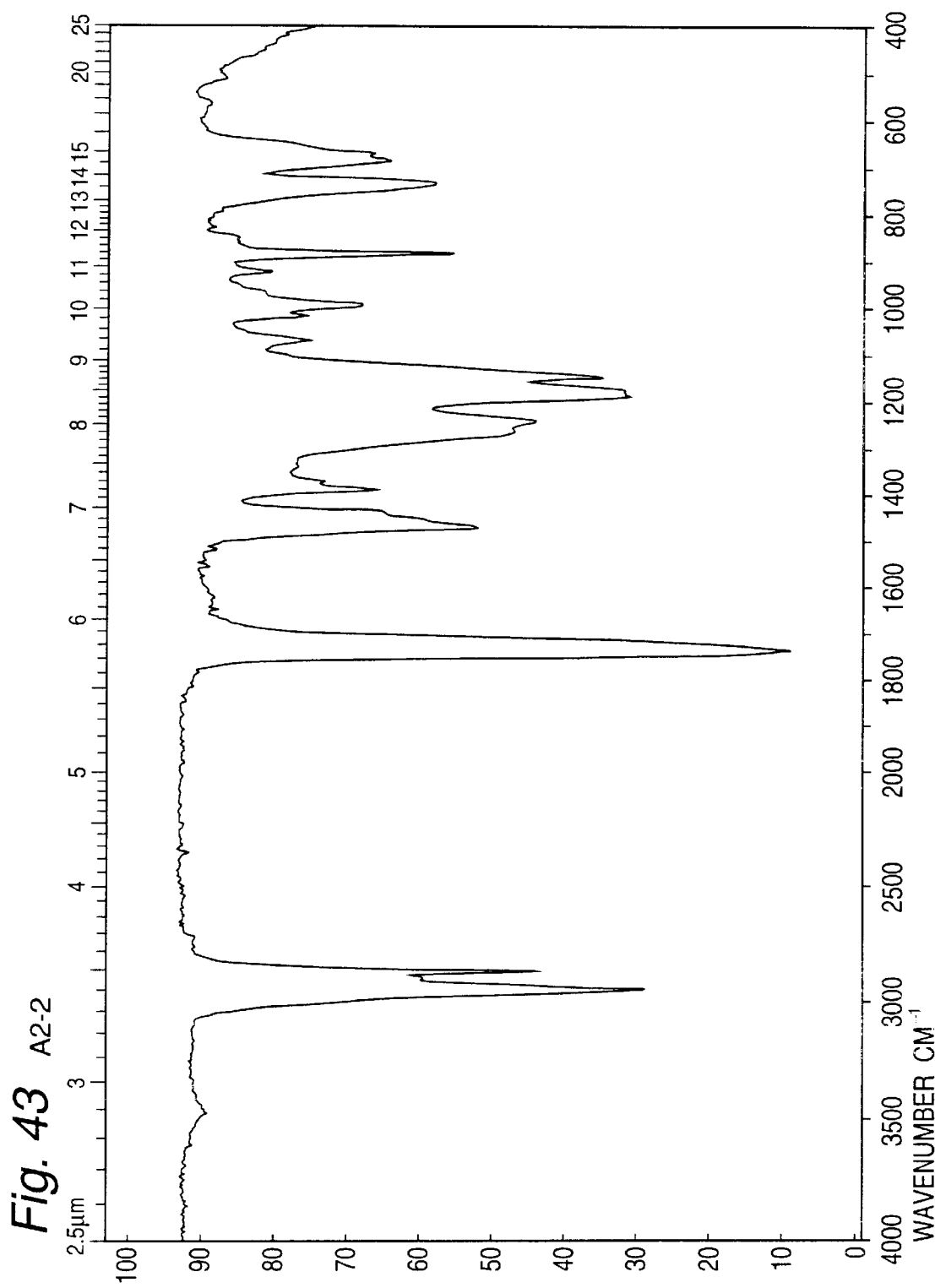
Fig. 43 A2-2

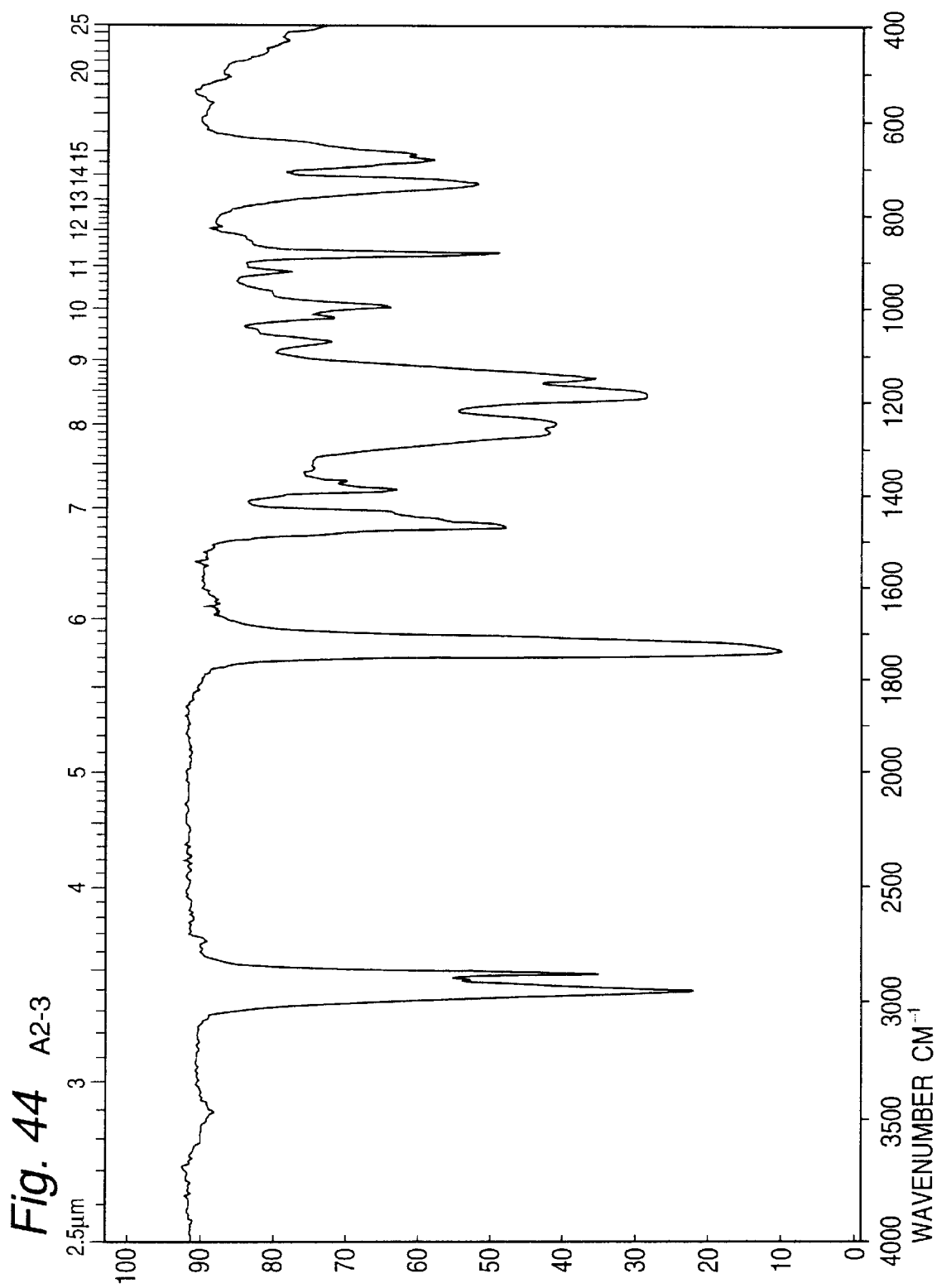
Fig. 44 A2-3

SILYL (METH) ACRYLATE COPOLYMERS, PROCESSES FOR PREPARING THE SAME, ANTIFOULING PAINT COMPOSITIONS CONTAINING THE SILYL (METH) ACRYLATE COPOLYMERS, ANTIFOULING COATING FILMS FORMED FROM THE ANTIFOULING PAINT COMPOSITIONS, ANTIFOULING METHODS USING THE ANTIFOULING PAINT COMPOSITIONS, AND HULLS OR UNDERWATER STRUCTURES COATED WITH THE ANTIFOULING COATING FILMS

TECHNICAL FIELD

The present invention relates to silyl (meth)acrylate copolymers, processes for preparing the same, antifouling paint compositions containing the silyl (meth)acrylate copolymers, antifouling coating films formed from the antifouling paint compositions, antifouling methods using the antifouling paint compositions, and hulls or underwater structures coated with the coating films.

More particularly, the invention relates to silyl (meth) acrylate copolymers which can produce antifouling paints capable of forming antifouling coating films which hardly suffer from occurrence of cracks, have excellent adhesive strength and thereby hardly suffer from peeling, can be favorably controlled in the hydrolysis rate, and are excellent in antifouling performance (antifouling activities), antifouling properties, particularly antifouling properties in a highly fouling environment, and long-term antifouling properties. The invention also relates to processes for preparing such copolymers, antifouling paint compositions capable of forming antifouling coating films having the above properties, antifouling coating films formed from the antifouling paint compositions, antifouling methods using the antifouling paint compositions, and hulls or underwater structures coated with the coating films.

BACKGROUND ART

Ships' bottoms, underwater structures, fishing nets, etc. sometimes have bad appearances and lose their functions, when they are exposed to water for a long time and various aquatic organisms, for example, animals such as oysters, hard-shell mussels and barnacles, plants such as laver, and aquatic bacteria adhere and propagate thereon.

Especially when such aquatic organisms adhere and propagate on a ship's bottom, the surface roughness of the whole ship may be increased to induce decrease of velocity of the ship or increase of fuel consumption. Further, removal of such aquatic organisms from the ship's bottom needs much labor and a long period of working time. In addition, if bacteria adhere and propagate on an underwater structure and slime (sludge-like substance) further adheres thereto to bring about decomposition of the bacteria, or if large-sized organisms adhere and propagate on an underwater structure such as a steel structure to damage anticorrosive coating films of the underwater structure, the strength or the function of the underwater structure may be lowered to thereby extremely shorten the lifetime of the underwater structure.

In order to prevent such problems, ships' bottoms have been hitherto coated with antifouling paints of excellent antifouling properties, for example, a paint containing a copolymer of tributyltin methacrylate and methyl methacrylate or the like and cuprous oxide ($Cu_2O$). The copolymer contained in this antifouling paint is hydrolyzed in seawater to release an organotin compound such as bistributyltin oxide (tributyltin ether, $Bu_3Sn$—O—$SnBu_3$ (Bu: butyl group)) or tributyltin halide ($BU_3SnX$ (X: halogen atom)) and exerts an antifouling effect, and besides the hydrolyzed copolymer itself becomes water-soluble and is dissolved in seawater. That is, this antifouling paint is a "hydrolyzable self-polishing paint", so that no resin residue remains on the coated surface of the ship's bottom, and the surface can be always kept active.

Such organotin compounds, however, are strongly toxic, and there are fears of marine pollution, occurrence of malformed fish or malformed shellfish and evil influences on the biosystem due to the food chain. For this reason, development of tin-free antifouling paints substitutable for the conventional paints has been desired.

The tin-free antifouling paints are, for example, silyl ester antifouling paints described in (1) Japanese Japanese Patent Laid-Open Publication No. 264169/1992 and (3) Japanese Patent Laid-Open Publication No. 264168/1992. These antifouling paints, however, have problems of poor antifouling properties and occurrence of cracking or peeling, as taught by (4) Japanese Patent Laid-Open Publication No. 157941/1994 and (5) Japanese Patent Laid-Open Publication No. 157940/1994.

In (6) Japanese Patent Laid-Open Publication No. 196869/1990, an antifouling paint containing a chemically modified acid functional copolymer (A), which is obtained by copolymerizing trimethylsilyl methacrylate, ethyl methacrylate and methoxyethyl acrylate in the presence of an azo polymerization initiator and contains a carboxylic acid group blocked by a trimethylsilyl group, and a compound (B) of a polyvalent cation is taught. This antifouling paint, however, has a problem that a coating film obtained from the antifouling paint is not satisfactory in the crack resistance.

In (7) National Publication No. 500452/1985 of International Patent Application and Japanese Patent Laid-Open Publication No. 215780/1988, a resin for an antifouling paint, which is obtained by copolymerizing a vinyl monomer having an organosilyl group such as a trialkylsilyl ester of (meth)acrylic acid with another vinyl monomer and has a number-average molecular weight of 3,000 to 40,000, is described. It is also described that an organic water binder such as trimethyl orthoformate, an antifouling agent such as cuprous oxide and a pigment such as red iron oxide can be further added. This resin for an antifouling paint, however, has problems that the resin is liable to be gelatinized when stored and a coating film formed from the antifouling paint has poor crack resistance and peel resistance, as described in (5) Japanese Patent Laid-Open Publication No. 157940/1994.

In Japanese Patent Publication No. 32433/1993 corresponding to the above-mentioned publication (7) (National Publication No. 500452/1985 of International Patent Application), an antifouling paint comprising (a) a toxic substance and (b) a polymer binder which has a recurring unit represented by the formula (—$CH_2$—CXCOOR)—(B)— (X is H or $CH_3$, R is $SiR'_3$ or $Si(OR')_3$, R' is an alkyl group or the like, and B is a residual group of an ethylenically unsaturated monomer) and has a specific hydrolysis rate is disclosed. It is also described that a solvent, a water-sensitive pigment component, an inert pigment, a filler and a retarder can be further introduced. The coating film obtained from the antifouling paint described in this publication, however, has a problem of poor crack resistance.

In (8) Japanese Patent Laid-Open Publication No. 18216/1995, there is disclosed a paint composition which contains, as its major components, (A) a polymer of an organosilicon-containing monomer A having an organosilicon triester group represented by the formula (I) —COO—SiR$^1$R$^2$R$^3$ (R$^1$ to R$^3$ are each an alkyl group of 1 to 18 carbon atoms or the like) in a molecule and (B) copper or a copper compound and further contains, as an essential component other than the components (A) and (B), an alkoxy group-containing silicon compound represented by the following formula (C):

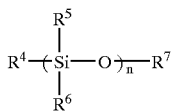

wherein R$^4$ to R$^6$ are each a hydrogen atom, an alkoxy group of 1 to 18 carbon atoms, a cycloalkoxy group or the like, R$^7$ is an alkyl group of 1 to 18 carbon atoms or the like, and n is an integer of 1 to 3.

In the above publication, it is also described that a copolymer AB of the monomer A having a group represented by the formula (I) and a vinyl monomer B copolymerizable with the monomer A may be contained. Further, (meth)acrylic esters such as methyl (meth)acrylate, ethyl (meth)acrylate and dimethylaminoethyl (meth)acrylate are given as examples of the monomer B.

The coating film obtained from the paint composition described in the above publication, however, has a problem that a coating film obtained from the paint composition is poor in the crack resistance and the antifouling properties, particularly antifouling properties in a highly fouling environment. The term "highly fouling environment" indicates, for example, a sea area rich in nutritive such as inland sea or a state where a ship or structure is allowed to stand in such a sea area or a ship frequently repeats running and stopping or runs at a low rate, e.g., about 10 knots or lower.

In (9) Japanese Patent Laid-Open Publication No. 102193/1995, there is disclosed a paint composition containing, as its essential components, a copolymer of a monomer mixture consisting of a monomer A represented by the formula X—SiR$^1$R$^2$R$^3$ (R$^1$ to R$^3$ are each a group selected from an alkyl group and an aryl group and may be the same or different, and X is an acryloyloxy group, a methacryloyloxy group, a malenoyloxy group or a fumaroyloxy group) and a monomer B represented by the formula Y—(CH$_2$CH$_2$O)$_n$—R$^4$ (R$^4$ is an alkyl group or an aryl group, Y is an acryloyloxy group or a methacryloyloxy group, and n is an integer of 1 to 25), and an antifouling agent. Further, inorganic compounds such as copper compounds (specifically, cuprous oxide and copper powder), zinc sulfate and zinc oxide, and metal-containing organic compounds such as organocopper compounds (specifically, oxine copper), organonickel compounds and organozinc compounds (specifically, zinc pyrithione) are given as examples of the antifouling agents. In this publication, however, neither an organosilyl ester group-containing polymer using 2-hydroxyethyl acrylate or the like nor an organosilyl ester group-containing polymer having both of a straight-chain alkyl group-containing silyl (meth)acrylate constituent unit and a branched alkyl group-containing silyl (meth)acrylate constituent unit is mentioned. In addition, the paint described in this publication is poor in the antifouling properties or the antifouling properties in a highly fouling environment.

In (10) Japanese Patent Laid-Open Publication No. 199095/1996, there is disclosed a paint composition containing, as its essential components, a copolymer of a monomer mixture consisting of the same monomer A represented by the formula (1) X—SiR$^1$R$^2$R$^3$ as described in the above publication No. 102193/1995, a monomer B represented by the formula (2) Y—(CH(R$^4$))—(OR$^5$) (R$^4$ is an alkyl group, R$^5$ is an alkyl group or a cycloalkyl group, and Y is an acryloyloxy group, a methacryloyloxy group, a maleinoyloxy group or a fumaroyloxy group), and if necessary, a vinyl monomer C copolymerizable with the monomers A and B, and an antifouling agent. Further, acrylic esters, methacrylic esters, styrene and vinyl acetate are described as examples of the vinyl monomers C; and inorganic compounds such as copper compounds (specifically, cuprous oxide and copper powder), zinc sulfate and zinc oxide, and metal-containing organic compounds such as organocopper compounds (specifically, oxine copper), organonickel compounds and organozinc compounds (specifically, zinc pyrithione) are given as examples of the antifouling agents.

In (11) Japanese Patent Laid-Open Publication No. 269388/1996, there is disclosed a paint composition containing, as its essential components, a copolymer of a monomer mixture consisting of a monomer A represented by the formula (1) X—SiR$^1$R$^2$R$^3$ (R$^1$ to R$^3$ are each a hydrocarbon group of 1 to 20 carbon atoms and may be the same or different, and X is an acryloyloxy group, a methacryloyloxy group, a malenoyloxy group, a fumaroyloxy group or an itaconoyloxy group) and a monomer B represented by the formula (2) Y—(CH$_2$CH$_2$O)$_n$—R$^4$ (R$^4$ is an alkyl group or an aryl group, Y is an acryloyloxy group, a methacryloyloxy group, a maleinoyloxy group, a fumaroyloxy group or an itaconoyloxy group, and n is an integer of 1 to 25), and a copper salt of bis(2-pyridinethiol-1-oxide) (copper pyrithione). Further, dimethyl-t-butylsilyl acrylate is given as an example of the monomer A; and inorganic compounds such as copper compounds (specifically, cuprous oxide and copper powder), zinc sulfate and zinc oxide, and metal-containing organic compounds such as organocopper compounds (specifically, oxine copper), organonickel compounds and organozinc compounds (specifically, zinc pyrithione) are given as examples of the antifouling agents. Furthermore, rosin and rosin derivatives are cited as dissolution rate adjusting agents which can be added to the paint composition.

In (12) Japanese Patent Laid-Open Publication No. 269389/1996, a paint composition comprising a copolymer of a monomer mixture consisting of an unsaturated monomer A having a triorganosilyl group and a monomer B represented by any one of the following formulas (2) to (9), and an antifouling agent is disclosed.

The monomers B are as follows:
 a tertiary amino group-containing monomer represented by the formula (2) CH$_2$=CR$^4$COOR$^5$—NR$^6$R$^7$ (R$^4$ is H or CH$_3$, R$^5$ is an alkylene group, and R$^6$ and R$^7$ are each an alkyl group and may be the same or different),
 a quaternary ammonium salt-containing monomer represented by the formula (3) CH$_2$∇CR$^8$COOR$^9$—NR$^{10}$R$^{11}$R$^{12}$(Y) (R$^8$ is H or CH$_3$, R$^9$ is an alkylene group, R$^{10}$ to R$^{12}$ are each an alkyl group and may be the same or different, and Y is a halogen atom),
 a monomer represented by the formula (4) CH$_2$=CH—Z (Z is a group comprising a N-containing heterocyclic ring) and containing a nitrogen-containing heterocyclic ring,
 a monomer represented by the formula (5) CH$_2$=CR$^{13}$COO(R$^{14}$O)$_m$(R$^{15}$O)$_n$(R$^{16}$O)$_o$—R$^{17}$ (R$^{13}$ is H or CH$_3$, R$^{14}$ is an ethylene group, R$^{15}$ is an alkylene group of 3 carbon atoms, R$^{16}$ is an alkylene group of 4 carbon atoms, $R^{17}$ is an alkyl group or an aryl group, m, n and o are each an integer of 0 or greater, and n and o are not 0 at the same time) and having an alkoxy group or an aryloxyalkylene glycol group in a molecule, a (meth)acrylamide represented by the formula (6) $CH_2=CR^{18}CONR^{19}R^{20}$ ($R^{18}$ is H or $CH_3$, and $R^{19}$ and $R^{20}$ are each an alkyl group and may be the same or different), a (meth)acrylamide represented by the formula (7) $CH_2=CR^{21}CON()Q$ ($R^{21}$ is H or $CH_3$, N()Q is a N-containing group, and Q may contain O, N, S or the like) and containing a nitrogen-containing cyclic hydrocarbon group, a furan ring-containing (meth)acrylic ester represented by the formula (8) $CH_2=CR^{23}COOCH_2$—T ($R^{23}$ is H or $CH_3$, and T is a furan ring or a tetrahydrofuran ring), and a monomer represented by the formula (9) $CH_2=CH-CN$.

Further, various copolymerizable monomers such as acrylic acid, ethyl acrylate, 2-hydroxyethyl (meth)acrylate and 2-hydroxypropyl (methacrylate are given as examples of the optional components copolymerizable with the monomers A and B.

Although a copolymer comprising tri-n-butylsilyl acrylate (TBSA), diethylaminoethyl methacrylate (DEAEMA) and methyl methacrylate (MMA) and a copolymer comprising tri-n-butylsilyl acrylate (TBSA), N,N-dimethyl acrylamide (DMAA) and methyl methacrylate (MMA) are shown in the examples, neither a copolymer using 2-hydroxyethyl (meth) acrylate, 2-hydroxypropyl (meth)acrylate or the like nor a copolymer using at least straight-chain group-containing silyl (meth)acrylate and branched alkyl group-containing silyl (meth)acrylate is mentioned.

In addition, the same antifouling agents as described in the aforesaid Japanese Patent Laid-Open Publication No. 269388/1996 are given as components which can be added to the paint composition.

In (13) Japanese Patent Laid-Open Publication No. 269390/1996, there is disclosed a paint composition comprising a polymer using a monomer A represented by the formula (1) $X-SiR^1R^2R^3$ ($R^1$ to $R^3$ are each a group selected from an alkyl group and an aryl group and may be the same or different, and X is an acryloyloxy group, a methacryloyloxy group, a malenoyloxy group, a fumaroyloxy group or an itaconoyloxy group), a polymer using a monomer B represented by the formula (2) $Y-(CH_2CH_2O)_n-R^4$ ($R^4$ is an alkyl group or an aryl group, Y is an acryloyloxy group, a methacryloyloxy group, a maleinoyloxy group, a fumaroyloxy group or an itaconoyloxy group, and n is an integer of 1 to 25), and an antifouling agent. In this publication, the same antifouling agents as described in the aforesaid Japanese Patent Laid-Open Publication No. 269388/1996 are mentioned. Further, a resin (e.g., rosin) and an anti-settling agent are mentioned as components which can be added to the paint composition.

In (14) Japanese Patent Laid-Open Publication No. 277372/1996, there is disclosed a paint composition which contains a copolymer of a monomer mixture consisting of the same monomer A represented by the formula (1) $X-SiR^1R^2R^3$ as described in the aforesaid publication (11) (Japanese Patent Laid-Open Publication No. 269388/1996) and the same monomer B represented by the formula (2) $Y-(CH_2CH_2O)_n-R^4$ as described in the aforesaid publication (11) and a triphenylboron pyridine complex and in which the resin component is composed of only a polymer containing no metal and the aquatic organism adhesion inhibitor is composed of only an organic inhibitor containing no metal. Further, rosin and rosin derivatives are cited as dissolution rate adjusting agents which can be added to the paint composition.

In (15) Japanese Patent Laid-Open Publication No. 30071/1998, there is disclosed a paint composition comprising (A) at least one of rosin and a rosin compound comprising a rosin derivative or a rosin metallic salt, (B) a polymer of at least one monomer M represented by the formula (1) $X-SiR^1R^2R^3$ ($R^1$ to $R^3$ are each a group selected from an alkyl group and an aryl group and may be the same or different, and X is an acryloyloxy group, a methacryloyloxy group, a malenoyloxy group, a fumaroyloxy group, an itaconoyloxy group or a citraconoyloxy group) and/or an organosilyl ester group-containing polymer comprising a polymer of at least one monomer M and at least one polymerizable monomer other than the monomer M, and (C) an antifouling agent. In this publication, acrylic acid, methyl acrylate, 2-hydroxyethyl (meth)acrylate and 2-hydroxypropyl (meth)acrylate are given as other monomers (optional components) copolymerizable with the monomer M, but any organosilyl ester group-containing polymer using 2-hydroxyethyl (meth)acrylate, 2-hydroxypropyl (meth)acrylate or the like is not mentioned at all.

In the above publication, the same antifouling agents as described in the aforesaid Japanese Patent Laid-Open Publication No. 269388/1996 are mentioned. Further, a pigment, chlorinated paraffin, an anti-settling agent, etc. are described as components which can be added to the paint composition.

In the publications (9) to (15), however, neither an organosilyl ester group-containing polymer using 2-hydroxyethyl acrylate or the like nor a copolymer using at least straight-chain alkyl group-containing silyl (meth) acrylate and branched alkyl group-containing silyl (meth) acrylate in combination is mentioned. In addition, the paint compositions described in these publications have a problem that the resulting coating films have poor crack resistance or the resulting coating films are insufficient in the balance of various properties such as crack resistance, peel resistance (adhesive strength), antifouling performance, antifouling properties, particularly antifouling properties in a highly fouling environment, long-term antifouling properties and self-polishing properties.

In (16) Japanese Patent Publication No. 82865/1993, 2-hydroxyethyl acrylate and 2-hydroxypropyl acrylate are described as copolymerizable components optionally used. In (17) Japanese Patent Laid-Open Publication No. 48947/1997, (18) Japanese Patent Laid-Open Publication No. 48948/1997, (19) Japanese Patent Laid-Open Publication No. 48949/1997, (20) Japanese Patent Laid-Open Publication No. 48950/1997, (21) Japanese Patent Laid-Open Publication No. 48951/1997, (22) Japanese Patent Publication No. 32433/1993, (23) U.S. Pat. No. 4,593,055, (24) Japanese Patent Laid-Open Publication No. 1968669/1990 and (25) WO 91/14743, silyl (meth)acrylate copolymers are described. In the publications (16) to (25), however, neither a copolymer using a hydroxy-containing monomer nor a copolymer using at least straight-chain alkyl group-containing silyl (meth)acrylate and branched alkyl group-containing silyl (meth)acrylate in combination is mentioned. In addition, the antifouling paint using the copolymers described in the publications (16) to (25) have room to be improved in the crack resistance of the resulting coating films and the balance of various properties such as crack resistance, peel resistance (adhesive strength), antifouling performance, antifouling properties, particularly antifouling properties in a highly fouling environment, long-term antifouling properties and self-polishing properties.

In (26) Japanese Patent Laid-Open Publication No. 215780/1988, a copolymer using methyl methacrylate, n-butyl methacrylate, acrylamide or the like is described, and an antifouling paint comprising this copolymer and cuprous oxide is described, but the antifouling paint has the same problems as those of the antifouling paints described in the above publications.

OBJECT OF THE INVENTION

The present invention is intended to solve such problems associated with the prior art as mentioned above, and it is an object of the invention to provide a silyl (meth)acrylate copolymer which can produce an antifouling paint capable of forming an antifouling coating film which hardly suffers from occurrence of cracks, has excellent adhesive strength and thereby hardly suffers from peeling, can be favorably controlled in the hydrolysis rate, and is excellent in antifouling performance (antifouling activities), antifouling properties, particularly antifouling properties in a highly fouling environment, and long-term antifouling properties.

It is another object of the invention to provide a process for preparing the silyl (meth)acrylate copolymer.

It is a further object of the invention to provide an antifouling paint composition capable of forming such an antifouling coating film as mentioned above.

It is a still further object of the invention to provide an antifouling coating film formed from the antifouling paint composition, an antifouling method using the antifouling paint composition and a hull or an underwater structure coated with the coating film.

DISCLOSURE OF THE INVENTION

In the present invention, a first silyl (meth)acrylate copolymer (A-1) or a second silyl (meth)acrylate copolymer (A-2) is used as a copolymer.

The first silyl (meth)acrylate copolymer (A-1) according to the invention comprises:

(a) silyl (meth)acrylate constituent units represented by the following formula (I) in amounts of 20 to 80% by weight:

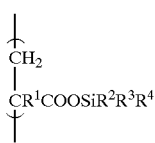

(I)

wherein $R^1$ is a hydrogen atom or a methyl group, and $R^2$, $R^3$ and $R^4$ may be the same or different and are each an alkyl group, a cycloalkyl group or a phenyl group which may have a substituent group, (b) acrylic unsaturated monomer constituent units represented by the following formula (II) in amounts of 0.01 to 40% by weight:

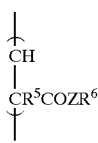

(II)

wherein $R^5$ is a hydrogen atom or a methyl group, Z is an oxygen atom or $-NR^7$, when Z is an oxygen atom, $R^6$ is a hydroxyalkyl or hydroxycycloalkyl group which may have a substituent group or a polyalkylene glycol group represented by the formula $-(R^8O)_nH$ (wherein $R^8$ is an alkylene group and n is an integer of 2 to 50), and when Z is $-NR^7$, $R^7$ is an alkyl group which may be substituted with any of a halogen, a hydroxyl group, an amino group, a substituted amino group, an acyl group and an alkoxy group, and $R^6$ is a hydrogen atom, and (c) unsaturated monomer constituent units other than the constituent units (a) and (b) in amounts of 5 to 79.99% by weight,
with the proviso that the total amount of the constituent units (a), (b) and (c) is 100% by weight,
said silyl (meth)acrylate copolymer (A-1) having a weight-average molecular weight, as measured by gel permeation chromatography (GPC), of not more than 200,000.

In a preferred embodiment of the silyl (meth)acrylate copolymer (A-1) of the invention, the unsaturated monomer constituent units (c) are those derived from at least one compound selected from (meth)acrylic esters, styrene and vinyl esters.

The process for preparing a silyl meth(acrylate) copolymer (A-1) according to the invention comprises polymerizing:

(a-1) silyl (meth)acrylate represented by the following formula (I-a) in an amount of 20 to 80% by weight:

(I-a)

wherein $R^1$ is a hydrogen atom or a methyl group, and $R^2$, $R^3$ and $R^4$ may be the same or different and are each an alkyl group, a cycloalkyl group or a phenyl group which may have a substituent group, (b1) an acrylic unsaturated monomer represented by the following formula (II-a) in an amount of 0.01 to 40% by weight:

(II-a)

wherein $R^5$ is a hydrogen atom or a methyl group, Z is an oxygen atom or $-NR^7$, when Z is an oxygen atom, $R^6$ is a hydroxyalkyl or hydroxycycloalkyl group which may have a substituent group or a polyalkylene glycol group represented by the formula $-(R^8O)_nH$ (wherein $R^8$ is an alkylene group and n is an integer of 2 to 50), and when Z is $-NR^7$, $R^7$ is an alkyl group which may be substituted with any of a halogen, a hydroxyl group, an amino group, a substituted amino group, an acyl group and an alkoxy group, and $R^6$ is a hydrogen atom, and (c1) an unsaturated monomer other than the monomers (a1) and (b1), which is copolymerizable with the monomers (a1) and (b1), in an amount of 5 to 79.99% by weight,
with the proviso that the total amount of said monomers (a1), (b1) and (c1) is 100% by weight,
in the presence of a radical polymerization initiator to obtain the above-mentioned silyl (meth)acrylate copolymer (A-1).

In a preferred embodiment of the process for preparing a silyl (meth)acrylate copolymer (A-1) according to the invention, the unsaturated monomer (c1) is at least one compound selected from (meth)acrylic esters, styrene and vinyl esters.

The silyl (meth)acrylate copolymer (A-2) according to the invention comprises:

(d) silyl (meth)acrylate constituent units represented by the following formula (III):

$$—CH_2—CR(COOSiR^{11}R^{12}R^{13}) \quad (III)$$

wherein R is a hydrogen atom or a methyl group, $R^{11}$ and $R^{12}$ are each independently a straight-chain alkyl group of 1 to 10 carbon atoms, a phenyl group which may have a substituent group or a trimethylsilyloxy group, and $R^{13}$ is an alkyl group of 1 to 18 carbon atoms which may have a cyclic structure or a branch, a phenyl group of 6 to 10 carbon atoms which may have a substituent group or a trimethylsilyloxy group, (e) silyl (meth)acrylate constituent units represented by the following formula (IV):

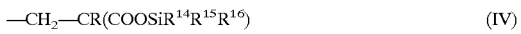
$$—CH_2—CR(COOSiR^{14}R^{15}R^{16}) \quad (IV)$$

wherein R is a hydrogen atom or a methyl group, $R^{14}$ and $R^{15}$ are each independently a branched alkyl or cycloalkyl group of 3 to 10 carbon atoms, and $R^{16}$ is a straight-chain alkyl group of 1 to 10 carbon atoms, a branched alkyl or cycloalkyl group of 3 to 10 carbon atoms, a phenyl group of 6 to 10 carbon atoms which may have a substituent group or a trimethylsilyloxy group, and (f) unsaturated monomer constituent units other than the constituent units (d) and (e), said silyl (meth)acrylate copolymer (A-2) having a weight-average molecular weight (Mw), as measured by gel permeation chromatography (GPC), of not more than 200,000.

In the second silyl (meth)acrylate copolymer (A-2) of the invention, it is preferable that $R^{11}$, $R^{12}$ and $R^{13}$ are each independently methyl, ethyl, n-propyl, n-butyl, n-hexyl or trimethylsilyloxy.

In the second silyl (meth)acrylate copolymer (A-2) of the invention, it is preferable that $R^{14}$, $R^{15}$ and $R^{16}$ are each independently isopropyl, sec-butyl, tert-butyl or isobutyl.

In the present invention, the unsaturated monomer constituent units (f) are preferably those derived from at least one compound selected from (meth)acrylic esters, styrene and vinyl esters of organic carboxylic acids.

In the present invention, the silyl (meth)acrylate constituent units (d), the silyl (meth)acrylate constituent units (e) and the unsaturated monomer constituent units (f) are preferably present in amounts of 0.5 to 50% by weight, 10 to 70% by weight, and 20 to 70% by weight, respectively, with the proviso that the total amount of the constituent units (d), (e) and (f) is 100% by weight.

The silyl (meth)acrylate copolymer (A-2) of the invention preferably has a weight-average molecular weight (Mw) of 3,000 to 100,000.

The process for preparing a silyl meth(acrylate) copolymer (A-2) according to the invention comprises polymerizing:

(d1) silyl (meth)acrylate represented by the following formula (III-d):

$$CH_2=CR(COOSiR^{11}R^{12}R^{13}) \quad (III-d)$$

wherein R is a hydrogen atom or a methyl group, $R^{11}$ and $R^{12}$ are each independently a straight-chain alkyl group of 1 to 10 carbon atoms, a phenyl group which may have a substituent group or a trimethylsilyloxy group, and $R^{13}$ is an alkyl group of 1 to 18 carbon atoms which may have a cyclic structure or a branch, a phenyl group of 6 to 10 carbon atoms which may have a substituent group or a trimethylsilyloxy group, (e1) silyl (meth)acrylate represented by the following formula (IV-d):

$$CH_2=CR(COOSiR^{14}R^{15}R^{16}) \quad (IV-d)$$

wherein R is a hydrogen atom or a methyl group, $R^{14}$ and $R^{15}$ are each independently a branched alkyl or cycloalkyl group of 3 to 10 carbon atoms, and $R^{16}$ is a straight-chain alkyl group of 1 to 10 carbon atoms, a branched alkyl or cycloalkyl group of 3 to 10 carbon atoms, a phenyl group of 6 to 10 carbon atoms which may have a substituent group or a trimethylsilyloxy group, and (f1) an unsaturated monomer other than the monomers (d1) and (e1), which is copolymerizable with the monomers (d1) and (e1), in the presence of a radical polymerization initiator to obtain the above-mentioned silyl (meth)acrylate copolymer (A-2).

In the process for preparing a silyl (meth)acrylate copolymer (A-2) according to the invention, it is preferable that $R^{11}$, $R^{12}$ and $R^{13}$ are each independently methyl, ethyl, n-propyl, n-butyl, n-hexyl or trimethylsilyloxy.

In the process for preparing a silyl (meth)acrylate copolymer (A-2) according to the invention, it is preferable that $R^{14}$, $R^{15}$ and $R^{16}$ are each independently isopropyl, sec-butyl, tert-butyl or isobutyl.

In the present invention, the unsaturated monomer (f1) is preferably at least one compound selected from (meth)acrylic esters, styrene and vinyl esters of organic carboxylic acids.

In the present invention, the silyl (meth)acrylate (d1), the silyl (meth)acrylate (e1) and the unsaturated monomer (f1) are preferably used in amounts of 0.5 to 50% by weight, 10 to 70% by weight, and 20 to 70% by weight, respectively, with the proviso that the total amount of the components (d1), (e1) and (f1) is 100% by weight.

In any embodiment of the process of the invention, the resulting silyl (meth)acrylate copolymer (A-2) preferably has a weight-average molecular weight (Mw) of 3,000 to 100,000.

The antifouling paint composition according to the invention comprises the first silyl (meth)acrylate copolymer (A-1) or the second silyl (meth)acrylate copolymer (A-2), and/or further comprises various additives.

More specifically, in the antifouling paint composition (P) of the invention, the first silyl (meth)acrylate copolymer (A-1) is contained as a film-forming component.

In the antifouling paint composition (Q) of the invention, at least the first silyl (meth)acrylate copolymer (A-1), an antifouling agent (B) whose representatives are copper and/or a copper compound, and a vinyl ether (co)polymer (E) and/or an elution accelerating component (F) are contained.

In the antifouling paint composition (R) of the invention, the second silyl (meth)acrylate copolymer (A-2) is contained as a film-forming component and an elution controlling component.

That is, the antifouling paint composition (P) of the invention comprises the silyl (meth)acrylate copolymer (A-1).

The antifouling paint composition (P) of the invention preferably comprises the silyl (meth)acrylate copolymer (A-1) and an antifouling agent (B).

The antifouling paint composition (P) of the invention preferably comprises the silyl (meth)acrylate copolymer (A-1), an antifouling agent (B) and zinc oxide (C).

The antifouling paint composition (P) of the invention preferably comprises the silyl (meth)acrylate copolymer (A-1), an antifouling agent (B) and an inorganic dehydrating agent (D).

The antifouling paint composition (P) of the invention preferably comprises the silyl (meth)acrylate copolymer (A-1), an antifouling agent (B), zinc oxide (C) and an inorganic dehydrating agent (D).

In any embodiment of the antifouling paint composition (P) of the invention, the antifouling agent is preferably copper and/or a copper compound (B-1).

In any embodiment of the antifouling paint composition (P) of the invention, the antifouling agent is preferably a pyrithione compound (B-2).

In any embodiment of the antifouling paint composition (P) of the invention, the antifouling agent preferably comprises copper and/or a copper compound (B-1) and a pyrithione compound (B-2).

In any embodiment of the antifouling paint composition (P) of the invention, the unsaturated monomer constituent units (c) are preferably those derived from at least one compound selected from (meth)acrylic esters, styrene and vinyl esters.

The second antifouling composition (Q) of the invention comprises the silyl (meth)acrylate copolymer (A-1), an antifouling agent (B), and a vinyl ether (co)polymer (E) containing constituent units derived from a vinyl ether represented by the formula (V) $H_2C=CHO—R$ (wherein R is a hydrocarbon group) and/or an elution accelerating component (F).

More specifically, the antifouling paint composition (Q) of the invention preferably comprises the silyl (meth) acrylate copolymer (A-1), an antifouling agent (B) and the vinyl ether (co)polymer (E).

The antifouling paint composition (Q) of the invention preferably comprises the silyl (meth)acrylate copolymer (A-1), an antifouling agent (B) and an elution accelerating component (F).

The antifouling paint composition (Q) of the invention preferably comprises the silyl (meth)acrylate copolymer (A-1), an antifouling agent (B), the vinyl ether (co)polymer (E) and an elution accelerating component (F).

In the antifouling paint composition (Q) of the invention, the antifouling agent (B) is preferably copper and/or a copper compound.

In the antifouling paint composition (Q) of the invention, the elution accelerating component (F) is preferably at least one substance selected from rosin, rosin derivatives, naphthenic acid and metallic salts thereof.

In any embodiment of the antifouling paint composition (Q) of the invention, the unsaturated monomer constituent units (c) are preferably those derived from at least one compound selected from (meth)acrylic esters, styrene and vinyl esters.

The third antifouling paint composition (R) of the invention comprises the silyl (meth)acrylate copolymer (A-2).

The antifouling paint composition (R) of the invention preferably comprises the silyl (meth)acrylate copolymer (A-2) and an antifouling agent (B).

The antifouling paint composition (R) of the invention preferably comprises the silyl (meth)acrylate copolymer (A-2), an antifouling agent (B) and zinc oxide (C).

The antifouling paint composition (R) of the invention preferably comprises the silyl (meth)acrylate copolymer (A-2), an antifouling agent (B) and an inorganic dehydrating agent (D).

The antifouling paint composition (R) of the invention preferably comprises the silyl (meth)acrylate copolymer (A-2), an antifouling agent (B), zinc oxide (C) and an inorganic dehydrating agent (D).

The antifouling paint composition (R) of the invention preferably further comprises an elution accelerating component (F).

The antifouling paint composition (R) of the invention preferably further comprises a vinyl ether (co)polymer (E) containing constituent units derived from a vinyl ether represented by the formula (V) $H_2C=CHO—R$ (wherein R is a hydrocarbon group).

In the antifouling paint composition (R) of the invention, either copper and/or a copper compound (particularly copper and/or an inorganic copper compound (B-3)) or an organic antifouling agent (B-4), or both of them are preferably used as the antifouling agent (B).

In the antifouling paint composition (R) of the invention, the organic antifouling agent (B-4) is preferably at least one organic antifouling agent selected from the group consisting of metal pyrithiones, pyridine-triphenylborane, amine-triphenylborane, N,N-dimethyldichlorophenylurea, 2,4,6-trichlorophenylmaleimide, 2-methylthio-4-tert-butylamino-6-cyclopropylamino-s-triazine, 4,5-dichloro-2-n-octyl-4-isothiazoline-3-one and 2,4,5,6-tetrachloroisophthalonitrile.

In the antifouling paint composition (R) of the invention, the organic antifouling agent (B-4) is preferably 4,5-dichloro-2-n-octyl-4-isothiazoline-3-one.

In the antifouling paint composition (R) of the invention, the organic antifouling agent (B-4) is preferably a combination of metal pyrithione and at least one organic antifouling agent selected from the group consisting of N,N-dimethyldichlorophenylurea, 2,4,6-trichlorophenylmaleimide, 2-methylthio-4-tert-butylamino-6-cyclopropylamino-s-triazine, 4,5-dichloro-2-n-octyl-4-isothiazoline-3-one and 2,4,5,6-tetrachloroisophthalonitrile.

In the antifouling paint composition (R) of the invention, the organic antifouling agent (B-4) is preferably a combination of copper pyrithione and/or zinc pyrithione and 4,5-dichloro-2-n-octyl-4-isothiazoline-3-one.

In the antifouling paint composition (R) of the invention, the elution accelerating component (F) is preferably at least one substance selected from rosin, rosin derivatives, naphthenic acid and metallic salts thereof.

In the antifouling paint composition (R) of the invention, the unsaturated monomer constituent units (f) are preferably those derived from at least one compound selected from (meth)acrylic esters, styrene and vinyl esters of organic carboxylic acids.

The antifouling coating film according to the invention is formed from the antifouling paint composition described above.

The method of antifouling a hull or an underwater structure according to the invention employs the antifouling paint composition described above.

The hull or the underwater structure according to the invention is a hull or an underwater structure whose surface is coated with a coating film formed from the antifouling paint composition described above.

According to the present invention, there is provided a silyl (meth)acrylate copolymer which can produce an antifouling paint capable of forming an antifouling coating film which hardly suffers from occurrence of cracks, has excellent adhesive strength and thereby hardly suffers from peeling, can be favorably controlled in the hydrolysis rate, is excellent in antifouling performance (antifouling activities), antifouling properties, particularly antifouling properties in a highly fouling environment, and long-term antifouling properties, and is well-balanced among these properties. A process for preparing the silyl (meth)acrylate copolymer is also provided. Further, an antifouling paint composition capable of forming such an antifouling coating film as mentioned above is provided.

BRIEF DESCRIPTION OF THE DRAWINGS

FIG. 11 is a GPC chromatogram of a copolymer A1-22.
FIG. 42 is a chart of an IR spectrum of the copolymer A2-1.
FIG. 43 is a chart of an IR spectrum of the copolymer A2-2.
FIG. 44 is a chart of an IR spectrum of the copolymer A2-3.

BEST MODE FOR CARRYING OUT THE INVENTION

Figure 1:
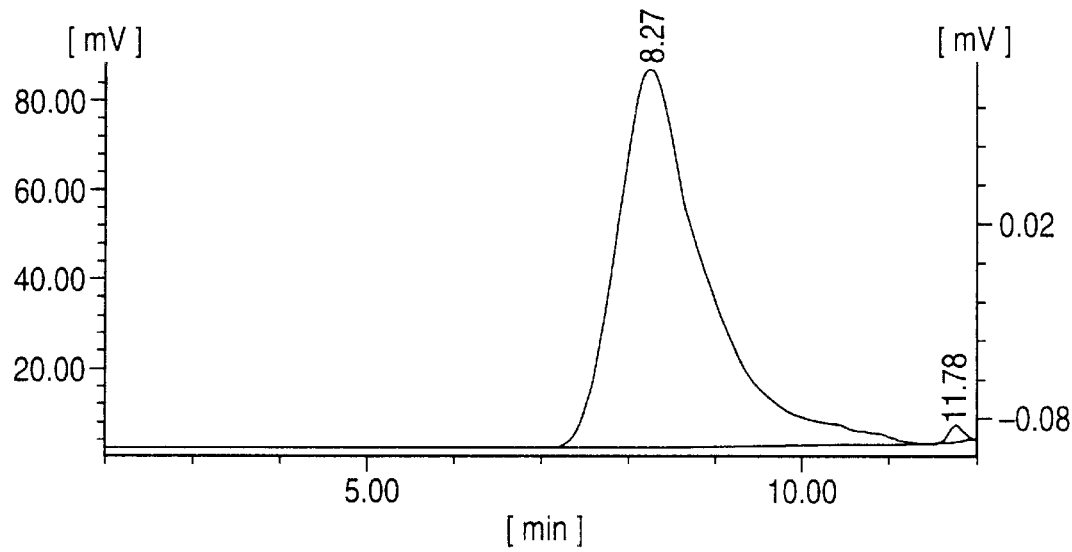
FIG. 1 is a GPC chromatogram of a copolymer A1-1.
Figure 2:
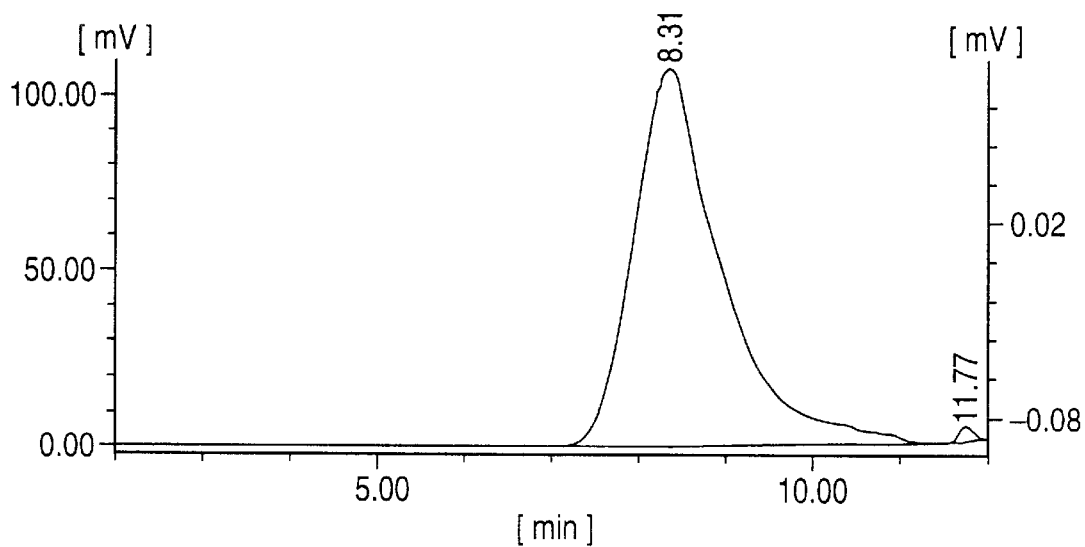
FIG. 2 is a GPC chromatogram of a copolymer A1-2.
Figure 3:
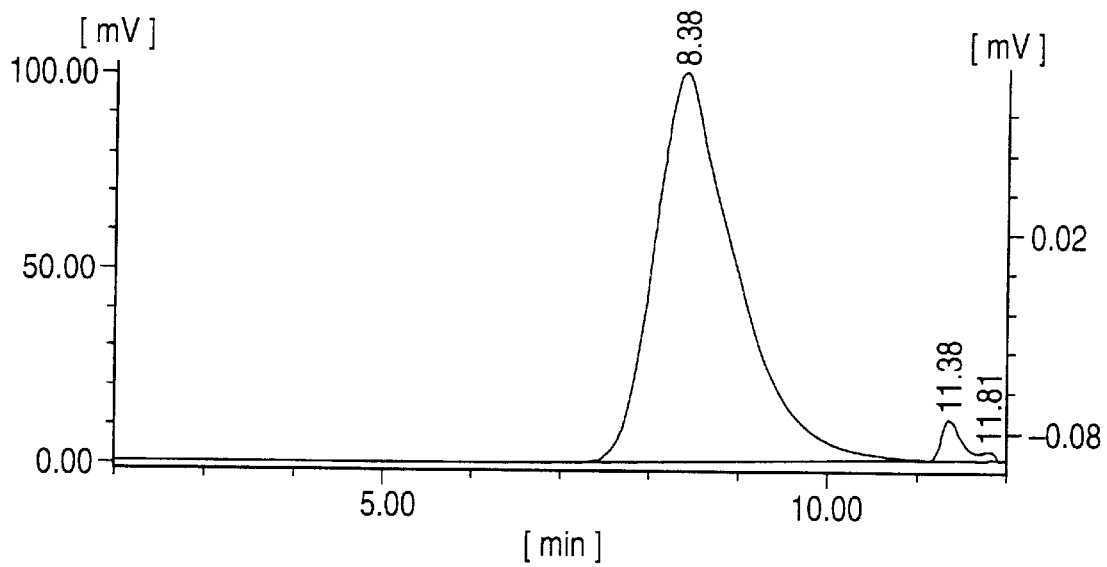
FIG. 3 is a GPC chromatogram of a copolymer A1-3.
Figure 4:
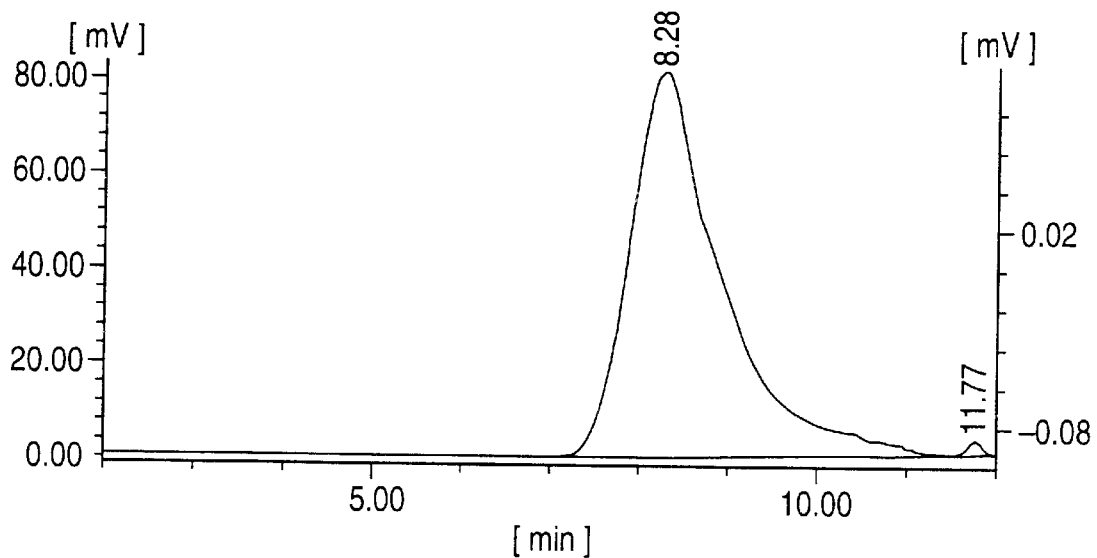
FIG. 4 is a GPC chromatogram of a copolymer A1-6.
Figure 5:
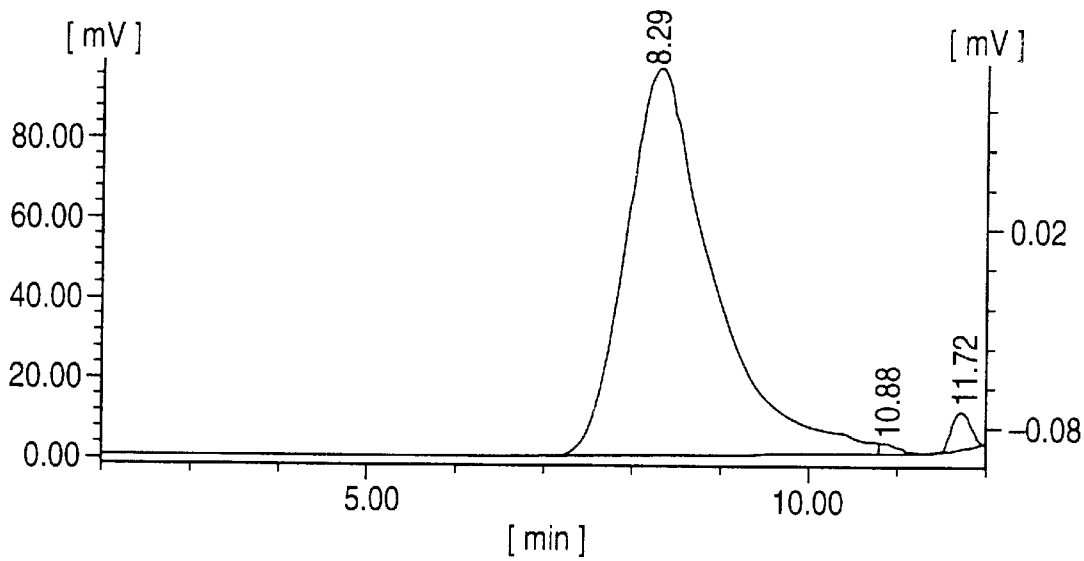
FIG. 5 is a GPC chromatogram of a copolymer A1-9.
Figure 6:
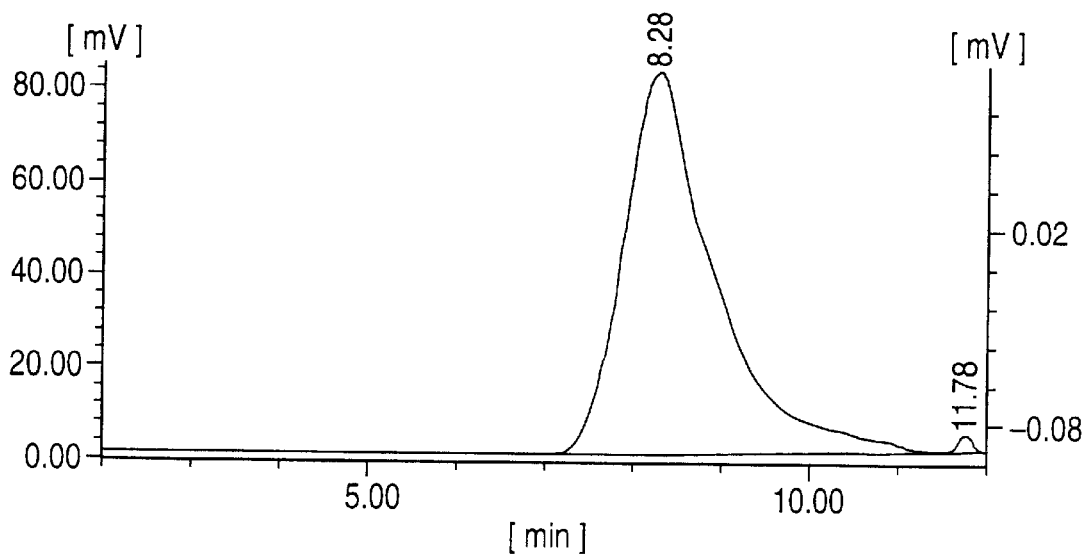
FIG. 6 is a GPC chromatogram of a copolymer A1-10.
Figure 7:
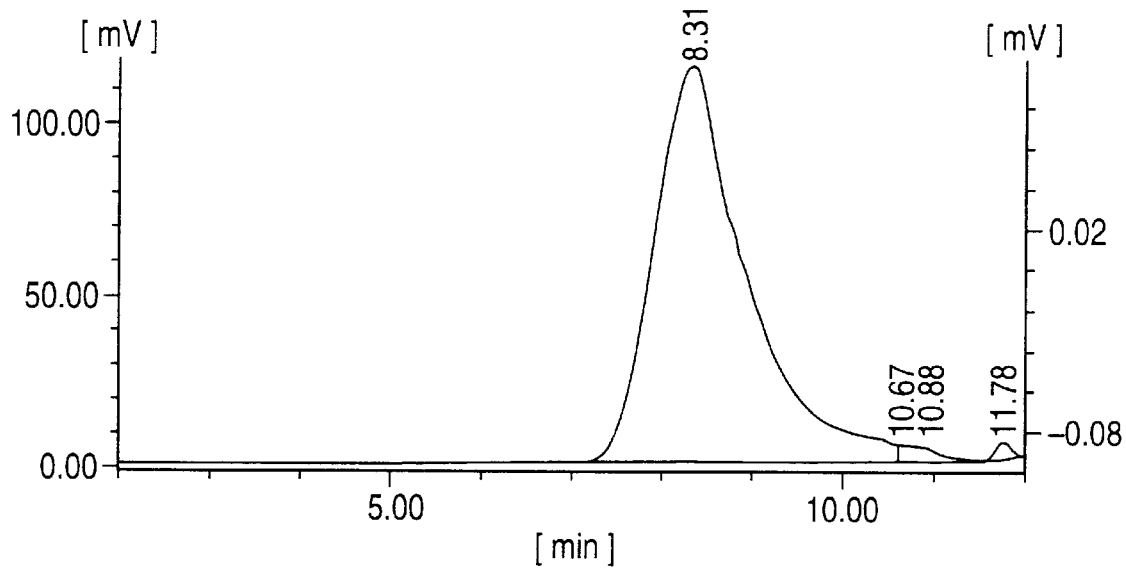
FIG. 7 is a GPC chromatogram of a copolymer A1-11.
Figure 8:
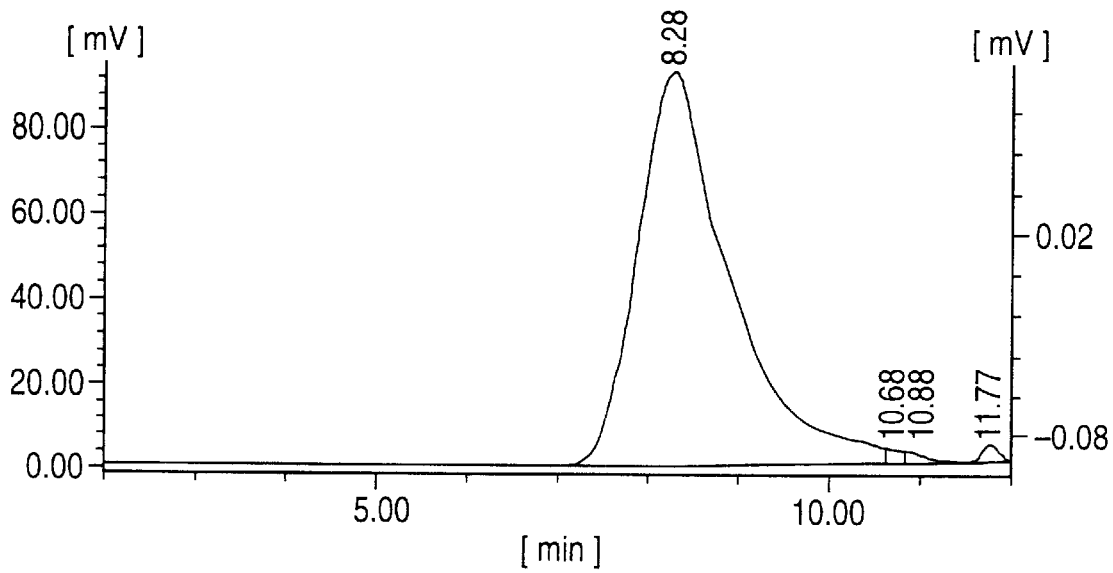
FIG. 8 is a GPC chromatogram of a copolymer A1-12.
Figure 9:
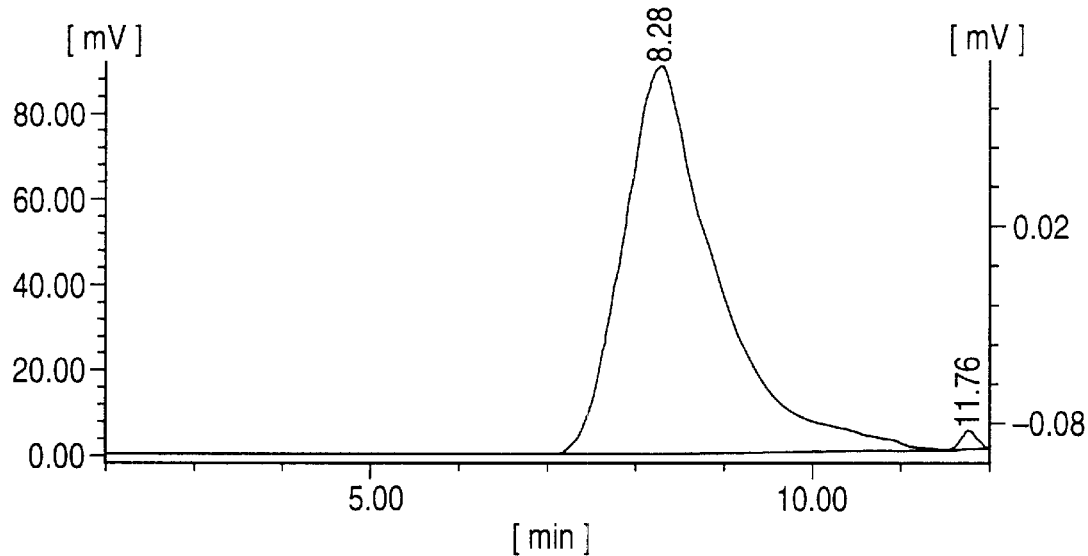
FIG. 9 is a GPC chromatogram of a copolymer A1-13.
Figure 10:
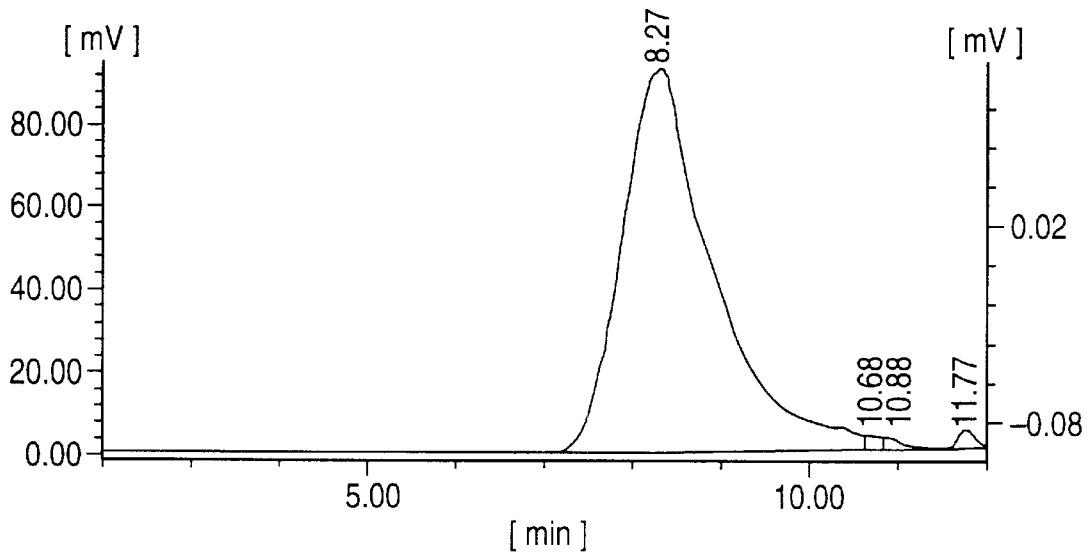
FIG. 10 is a GPC chromatogram of a copolymer A1-14.
Figure 11:
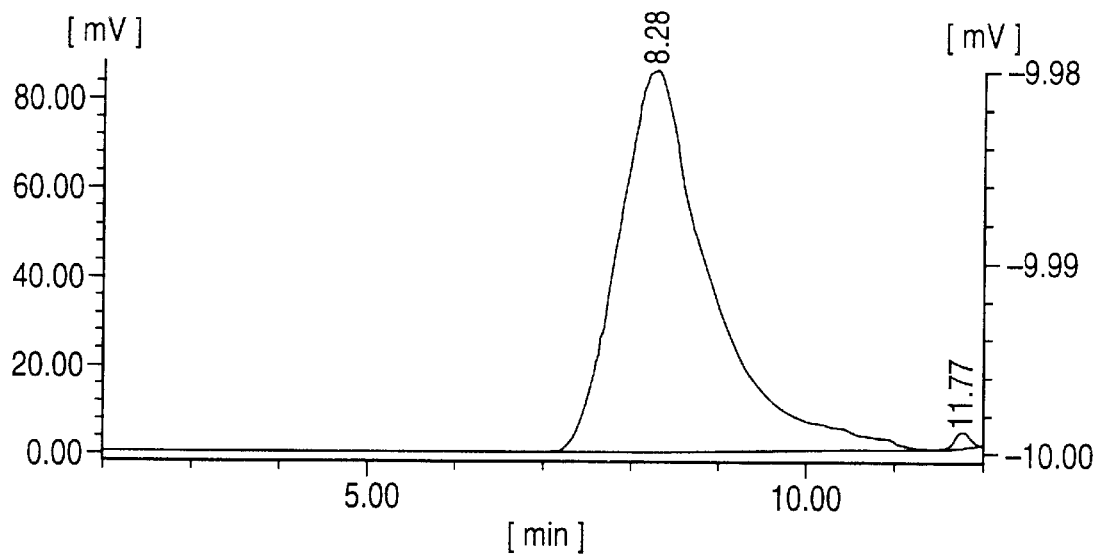
FIG. 11 is a GPC chromatogram of a copolymer A1-15.
Figure 12:
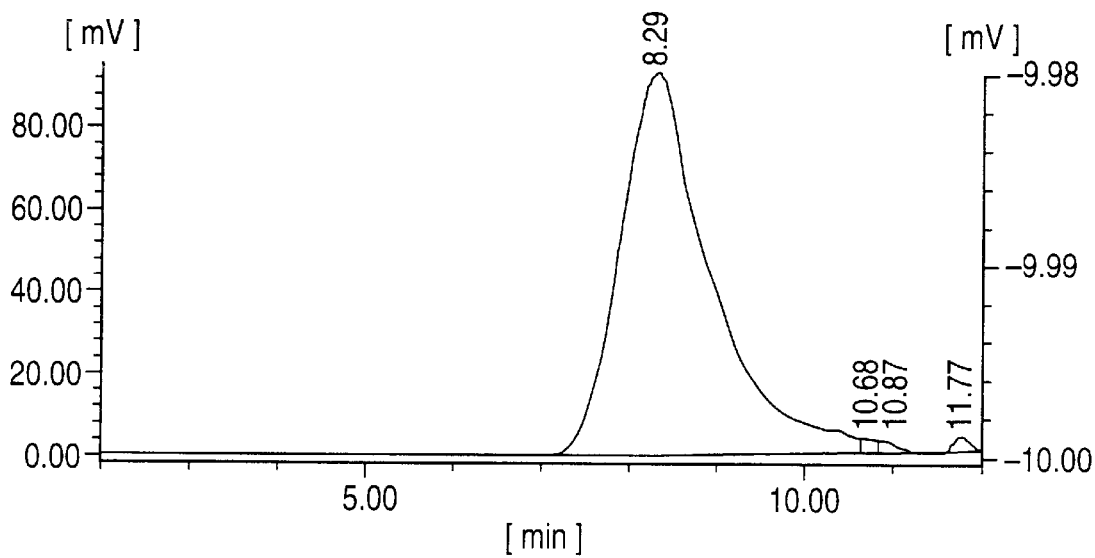
FIG. 12 is a GPC chromatogram of a copolymer A1-16.
Figure 13:
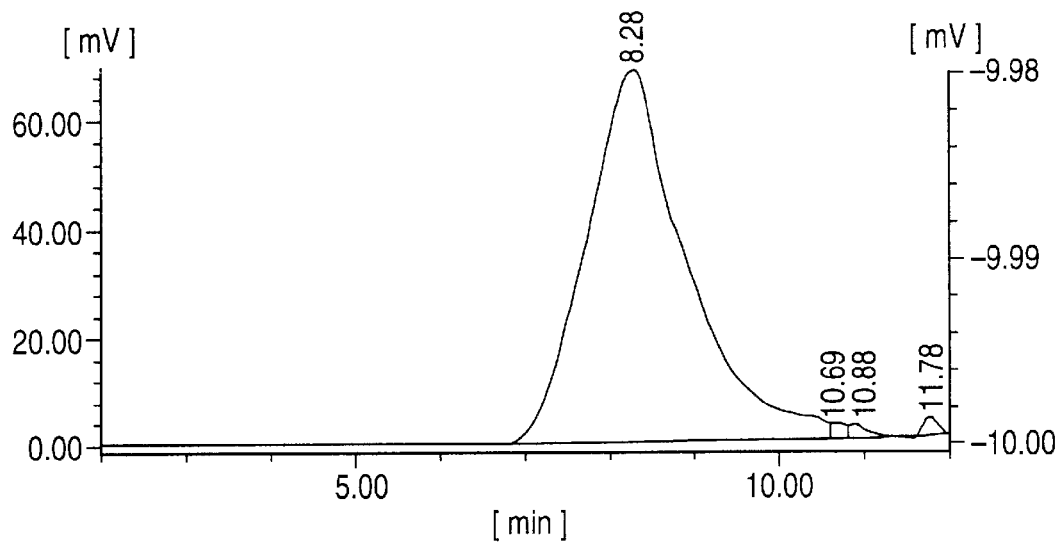
FIG. 13 is a GPC chromatogram of a copolymer A1-17.
Figure 14:
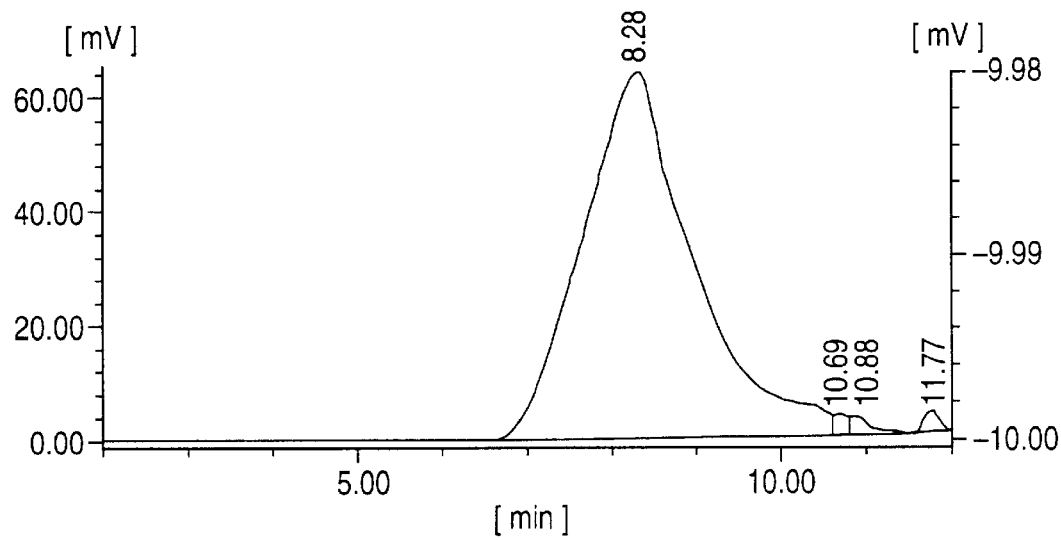
FIG. 14 is a GPC chromatogram of a copolymer A1-18.
Figure 15:
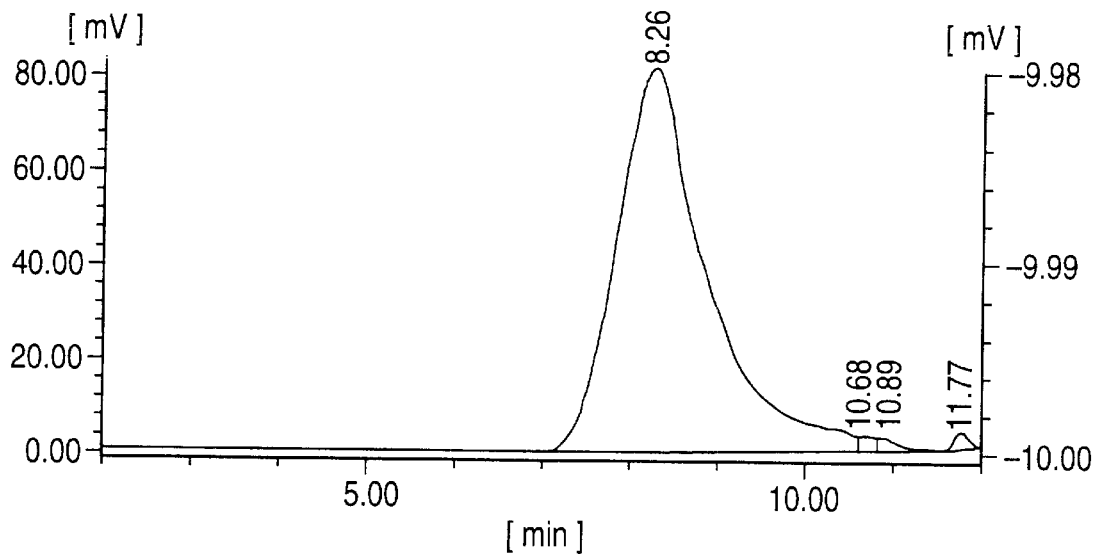
FIG. 15 is a GPC chromatogram of a copolymer A1-19.
Figure 16:
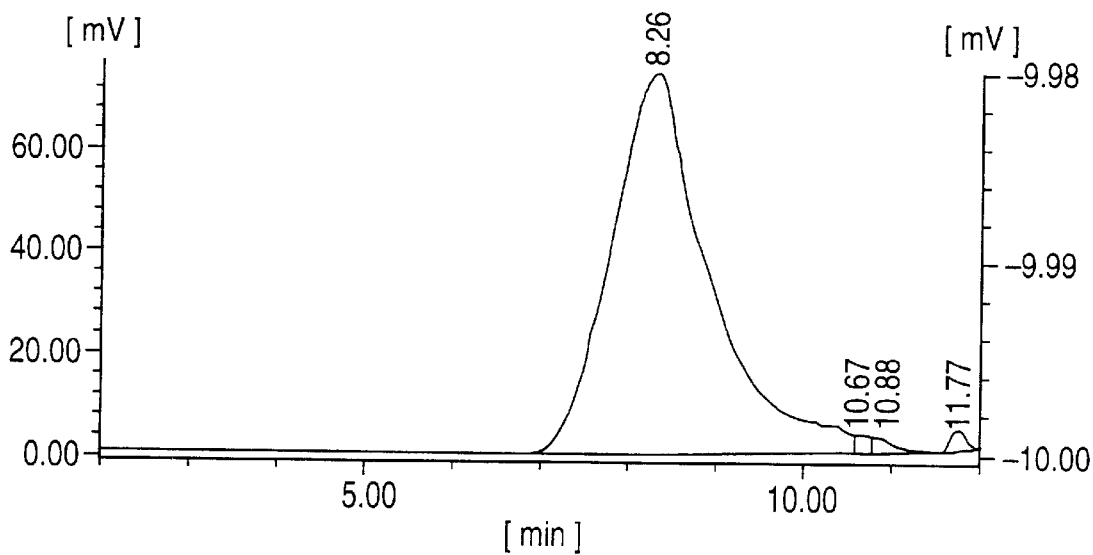
FIG. 16 is a GPC chromatogram of a copolymer A1-20.
Figure 17:
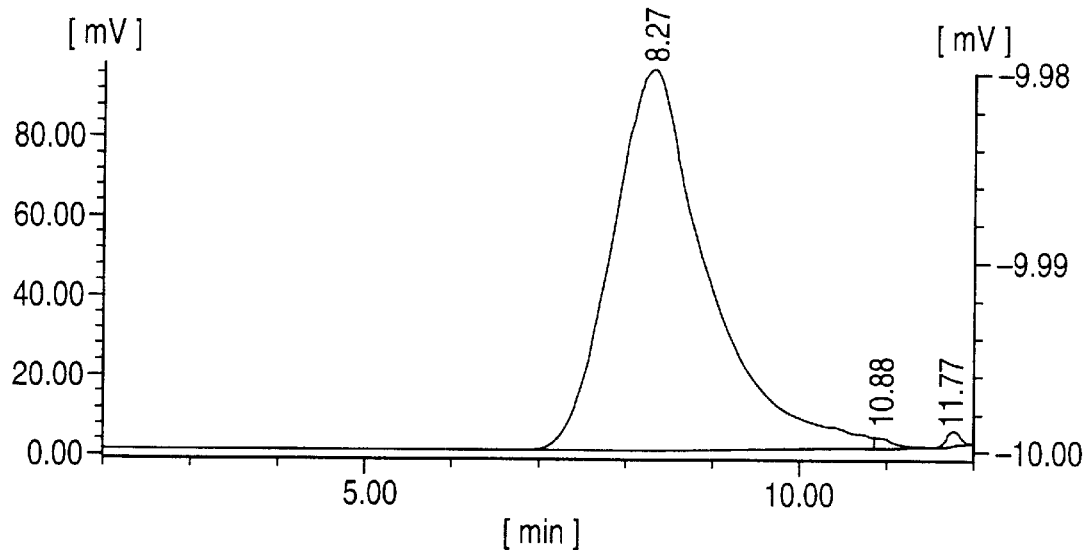
FIG. 17 is a GPC chromatogram of a copolymer A1-21.
Figure 18:
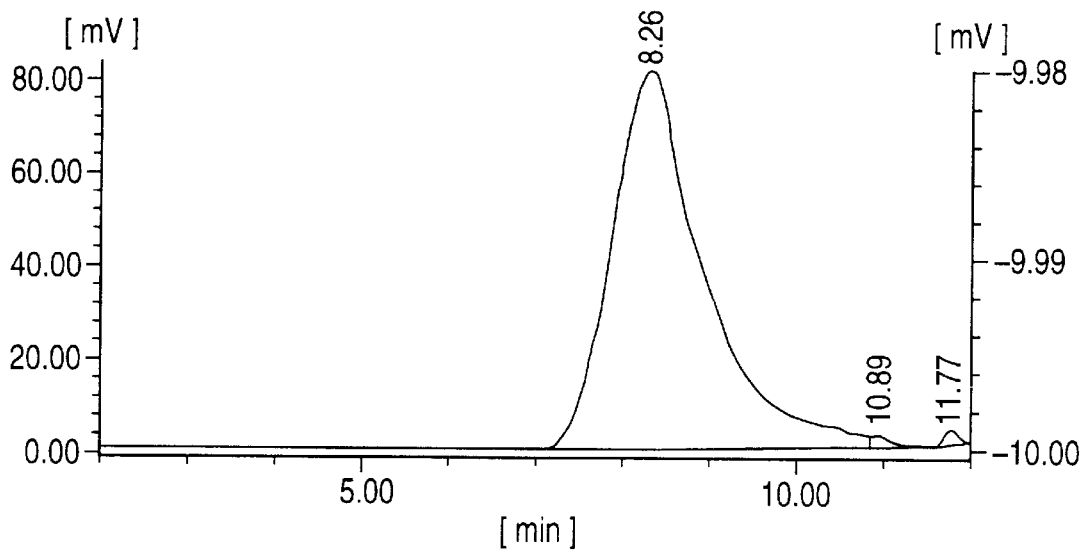
Figure 19:
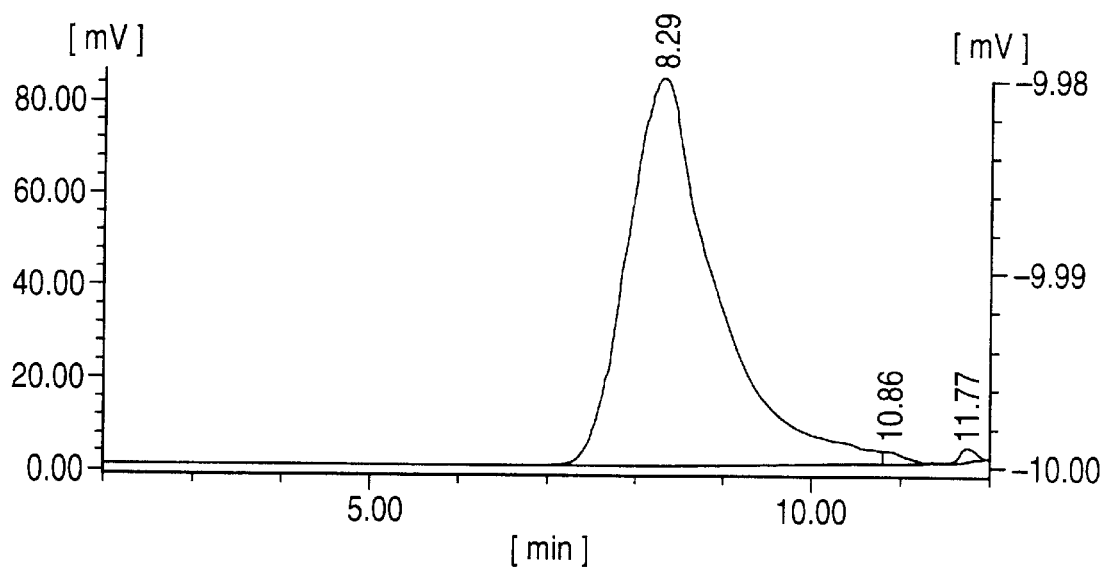
FIG. 19 is a GPC chromatogram of a copolymer A1-23.

The first silyl (meth)acrylate copolymer (A-1), the second silyl (meth)acrylate copolymer (A-2), the processes for preparing the copolymers, and the antifouling paint compositions (P), (Q) and (R) are described in more detail hereinafter.

First of all, the Silyl (meth)acrylate copolymers (A-1) and (A-2) and the processes for preparing the copolymers are described in more detail.

First Silyl (Meth)acrylate Copolymer (A-1)

The first silyl (meth)acrylate copolymer (A-1) of the invention comprises silyl (meth)acrylate constituent units (a) represented by the formula (I), acrylic unsaturated monomer constituent units (b) represented by the formula (II) and unsaturated monomer constituent units (c) other than the constituent units (a) and (b).

The constituent units (a), (b) and (c) for constituting the silyl (meth)acrylate copolymer (A-1) are described below in this order.

Silyl (Meth)acrylate Constituent Unit (a)

The silyl (meth)acrylate constituent unit (a) is represented by the following formula (I).

(I)

In the formula (I), $R^1$ is a hydrogen atom or a methyl group, and $R^2$, $R^3$ and $R^4$ may be the same or different and are each an alkyl group, a cycloalkyl group or a phenyl group which may have a substituent group.

The number of carbon atoms of the alkyl group is in the range of preferably 1 to 18, more preferably 1 to 6, and the number of carbon atoms of the cycloalkyl group is in the range of preferably 3 to 10, more preferably 3 to 8. Examples of the substituent groups which can be substituted for hydrogen atoms in the phenyl group include alkyl, aryl and halogen.

The silyl (methyl)acrylate, from which the silyl(meth)acrylate constituent unit is derived, is represented by the following formula (I-a).

(I-a)

In the formula (I-a), $R^1$ is the same as $R^1$ in the formula (I) and is a hydrogen atom or a methyl group. $R^2$, $R^3$ and $R^4$ are the same as $R^2$, $R^3$ and $R^4$ in the formula (I), and they may be the same or different and are each the same alkyl group, cycloalkyl group or phenyl group which may have a substituent group as described above.

Examples of the silyl (meth)acrylates (I-a) include:

silyl (meth)acrylates wherein $R^2$, $R^3$ and $R^4$ are the same as one another, such as trimethylsilyl (meth)acrylate, triethylsilyl (meth)acrylate, tripropylsilyl (meth)acrylate, triisopropylsilyl (meth)acrylate, tributylsilyl (meth)acrylate, tri-sec-butylsilyl (meth)acrylate and tri-isobutylsilyl (meth)acrylate; and silyl (meth)acrylates wherein $R^2$, $R^3$ and $R^4$ are partly or entirely different from one another, such as sec-butylmethylsilyl (meth)acrylate, sec-butyldimethylsilyl (meth)acrylate, dimethylpropylsilyl (meth)acrylate, monomethyldipropylsilyl (meth)acrylate and methylethylpropylsilyl (meth)acrylate.

In the present invention, such silyl (meth)acrylates can be used singly or in combination of two or more kinds. Of such silyl (meth)acrylates, preferable are those wherein $R^2$, $R^3$ and $R^4$ are each independently an alkyl group of about 1 to 18 carbon atoms, such as methyl, ethyl, n-propyl, isopropyl, sec-butyl, tert-butyl or isobutyl, and more preferable are those wherein at least one of alkyl groups indicated by $R^2$, $R^3$ and $R^4$ has 3 or more carbon atoms. Also preferable are those wherein the total number of the carbon atoms in $R^2$, $R^3$ and $R^4$ is in the range of about 5 to 21. Of such silyl (meth)acrylates, triisopropylsilyl (meth)acrylate, triisobutylsilyl (meth)acrylate, disec-butylmethylsilyl (meth)acrylate, sec-butyldimethylsilyl (meth)acrylate and tri-sec-butylsilyl (meth)acrylate are most preferably used in consideration of ease of synthesis of the silyl (meth)acrylate copolymer and film-forming properties, storage stability and polishing-cleaning controllability of an antifouling paint composition using the silyl (meth)acrylate copolymer.

Acrylic Unsaturated Monomer Constituent Unit (b)

The acrylic unsaturated monomer constituent unit (b) (sometimes simply referred to as an "unsaturated monomer constituent unit (b)") is represented by the following formula (II).

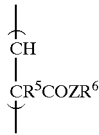

(II)

In the formula (II), $R^5$ is a hydrogen atom or a methyl group, and Z is an oxygen atom or $-NR^7$.

When Z is an oxygen atom, $R^6$ is a hydroxyalkyl or hydroxycycloalkyl group which may have a substituent group or a polyalkylene glycol group represented by the following formula:

wherein $R^8$ is an alkylene group, and n is an integer of 2 to 50.

The number of carbon atoms of the hydroxyalkyl group in the formula (II) is in the range of preferably 1 to 18, more preferably 2 to 9, the number of carbon atoms of the hydroxycycloalkyl group is in the range of preferably 3 to 10, more preferably 3 to 8, and the number of carbon atoms of the polyalkylene glycol group is in the range of preferably 1 to 8, more preferably 2 to 4.

When Z is $-NR^7$, $R^7$ is an alkyl group having the same carbon atoms as described above, which may be substituted with any of a halogen, a hydroxyl group, an amino group, a substituted amino group, an acyl group and an alkoxy group, and $R^6$ is a hydrogen atom.

The unsaturated monomer, from which the unsaturated monomer constituent unit (b) is derived, is represented by the following formula (II-a).

In the formula (II-a), $R^5$ is the same as $R^5$ in the formula (II) and is a hydrogen atom or a methyl group, and Z is the same as Z in the formula (II) and is an oxygen atom or $-NR^7$.

When Z is an oxygen atom, $R^6$ is a hydroxyalkyl or hydroxycycloalkyl group which may have a substituent group or a polyalkylene glycol group represented by the following formula:

wherein $R^8$ is an alkylene group, and n is an integer of 2 to 50.

The number of carbon atoms of the hydroxyalkyl group in the formula (II-a) is in the range of preferably 1 to 18, more preferably 2 to 9, the number of carbon atoms of the hydroxycycloalkyl group is in the range of preferably 3 to 10, more preferably 3 to 8, and the number of carbon atoms of the polyalkylene glycol group is in the range of preferably 1 to 8, more preferably 2 to 4.

When Z is $-NR^7$, $R^7$ is an alkyl group which may be substituted with any of a halogen, a hydroxyl group, an amino group, a substituted amino group, an acyl group and an alkoxy group, and $R^6$ is a hydrogen atom.

Examples of the unsaturated monomers (II-a) represented by the formula (II-a) wherein Z is an oxygen atom include 2-hydroxyethyl acrylate, 2-hydroxyethyl methacrylate, 2-hydroxypropyl acrylate, 2-hydroxypropyl methacrylate, 3-chloro-2-hydroxypropyl methacrylate, 3-phenoxy-2-hydroxypropyl acrylate, 4-hydroxybutyl acrylate, 2-hydroxybutyl acrylate, 2-hydroxybutyl methacrylate, 6-hydroxyhexyl acrylate, 1,4-hydroxyhexanedimethanol monoacrylate, polyethylene glycol monomethacrylate (n=2), polyethylene glycol monomethacrylate (n=4), polyethylene glycol monomethacrylate (n=5), polyethylene glycol monomethacrylate (n=8), polyethylene glycol monomethacrylate (n=80), polyethylene glycol monomethacrylate (n=15), polypropylene glycol monomethacrylate (n=5), polypropylene glycol monomethacrylate (n=9) and polypropylene glycol monomethacrylate (n=12).

Examples of the unsaturated monomers (II-a) represented by the formula (II-a) wherein Z is $-NR^7$ include N-methylol acrylamide, N-methoxymethyl acrylamide, N-ethoxymethyl acrylamide, N,N-dimethylaminopropyl acrylamide, N,N-dimethylaminopropyl methacrylamide and diacetone acrylamide.

These unsaturated monomers (II-a) can be used singly or in combination of two or more kinds.

Of the unsaturated monomers (II-a), hydroxyl group-containing monomers are preferable. Of the hydroxyl group-containing monomers, 2-hydroxypropyl acrylate and 2-hydroxybutyl methacrylate are preferably used, because an antifouling coating film having proper elution properties can be obtained.

Unsaturated Monomer Constituent Unit (c)

The unsaturated monomer constituent unit (c) constitutes the silyl (meth)acrylate copolymer of the invention together with the constituent units (a) and (b), and is different from any of the constituent units (a) and (b).

Examples of the unsaturated monomers (c1), from which the unsaturated constituent unit (c) can be derived, include (meth)acrylic esters, such as methyl (meth)acrylate, ethyl (meth)acrylate and octyl (meth)acrylate; styrenes, such as styrene, vinyltoluene and α-methylstyene; vinyl esters, such as vinyl acetate, vinyl benzoate, vinyl propionate and vinyl butyrate; crotonic esters; itaconic esters; fumaric esters; and maleic esters. Of these, (meth)acrylic esters, styrenes and vinyl esters are preferably used, because an antifouling coating film having proper strength of coating film can be obtained.

These unsaturated monomers are used singly or in combination of two or more kinds.

In the silyl (meth)acrylate copolymer of the invention, the silyl (meth)acrylate constituent units (a) are desirably contained in amounts of 20 to 80% by weight, preferably 30 to 70% by weight, the acrylic unsaturated monomer constituent units (b) are desirably contained in amounts of 0.01 to 40% by weight, preferably 0.1 to 20% by weight, and the unsaturated monomer constituent units (c) are desirably contained in amounts of 5 to 79.99% by weight, preferably 10 to 60% by weight, with the proviso that the total amount of the constituent units (a), (b) and (c) is 100% by weight, from the viewpoints of strength and degree of consumption of a coating film.

The weight-average molecular weight of the silyl (meth)acrylate copolymer (A-1), as measured by gel permeation chromatography (GPC), is desired to be not more than 200,000, preferably 5,000 to 100,000, from the viewpoints of ease of preparation of an antifouling paint containing the silyl (meth)acrylate copolymer (A-1), painting workability of the resulting antifouling paint, consumption rate of an antifouling coating film, and crack resistance of the coating film.

Preparation of Silyl (Meth)acrylate Copolymer (A-1)

The silyl (meth)acrylate copolymer (A-1) can be obtained by random polymerizing 20 to 80% by weight of the silyl (meth)acrylate (a1) represented by the formula (I-a), 0.01 to 40% by weight of the unsaturated monomer (b1) represented by the formula (II-a) and 5 to 79.99% by weight of another unsaturated monomer (c1) copolymerizable with the monomers (I-a) and (II-a), the total amount of said components (a1), (b1) and (c1) being 100% by weight, by various processes such as solution polymerization, bulk polymerization, emulsion polymerization and suspension polymerization in the presence of a radical polymerization initiator.

As the radical polymerization initiator, azo compounds and peroxides hitherto known can be widely used. Examples of the azo compounds include 2,2'-azobisisobutyronitrile, 2,2'-azobis(2-methylbutyronitrile) and 2,2'-azobis(2,4-dimethylvaleronitrile). Examples of the peroxides include benzoyl peroxide, tert-butyl peroxyacetate, tert-butyl peroxyoctate, cumene hydroperoxide, tert-butyl peroxide, tert-butyl peroxybenzoate, tert-butyl peroxyisopropyl carbonate, tert-butyl hydroperoxide and persulfates (potassium salt, ammonium salt).

When the resulting polymer is used for an antifouling paint, solution polymerization and bulk polymerization wherein polymerization is carried out in an organic solvent are preferable out of the above-mentioned various polymerization processes.

Examples of the organic solvents used in the solution polymerization include:

aromatic hydrocarbons, such as xylene and toluene;

aliphatic hydrocarbons, such as hexane and heptane;

esters, such as ethyl acetate and butyl acetate;

alcohols, such as isopropyl alcohol and butyl alcohol;

ethers, such as dioxane and diethyl ether; and ketones, such as methyl ethyl ketone and methyl isobutyl ketone.

These solvents are used singly or in combination of two or more kinds.

Second Silyl (Meth)acrylate Copolymer (A-2)

The second silyl (meth)acrylate copolymer (A-2) of the invention comprises silyl (meth)acrylate constituent units (d) represented by the formula (III), silyl (meth)acrylate constituent units (e) represented by the formula (IV) and unsaturated monomer constituent units (f) other than the constituent units (d) and (e).

The constituent units (d), (e) and (f) for constituting the silyl (meth)acrylate copolymer (A-2) are described below in this order.

Silyl (Meth)acrylate Constituent Unit (d)

The silyl (meth)acrylate constituent unit (d) is represented by the following formula (III).

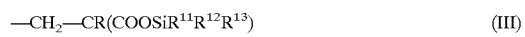

—CH$_2$—CR(COOSiR$^{11}$R$^{12}$R$^{13}$)   (III)

In the formula (III), R is a hydrogen atom or a methyl group, and R$^{11}$ and R$^{12}$ are each independently a straight-chain alkyl group of 1 to 10 carbon atoms, preferably 1 to 8 carbon atoms, more preferably 1 to 6 carbon atoms, a phenyl group which may have a substituent group or a trimethylsilyloxy group. Examples of the straight-chain alkyl groups include methyl, ethyl, n-propyl, n-butyl, n-pentyl, n-hexyl, n-heptyl, n-octyl, n-nonyl and n-decyl.

Examples of the substituent groups which can be substituted for hydrogen atoms in the phenyl group include alkyl, aryl and halogen.

R$^{13}$ is an alkyl group of 1 to 18 carbon atoms, preferably 1 to 12 carbon atoms, more preferably 1 to 9 carbon atoms, which may have a cyclic structure or a branch, a phenyl group of 6 to 10 carbon atoms, preferably 6 to 8 carbon atoms, which may have a substituent group, or a trimethylsilyloxy group represented by (CH$_3$)$_3$SiO—.

Examples of the alkyl groups include:

the straight-chain alkyl groups exemplified above;

branched alkyl groups, such as isopropyl, isobutyl, sec-butyl, tert-butyl and neopentyl; and alicyclic alkyl groups having alicyclic structure (cyclohexane ring, norbornan ring), such as cyclohexyl and ethylidenenorbornyl.

Although R$^{11}$, R$^{12}$ and R$^{13}$ may be the same or different, they are each preferably methyl, ethyl, n-propyl, n-butyl, n-hexyl or trimethylsilyloxy, and particularly preferably methyl, n-propyl, n-butyl and n-hexyl.

The silyl (meth)acrylate (dl), from which the silyl (meth) acrylate constituent unit (d) is derived, is represented by the following formula (III-d).

CH$_2$=CR(COOSiR$^{11}$R$^{12}$R$^{13}$)   (III-d)

In the formula (III-d), R is the same as R in the formula (III) and is a hydrogen atom or a methyl group, R$^{11}$ and R$^{12}$ are the same as $R^{11}$ and $R^{12}$ in the formula (III) and are each independently a straight-chain alkyl group of 1 to 10 carbon atoms, a phenyl group which may have a substituent group or a trimethylsilyloxy group, and $R^{13}$ is the same as $R^{13}$ in the formula (III) and is an alkyl group of 1 to 18 carbon atoms which may have a cyclic structure or a branch, a phenyl group of 6 to 10 carbon atoms which may have a substituent group or a trimethylsilyloxy group.

Examples of the silyl (meth)acrylates (III-d) include:

aliphatic silyl (meth)acrylates wherein $R^{11}$, $R^{12}$ and $R^{13}$ are the same as one another, such as trimethylsilyl (meth)acrylate, triethylsilyl (meth)acrylate, tri-n-propylsilyl (meth)acrylate, tri-n-butylsilyl (meth) acrylate, tri-n-pentylsilyl (meth)acrylate, tri-n-hexylsilyl (meth)acrylate, tri-n-heptylsilyl (meth) acrylate, tri-n-octylsilyl (meth)acrylate, tri-n-nonylsilyl (meth)acrylate and tri-n-decylsilyl (meth)acrylate;

aromatic or siloxane type silyl (meth)acrylates wherein $R^{11}$, $R^{12}$ and $R^{13}$ are the same as one another, such as triphenylsilyl (meth)acrylate and tris (trimethylsilyloxy)silyl (meth)acrylate; and aliphatic silyl (meth)acrylates wherein $R^1l$, $R^{12}$ and $R^{13}$ are partly or entirely different from one another, such as dimethyl-n-propylsilyl (meth)acrylate, isopropyldimethylsilyl (meth)acrylate, di-n-butyl-isobutylsilyl (meth)acrylate, n-hexyldimethylsilyl (meth)acrylate, sec-butyldimethylsilyl (meth)acrylate, monomethyl-di-n-propylsilyl (meth)acrylate, methylethyl-n-propylsilyl (meth)acrylate, ethylidenenorbornyldimethylsilyl (meth)acrylate, trimethylsilyloxydimethylsilyl (meth) acrylate $(CH_2=C(CH_3)COOSi(CH_3)_2(OSi(CH_3)_3)$, and $CH_2=CHCOOSi(CH_3)_2(OSi(CH_3)_3))$.

In the present invention, such silyl (meth)acrylates (III-d) can be used singly or in combination of two or more kinds.

Silyl (Meth)acrylate Constituent Unit (e)

The silyl (meth)acrylate constituent unit (e) is represented by the following formula (IV).

$$-CH_2-CR(COOSiR^{14}R^{15}R^{16}) \qquad (IV)$$

In the formula (IV), R is a hydrogen atom or a methyl group, and $R^{14}$ and $R^{15}$ are each independently a branched alkyl group of 3 to 10 carbon atoms, preferably 3 to 8 carbon atoms, or a cycloalkyl group of 3 to 10 carbon atoms, preferably 3 to 9 carbon atoms.

Examples of the branched alkyl groups include the same ones as in the formula (III), such as isopropyl, isobutyl, sec-butyl, tert-butyl, and neopentyl.

Examples of the cycloalkyl groups include cyclohexyl and ethylidenenorbornyl.

$R^{16}$ is a straight-chain alkyl group of 1 to 10 carbon atoms, preferably 1 to 8 carbon atoms, more preferably 1 to 6 carbon atoms, a branched alkyl or cycloalkyl group of 3 to 10 carbon atoms, preferably 3 to 9 carbon atoms, a phenyl group of 6 to 10 carbon atoms, preferably 6 to 8 carbon atoms, which may have a substituent group, or a trimethylsilyloxy group.

Examples of the straight-chain alkyl groups, the branched alkyl or cycloalkyl groups and the phenyl groups of $R^{15}$ include the same groups as described above.

$R^{14}$, $R^{15}$ and $R^{16}$ may be the same or different. When they are the same, they are preferably isopropyl, sec-butyl or isobutyl, particularly preferably isopropyl or sec-butyl.

When $R^{14}$, $R^{15}$ and $R^{16}$ are partly or entirely different, $R^{14}$ and $R^{15}$ are each preferably isopropyl, isobutyl, sec-butyl or tert-butyl although they may be the same or different, and $R^{16}$ is preferably methyl, ethyl, propyl, isopropyl, n-butyl, isobutyl or trimethylsilyloxy.

The silyl (meth)acrylate (e1), from which the silyl (meth) acrylate constituent unit (e) is derived, is represented by the following formula (IV-d).

$$CH_2=CR(COOSiR^{14}R^{15}R^{16}) \qquad (IV\text{-}d)$$

In the formula (IV-d), R is the same as R in the formula (IV) and is a hydrogen atom or a methyl group, $R^{14}$ and $R^{15}$ are the same as $R^{14}$ and $R^{15}$ in the formula (IV) and are each independently a branched alkyl group of 3 to 10 carbon atoms or a cycloalkyl group of 3 to 10 carbon atoms, and $R^{16}$ is the same as $R^{16}$ in the formula (IV) and is a straight-chain alkyl group of 1 to 10 carbon atoms, a branched alkyl or cycloalkyl group of 3 to 10 carbon atoms, a phenyl group of 6 to 10 carbon atoms which may have a substituent group or a trimethylsilyloxy group.

Examples of the silyl (meth)acrylates (IV-d) include:

silyl (meth)acrylates wherein $R^{14}$, $R^{15}$ and $R^{16}$ are the same as one another, such as triisopropylsilyl (meth) acrylate, triisobutylsilyl (meth)acrylate and tri-sec-butylsilyl (meth)acrylate; and silyl (meth)acrylates wherein $R^{14}$, $R^{15}$ and $R^{16}$ are partly or entirely different from one another, such as diisopropylcyclohexylsilyl (meth)acrylate, diisopropylphenylsilyl (meth)acrylate, diisopropyltrimethylsiloxysilyl (meth)acrylate, di-sec-butylmethylsilyl (meth)acrylate, di-sec-butylethylsilyl (meth)acrylate, di-sec-butyltrimethylsilyloxysilyl (meth)acrylate and isopropyl-sec-butylmethylsilyl (meth)acrylate.

In the present invention, such silyl (meth)acrylates (IV-d) can be used singly or in combination of two or more kinds.

When ease of synthesis of the silyl (meth)acrylate copolymer and film-forming properties, storage stability and polishing-cleaning controllability of an antifouling paint composition using the silyl (meth)acrylate copolymer are taken into consideration, of such silyl (meth)acrylate, it is preferable to use a combination of at least one compound selected from trimethylsilyl (meth)acrylate, triethylsilyl (meth)acrylate, tri-n-propylsilyl (meth)acrylate, tri-n-butylsilyl (meth)acrylate, n-hexyldimethylsilyl (meth) acrylate, n-octyldimethylsilyl (meth)acrylate, isopropyldimethylsilyl (meth)acrylate, ethylidenenorbornyldimethylsilyl (meth)acrylate, trimethylsilyloxydimethylsilyl (meth) acrylate, bis(trimethylsilyloxy)methylsilyl (meth)acrylate and tris(trimethylsilyloxy)silyl (meth)acrylate as the silyl (meth)acrylate (III-d) and at least one compound selected from triisopropylsilyl (meth)acrylate, triisobutylsilyl (meth) acrylate, tri-sec-butylsilyl (meth)acrylate, di-sec-butylmethylsilyl (meth)acrylate, di-isopropyltrimethylsilyloxysilyl (meth)acrylate and di-sec-butyltrimethylsilyloxysilyl (meth)acrylate as the silyl (meth)acrylate (IV-d). It is more preferable to use a combination of tri-n-butylsilyl (meth)acrylate as the silyl (meth) acrylate (III-d) and triisopropylsilyl (meth)acrylate as the silyl (meth)acrylate (IV-d).

Unsaturated Monomer Constituent Unit (f)

The unsaturated monomer constituent unit (f) constitutes the silyl (meth)acrylate copolymer of the invention together with the constituent units (d) and (e), and is different from any of the constituent units (d) and (e).

Examples of the unsaturated monomers (f1) from which the unsaturated constituent unit (f) can be derived include:

hydrophobic (meth)acrylic esters, such as methyl (meth) acrylate, ethyl (meth)acrylate, n-, iso-, or tert-butyl (meth)acrylate, 2-ethylhexyl (meth)acrylate and cyclohexyl (meth)acrylate;

hydrophilic (meth)acrylic esters, such as 2-hydroxyethyl (meth)acrylate, 2-hydroxypropyl (meth)acrylate, 2-hydroxybutyl (meth)acrylate, 4-hydroxybutyl (meth) acrylate, 2-methoxyethyl (meth)acrylate, methylpolyoxyethylene (meth)acrylate and methylpolyoxypropylene (meth)acrylate;

styrenes, such as styrene, vinyltoluene and α-methylstyrene;

vinyl esters, such as vinyl acetate, vinyl benzoate, vinyl propionate and vinyl butyrate; and organic carboxylic esters, such as itaconic esters and maleic esters.

Of these, preferable are (meth)acrylic esters, styrenes and vinyl esters of organic carboxylic acids because an antifouling coating film having proper strength of coating film can be obtained.

When the hydrophilic (meth)acrylic esters are used, degree of consumption of the coating film can be increased. For this purpose, comonomers having hydrophilic nature, such as acrylamide derivatives, are also employable.

These unsaturated monomers (f1) are used singly or in combination of two or more kinds.

In the silyl (meth)acrylate copolymer of the invention, the silyl (meth)acrylate constituent units (d) are desirably contained in amounts of 0.5 to 50% by weight, preferably 0.5 to 25% by weight, the silyl (meth)acrylate constituent units (e) are desirably contained in amounts of 10 to 70% by weight, preferably 30 to 65% by weight, and the unsaturated monomer constituent units (f) other than the constituent units (d) and (e) are desirably contained in amounts of 20 to 70% by weight, preferably 30 to 60% by weight, with the proviso that the total amount of the constituent units (d), (e) and (f) is 100% by weight, from the viewpoints of prevention of crack occurrence, peel resistance, strength and degree of consumption of a coating film.

The weight-average molecular weight of the silyl (meth) acrylate copolymer (A-2), as measured by gel permeation chromatography (GPC), is desired to be not more than 200,000, preferably 3,000 to 100,000, particularly preferably 5,000 to 50,000, from the viewpoints of ease of preparation of an antifouling paint containing the silyl (meth)acrylate copolymer, painting workability of the resulting antifouling paint, consumption rate of an antifouling coating film, and crack resistance of the coating film.

Preparation of Silyl (Meth)acrylate Copolymer (A-2)

The silyl (meth)acrylate copolymer (A-2) can be obtained by random polymerizing 0.5 to 50% by weight of the silyl (meth)acrylate (d1) represented by the formula (III-d), 10 to 70% by weight of the silyl (meth)acrylate (e1) represented by the formula (IV-d) and 20 to 70% by weight of another unsaturated monomer (f1) copolymerizable with the monomers (d1) and (e1), the total amount of said components (d1), (e1) and (f1) being 100% by weight, by various processes such as solution polymerization, bulk polymerization, emulsion polymerization and suspension polymerization in the presence of a radical polymerization initiator.

As the radical polymerization initiator, azo compounds and peroxides hitherto known can be widely used. Examples of the azo compounds include 2,2'-azobisisobutyronitrile, 2,2'-azobis(2-methylbutyronitrile) and 2,2'-azobis(2,4-dimethylvaleronitrile). Examples of the peroxides include benzoyl peroxide, tert-butyl peroxyacetate, tert-butyl peroxyoctate, cumene hydroperoxide, tert-butyl peroxide, tert-butyl peroxybenzoate, tert-butyl peroxyisopropyl carbonate, tert-butyl hydroperoxide and persulfates (potassium salt, ammonium salt).

When the resulting polymer is used for an antifouling paint, solution polymerization and bulk polymerization wherein polymerization is carried out in an organic solvent are preferable out of the above-mentioned various polymerization processes.

Examples of the organic solvents used in the solution polymerization include:

aromatic hydrocarbons, such as xylene and toluene;

aliphatic hydrocarbons, such as hexane and heptane;

esters, such as ethyl acetate and butyl acetate;

alcohols, such as isopropyl alcohol and butyl alcohol;

ethers, such as dioxane and diethyl ether; and ketones, such as methyl ethyl ketone and methyl isobutyl ketone.

These solvents are used singly or in combination of two or more kinds.

Uses of the First and the Second Silyl (Meth) acrylate Copolymers (A-1) and (A-2)

The first silyl (meth)acrylate copolymer (A-1) and the second silyl (meth)acrylate copolymer (A-2) of the invention obtained as above are each favorably used as a film-forming component and an elution controlling component of a paint, particularly an antifouling paint.

The antifouling paint composition using the first silyl (meth)acrylate copolymer (A-1) or the second silyl (meth) acrylate copolymer (A-2) is described below.

Antifouling Paint Composition

The antifouling paint composition of the invention contains the silyl (meth)acrylate copolymer (A-1) or (A-2), and further contains various additives.

In the antifouling paint composition (P) of the invention, the first silyl (meth)acrylate copolymer (A-1) is contained as a film-forming component.

In the antifouling paint composition (Q) of the invention, at least the first silyl (meth)acrylate copolymer (A-1), an antifouling agent (B) whose representatives are copper and/or a copper compound, and a vinyl ether (co)polymer (E) and/or an elution accelerating component (F) are contained.

In the antifouling paint composition (R), the second silyl (meth)acrylate copolymer (A-2) is contained as a film-forming component and an elution controlling component.

According to the antifouling paint composition containing the silyl (meth)acrylate copolymer (A-1) or (A-2), there can be obtained an antifouling coating film which hardly suffers from occurrence of cracks, has excellent adhesive strength and thereby hardly suffers from peeling, can be favorably controlled in the hydrolysis rate, and is excellent in antifouling performance, antifouling properties, particularly antifouling properties in a highly fouling environment, and long-term antifouling properties.

First Antifouling Paint Composition (P)

The first antifouling paint composition (P) of the invention contains the silyl (meth)acrylate copolymer (A-1) (sometimes referred to as a "(meth)acrylic silyl ester copolymer (A-1)") as its essential component, and may further contain, in addition to the silyl (meth)acrylate copolymer (A-1), various additives, e.g., an antifouling agent (B) such as copper and/or a copper compound (B-1) or a pyrithione compound (B-2), zinc oxide (zinc white) (C), an inorganic dehydrating agent (D), an anti-sagging anti-settling agent, an elusion accelerating component such as rosin, a plasticizer such as chlorinated paraffin, a pigment such as coloring pigment or extender pigment, a resin such as acrylic resin or polyalkyl vinyl ether (vinyl ether (co)polymer), an anti-foaming agent, a color separation inhibitor and a leveling agent.

Second Antifouling Paint Composition (O)

The second antifouling paint composition (Q) of the invention contains, as its essential components, the silyl (meth)acrylate copolymer (A-1), an antifouling agent (B), and a vinyl ether (co)polymer (E) and/or an elution accelerating component (F), and may further contain, in addition to the components (A-1), (B), and (E) (and/or (F)), various additives, e.g., zinc oxide (zinc white), an inorganic dehydrating agent, an anti-sagging anti-settling agent, a plasticizer such as chlorinated paraffin, a pigment such as coloring pigment or extender pigment, a resin other than the vinyl ether (co)polymer (E), such as acrylic resin, an anti-foaming agent, a color separation inhibitor and a leveling agent.

Third Antifouling Paint Composition (R)

The third antifouling paint composition (R) of the invention contains the silyl (meth)acrylate copolymer (A-2) (sometimes referred to as a "(meth)acrylic silyl ester copolymer (A-2)") as its essential component, and may further contain, in addition to the silyl (meth)acrylate copolymer (A-2), various additives, e.g., an antifouling agent (B) such as copper and/or an inorganic copper compound (B-3), zinc oxide (zinc white) (C), a dehydrating agent such as an inorganic dehydrating agent (D), an anti-sagging anti-settling agent, an elusion accelerating component (F) such as rosin, a plasticizer such as chlorinated paraffin, a pigment such as coloring pigment or extender pigment, a resin such as acrylic resin or polyalkyl vinyl ether (vinyl ether (co) polymer (E)), an anti-foaming agent, a color separation inhibitor and a leveling agent.

Next, the essential components other than the silyl (meth)acrylate copolymers (A-1) and (A-2) and various additives are described.

Antifouling Agent (B)

The antifouling agent (B) may be any of inorganic type and organic type.

Although various antifouling agents hitherto known can be widely used in the invention, p1 when the antifouling agent (B) is introduced into the first antifouling paint composition (P), copper and/or a copper compound (B-1) or a pyrithione compound (B-2) is preferable;

when the antifouling agent (B) is introduced into the second antifouling paint composition (Q), copper and/or a copper compound (B-1) is preferable; and when the antifouling agent (B) is introduced into the third antifouling paint composition (R), copper and/or a copper compound (B-1) (particularly copper and/or an inorganic copper compound (B-3)) or an organic antifouling agent (B-4) such as metal pyrithione is preferable.

The copper and/or the copper compound (B-1) (except pyrithione, the same shall apply hereinafter) to be introduced into the antifouling paint composition of the invention is described below. The copper and/or the copper compound used herein has a molecular weight of usually 63.5 to 2,000, preferably 63.5 to 1,000.

The copper compound (B-1) may be any of organic type and inorganic type. Examples of inorganic copper compounds (B-3) include cuprous oxide, copper thiocyanate (cuprous thiocyanate, copper rhodanide), basic copper sulfate, copper chloride and copper oxide. Examples of organic copper compounds include basic copper acetate, oxine copper, copper nonylphenolsulfonate, copper bis (ethylenediamine)-bis(dodecylbenzenesulfonate), copper naphthenate, copper rosinate and copper bis (pentachlorophenolate). Of these, inorganic copper compounds, particularly cuprous oxide and copper thiocyanate (copper rhodanide), are preferably used.

Such copper compounds can be used singly or in combination of two or more kinds, with or without copper.

The copper and/or the copper compound is desirably contained in the antifouling paint composition (P), (Q) or (R) of the invention in the total amount of usually 1 to 70% by weight, preferably 3 to 65% by weight. Further, based on 100 parts by weight of the silyl (meth)acrylate copolymer (A-1) or (A-2) contained in the antifouling paint composition, the copper and/or the copper compound (B-1) is desirably contained in the total amount of usually 3 to 1,400 parts by weight, preferably 10 to 1,300 parts by weight.

When the copper and/or the copper compound is contained in the antifouling paint composition (P), (Q) or (R) in the amount mentioned above, the paint composition tends to have excellent antifouling properties.

In the present invention, an organic antifouling agent (B-4) is preferably used together with the copper and/or the copper compound (B-1) (particularly copper and/or inorganic copper compound (B-3) in the antifouling paint composition (R)) or in place of the copper and/or the copper compound. The organic antifouling agent is, for example, a pyrithione compound (B-2) represented by the following formula (VI) (i.e., metal pyrithione).

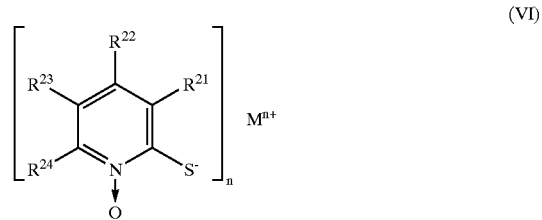

(VI)

wherein $R^{21}$ to $R^{24}$ are each independently hydrogen, an alkyl group, an alkoxy group, a halogenated alkyl group, M is a metal such as Zn, Cu, Na, Mg, Ca, Ba, Pb, Fe or Al, and n is a valence of the metal.

The pyrithione compound(s) (B-2) are desirably contained in the antifouling paint composition (P), (Q) or (R) in the (total) amount of usually 0.1 to 15% by weight, preferably 0.5 to 10% by weight. Further, based on 100 parts by weight of the silyl (meth)acrylate copolymer (A-1) or (A-2) contained in the antifouling paint composition (P), (Q) or (R), the pyrithione compound(s) (B-2) are desirably contained in the (total) amount of usually 0.3 to 300 parts by weight, preferably 2 to 200 parts by weight.

In the present invention, the following antifouling agents (other antifouling agents) may be contained together with the pyrithione compound (B-2) or in place of the pyrithione compound. As the other antifouling agents, those hitherto known can be widely used, and examples thereof include tetramethylthiuram disulfide, carbamate type compounds such as zinc dimethyldithiocarbamate and manganese 2-ethylenebis-dithiocarbamate, 2,4,5,6-tetrachloroisophthalonitrile, N,N-dimethyldichlorophenylurea, 2-methylthio-4-tert-butylamino-6-cyclopropylamino-s-triazine, 4,5-dichloro-2-n-octyl-4-isothiazoline-3-one, 2,4,6-trichlorophenylmaleimide, pyridine-triphenylborane and amine-triphenylborane.

In the present invention, such antifouling agents can be used singly or in combination of two or more kinds, together with the pyrithione compound (metal pyrithione) such as zinc pyrithione (corresponding to a compound of the above formula (VI) wherein $R^{21}$ to $R^{24}$ are each H, M is Zn, and N is 2) or copper pyrithione (corresponding to a compound of the above formula (VI) wherein $R^{21}$ to $R^{24}$ are each H, M is Cu, and N is 2). For example, copper pyrithione and/or zinc pyrithione can be used in combination with 4,5-dichloro-2-n-octyl-4-isothiazoline-3-one.

The amounts of various antifouling agents such as the copper and/or the copper compound (B-1) and the pyrithione compound (B-2) contained in the antifouling paint composition (P), (Q) or (R) depend upon the types of the antifouling agents and the film-forming copolymer used in the preparation of the antifouling paint composition and the types of hulls (e.g., for ocean or coastal area, for various sea areas, made of wood or steel) to be coated with the antifouling paint composition, and cannot be determined discriminatingly. However, the total amount thereof is desired to be in the range of usually 10 to 1,400 parts by weight, preferably 20 to 1,300 parts by weight, based on 100 parts by weight of the silyl (meth)acrylate copolymer (A-1) or (A-2).

If the total amount of the antifouling agents is less than 10 parts by weight, the antifouling paint composition sometimes has poor antifouling properties. Even if the total amount thereof exceeds 1,400 parts by weight, antifouling properties higher than a certain extent cannot be expected, and besides the crack resistance may become poor.

When zinc pyrithione and cuprous oxide ($Cu_2O$) are used in combination as the antifouling agents of the antifouling paint composition (P), zinc pyrithione may be contained in an amount of 2 to 200 parts by weight based on 100 parts by weight of the silyl (meth)acrylate copolymer, and cuprous oxide may be contained in an amount of usually about 10 to 1,300 parts by weight based on 100 parts by weight of the silyl (meth)acrylate copolymer. Even if zinc pyrithione and cuprous oxide are contained in combination as described above, the antifouling paint composition has excellent storage stability and is neither thickened nor gelatinized when stored, differently from the aforesaid conventional antifouling paints.

When copper pyrithione and cuprous oxide ($Cu_2O$) are used in combination as the antifouling agents of the antifouling paint composition (Q) or (R), copper pyrithione may be contained in an amount of 2 to 200 parts by weight based on 100 parts by weight of the silyl (meth)acrylate copolymer (A-1) or (A-2), and cuprous oxide may be contained in an amount of usually about 10 to 1,300 parts by weight based on 100 parts by weight of the silyl (meth)acrylate copolymer (A-1) or (A-2).

Zinc Oxide (Zinc White) (C)

In the antifouling paint composition (P), (Q) or (R) of the invention, zinc oxide (zinc white) (C) may be contained. By the use of the antifouling paint composition containing zinc oxide, the strength of the resulting coating film can be enhanced and the polishing-cleaning properties thereof can be effectively controlled.

The zinc oxide is desirably contained in the antifouling paint composition in an amount of usually 0.5 to 35% by weight, preferably 1 to 25% by weight, from the viewpoints of adjustments of degree of consumption and hardness of the coating film.

Dehydrating Agent

In the antifouling paint composition (P), (Q) or (R) of the invention, a dehydrating agent of inorganic type or organic type, preferably a dehydrating agent of inorganic type (inorganic dehydrating agent (D)), may be contained. By introducing the dehydrating agent into the antifouling paint composition, the storage stability of the paint composition can be much more enhanced.

Examples of the dehydrating agents include anhydrous gypsum ($CaSO_4$), synthetic zeolite type adsorbents (e.g., trade name: Molecular Sieves), orthoesters such as methyl orthoformate and methyl orthoacetate, orthoboric esters, silicates and isocyanates (e.g., trade name: Additive T1). Particularly, anhydrous gypsum or Molecular Sieves is preferably used as the inorganic dehydrating agent (D). Such inorganic dehydrating agents can be used singly or in combination of two or more kinds.

The dehydrating agent, particularly inorganic dehydrating agent, is desirably added in an amount of usually 0.02 to 100 parts by weight, preferably 0.2 to 50 parts by weight, based on 100 parts by weight of the silyl(meth)acrylate copolymer (A-1) or (A-2).

The inorganic dehydrating agent(s) are desirably contained in the antifouling paint composition (P), (Q) or (R) in the (total) amount of usually 0.01 to 10% by weight, preferably 0.1 to 5% by weight. If the inorganic dehydrating agent is contained in the antifouling paint composition in this amount, the storage stability of the paint composition tends to be enhanced.

Vinyl Ether (Co)polymer (E)

The vinyl ether (co)polymer (E) for use in the invention is a (co)polymer containing constituent units derived from a vinyl ether represented by the following formula (V):

$$H_2C=CHO-R \qquad (V)$$

wherein R is a hydrocarbon group.

The vinyl ether (V) has a vinyl ether linkage ($H_2C=CH-O-$). The hydrocarbon group R in the formula (V) is, for example, an aliphatic or aromatic hydrocarbon group usually having 1 to 25 carbon atoms, and the hydrocarbon group may be straight-chain or branched or may have an alicyclic structure such as a cyclohexyl ring. The carbon atom $C^1$ for constituting the hydrocarbon group (having 2 carbon atoms or more) may form, together with the carbon atom $C^2$ contained in the alkyl group and adjacent to the carbon atom $C^1$, an ether linkage ($C^1-O-C^2$) through an oxygen atom. The hydrogen atoms for constituting the hydrocarbon group may be replaced with other functional groups (e.g., $-OH$, $-NH_2$).

More specifically, R in the formula (V) is a monovalent hydrocarbon group, and examples of the monovalent hydrocarbon groups include an alkyl group and a phenyl group which may have a substituent group.

The vinyl ether (co)polymer (E) desirably is a homopolymer of a vinyl ether represented by the formula (V) or a vinyl ether copolymer containing as its major component the vinyl ether (V) in an amount of not less than 50% by weight (both polymers are sometimes generically referred to as "vinyl ether (co)polymer").

Examples of the vinyl ether (co)polymers include polyvinyl methyl ether, polyvinyl ethyl ether, polyvinyl isopropyl ether and polyvinyl isobutyl ether.

In the antifouling paint composition, the vinyl ether (co)polymer(s) are desirably contained in the (total) amount of usually 0.1 to 10% by weight, preferably 0.2 to 5% by weight. Further, based on 100 parts by weight of the silyl (meth)acrylate copolymer contained in the antifouling paint composition, the vinyl ether (co)polymer(s) are desirably contained in the (total) amount of usually 0.3 to 60 parts by weight, preferably 0.6 to 40 parts by weight.

When the vinyl ether (co)polymer is contained in the antifouling paint composition in the amount mentioned above, antifouling properties, crack resistance, peel resistance and elution rate stability of the resulting coating film tend to become excellent.

Elution Accelerating Component (F)

The elution accelerating component (F) for use in the invention has a function of accelerating self polishing of the coating film in seawater. Examples of the elution accelerating components include rosin (e.g., trade name: Rosin WW), derivatives thereof, monocarboxylic acids and salts thereof.

Examples of rosin include gum rosin, wood rosin and tall oil rosin, and any of them is employable in the invention. Examples of the rosin derivatives include disproportinated rosin, low-melting disproportionated rosin, hydrogenated rosin, polymerized rosin, maleic acid-modified rosin, aldehyde-modified rosin, polyoxyalkylene ester of rosin, reduced rosin (rosin alcohol), metallic salts of rosin and rosin derivatives (e.g., copper salt, zinc salt and magnesium salt of rosin and rosin derivatives), and rosin amine. These rosin and rosin derivatives can be used singly or in combination of two or more kinds.

Examples of the monocarboxylic acids include fatty acids having about 5 to 30 carbon atoms, synthetic fatty acids and naphthenic acid. Examples of the salts of monocarboxylic acids include Cu salt, Zn salt, Mg salt and Ca salt of monocarboxylic acids. Of these elution accelerating components, rosin, rosin derivatives and metallic salts of naphthenic acid are preferable. Such elution accelerating components can be used singly or in combination of two or more kinds. In the antifouling paint composition, the elution accelerating component(s) are desirably contained in the (total) amount of 0.1 to 30% by weight, preferably 0.1 to 20% by weight, more preferably 0.5 to 15% by weight, in terms of solid content. The proportion of the elution accelerating component(s) is desired to be in this range from the viewpoints of antifouling performance and water resistance of the coating film.

Further, based on 100 parts by weight of the silyl (meth) acrylate copolymer contained in the antifouling paint composition, the elution accelerating component(s) are desirably contained in the (total) amount of usually 0.3 to 600 parts by weight, preferably 2 to 300 parts by weight.

When the amount of the elution accelerating component contained in the antifouling paint composition is in the above range, antifouling properties and degree of consumption of the resulting coating film tend to become excellent.

Anti-sagging Anti-settling Agent

As the anti-sagging anti-settling agent, any of known anti-sagging anti-settling agents can be added in an arbitrary amount. Examples of the anti-sagging anti-settling settling agents include salts, such as stearates, lecithin salts and alkylsulfonates of Al, Ca and Zn, polyethylene wax, amide wax, hydrogenated castor oil wax, polyamide wax, mixtures of these waxes, synthetic powdered silica, and polyethylene oxide wax. Of these, preferable are hydrogenated castor oil wax, polyamide wax, synthetic powdered silica and polyethylene oxide wax. The anti-sagging anti-settling agents on the market are, for example, those under the trade names of "Disparon A-603-20X" and "Disparon 4200-20" available from Kusumoto Kasei K.K.

Pigment, Solvent

As the pigment, any of hitherto known various organic or inorganic pigments is employable, and examples thereof include titanium white, iron red oxide, organic red pigments and talc. Various colorants such as dyes may be contained.

By the use of a pigment in needle, flat or scaly form, the crack resistance of the coating film can be much more enhanced.

As the solvent, any of various solvents which are generally added to antifouling paints, such as those of aliphatic type, aromatic type (e.g., xylene, toluene), ketone type, ester type and ether type, is employable.

Preparation of Antifouling Paint Composition

Preparation of Antifouling Paint Composition (P)

The antifouling paint composition (P) according to the invention can be prepared by appropriately using hitherto known processes. For example, to the silyl (meth)acrylate copolymer (A-1), 3 to 1400 parts by weight of copper and/or a copper compound, 0 to 300 parts by weight of a pyrithione compound (total of antifouling agents (B): 25 to 1,200 parts by weight), 0.3 to 200 parts by weight of a vinyl ether (co)polymer (E), 2 to 700 parts by weight of zinc oxide that is optionally used, 0.03 to 200 parts by weight of a dehydrating agent (e.g., anhydrous gypsum, molecular sieves), and proper amounts of other additives such as an anti-sagging anti-settling agent, a pigment and a solvent, each amount being based on 100 parts by weight of the copolymer (A-1), are added at the same time or in an arbitrary order, followed by stirring, mixing and dispersing.

Preparation of Antifouling Paint Composition (O)

The antifouling paint composition (Q) according to the invention can be prepared by appropriately using hitherto known processes. For example, to the silyl (meth)acrylate copolymer (A-1), 3 to 1400 parts by weight of copper and/or a copper compound, 0 to 300 parts by weight of a pyrithione compound (total of antifouling agents (B): 25 to 1,200 parts by weight), 0.3 to 200 parts by weight of a vinyl ether (co)polymer (E), 0.5 to 500 parts by weight of an elution accelerating component (F), 2 to 700 parts by weight of zinc oxide that is optionally used, 0.03 to 200 parts by weight of a dehydrating agent (e.g., anhydrous gypsum, molecular sieves), and proper amounts of other additives such as an anti-sagging anti-settling agent, a pigment and a solvent, each amount being based on 100 parts by weight of the copolymer (A-1), are added at the same time or in an arbitrary order, followed by stirring, mixing and dispersing. In this process, it is possible to use any one of the components (E) and (F).

Preparation of Antifouling Paint Composition (R)

The antifouling paint composition (R) according to the invention can be prepared by appropriately using hitherto known processes. For example, to the silyl (meth)acrylate copolymer (A-2), 3 to 1400 parts by weight of copper and/or a copper compound (particularly copper and/or an inorganic copper compound (B-3)), 0 to 300 parts by weight of an organic antifouling agent (B-4) such as a pyrithione compound (total of antifouling agents (B): 25 to 1,200 parts by weight), 0.3 to 200 parts by weight of a vinyl ether (co) polymer (E), 2 to 700 parts by weight of zinc white (zinc oxide) (C) that is optionally used, 0.03 to 200 parts by weight of a dehydrating agent, particularly an inorganic dehydrating agent (D) (e.g., anhydrous gypsum, molecular sieves), and proper amounts of other additives such as an anti-sagging anti-settling agent, a pigment and a solvent, each amount being based on 100 parts by weight of the copolymer (A-2), are added at the same time or in an arbitrary order, followed by stirring, mixing and dispersing.

Antifouling Coating Film Formed From the Antifouling Paint Composition (P), (O) or (R), Antifouling Method Using the Antifouling Paint Composition, and Hull or Underwater Structure Coated With the Coating Film The antifouling paint compositions (P), (Q) and (R) are one-pack type, have excellent storage stability, and satisfy various property requirements of antifouling paints, such as adhesive strength, durability and antifouling properties.

By applying the antifouling paint compositions to surfaces of various molded articles, e.g., underwater structures (i.e., marine structures) such as water-supply or drain opening of the atomic power plant, coastal roads, undersea tunnels, port facilities, sludge-diffusion preventing films for various ocean civil engineering works such as channels and waterways, hulls, and fishing gears such as ropes and fishing nets, once to plural times in a conventional manner, there can be obtained hulls, underwater structures, etc. coated with antifouling coating films having excellent antifouling properties and crack resistance. The antifouling paint compositions may be applied directly to the surfaces of hulls, underwater structures, etc., or may be applied to the surfaces thereof having been previously coated with an undercoating material such as a rust preventive agent or a primer. The surfaces of hulls, underwater structures, etc. having been coated with the conventional antifouling paint or the antifouling paint composition (P), (Q) or (R) of the invention may be further coated with the antifouling paint composition (P), (Q) or (R) of the invention for the purpose of repair. There is no specific limitation on the thickness of the antifouling coating film formed on the surface of a hull, an underwater structure or the like, and the thickness thereof is, for example, in the range of about 30 to 150 pm per coating time.

EFFECT OF THE INVENTION

According to the present invention, there is provided a silyl (meth)acrylate copolymer (A-1) or (A-2) which can produce an antifouling paint capable of forming an antifouling coating film which hardly suffers from occurrence of cracks, has excellent adhesive strength and thereby hardly suffers from peeling, can be favorably controlled in the hydrolysis rate, is excellent in antifouling performance (antifouling activities), antifouling properties, particularly antifouling properties in a highly fouling environment, and long-term antifouling properties, and is well-balanced among these properties. A process for preparing the copolymer (A-1) or (A-2) is also provided.

According to the present invention, further, there is provided an antifouling paint composition (P), (Q) or (R) which is capable of forming an antifouling coating film which hardly suffers from occurrence of cracks, has excellent adhesive strength and thereby hardly suffers from peeling, can be favorably controlled in the hydrolysis rate, is excellent in antifouling performance (antifouling activities), antifouling properties, particularly antifouling properties in a highly fouling environment, and long-term antifouling properties, and is well-balanced among these properties.

According to the present invention, furthermore, there are provided a coating film having the above-mentioned excellent properties and a hull or an underwater structure which is coated with the coating film and has the above-mentioned excellent properties.

According to the present invention, moreover, an antifouling method using the above-mentioned antifouling paint composition and having extremely little fear of environmental pollution is provided.

EXAMPLE

The present invention is further described with reference to the following examples, but it should be construed that the invention is in no way limited to those examples. In the following examples and comparative examples, the term "part(s)" means part(s) by weight.

Polymer Preparation Example Preparation of Silyl (Meth)acrylate Copolymer (A-1)

A reactor equipped with a stirrer, a condenser, a thermometer, a dropping device, a nitrogen feed pipe and a heating/cooling jacket was charged with 100 parts of xylene, and the xylene was stirred under heating at a temperature of 85° C. in a stream of nitrogen. With maintaining the same temperature, a mixture of 50 parts of triisopropylsilyl acrylate, 45 parts of methyl methacrylate, 5 parts of 2-hydroxypropyl acrylate and 1 part of 2,2'-azobisisobutyronitrile (polymerization initiator) was dropwise added to the reactor over a period of 2 hours by means of the dropping device. After the reaction solution was stirred for 4 hours at the same temperature, 0.4 part of 2,2'-azobisisobutyronitrile was added, and the mixture was further stirred for 4 hours at the same temperature to obtain a colorless transparent solution of a silyl (meth)acrylate copolymer (A1-1).

Figure 20:
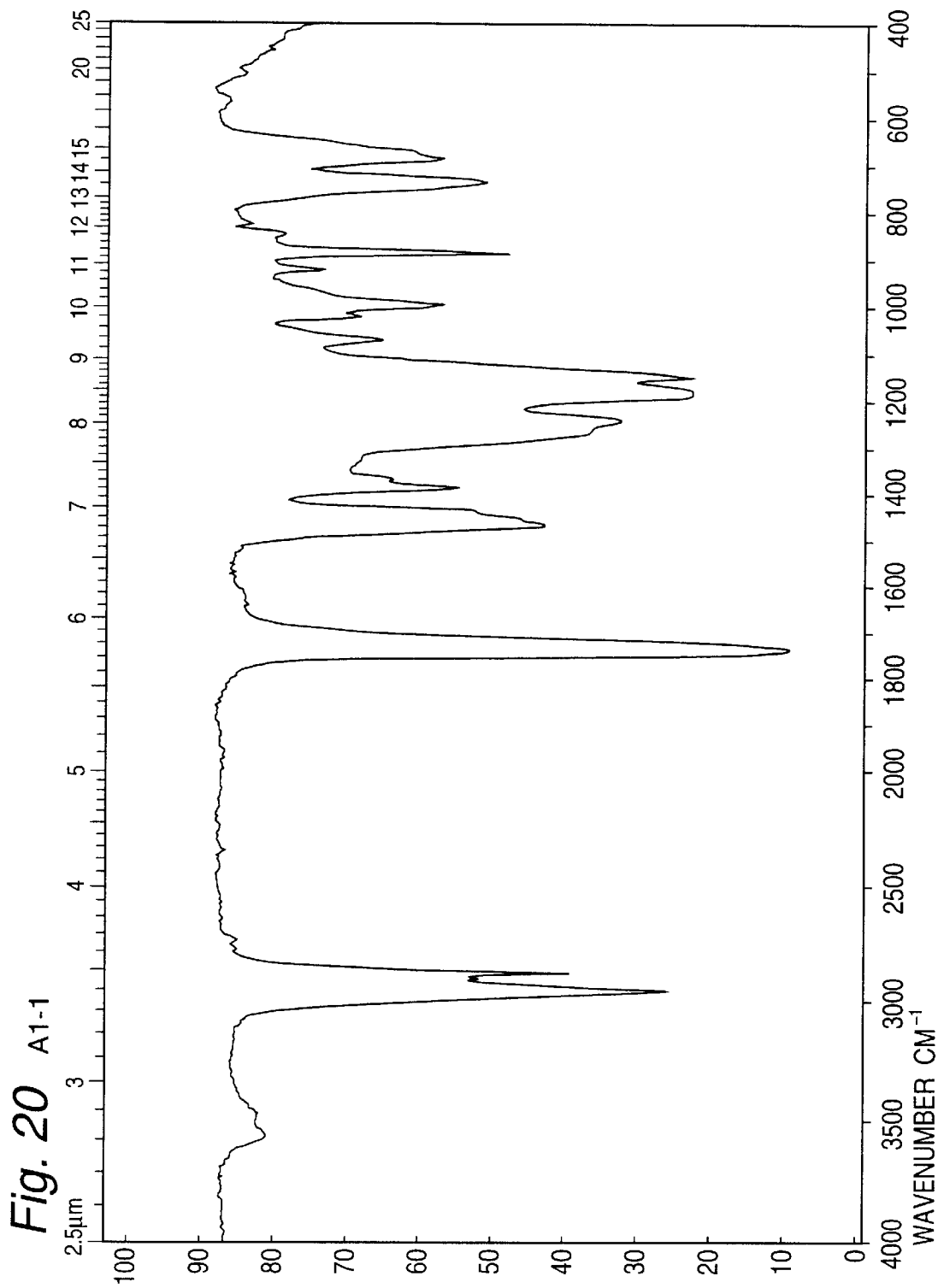
FIG. 20 is a chart of an IR spectrum of the copolymer A1-1.
Figure 21:
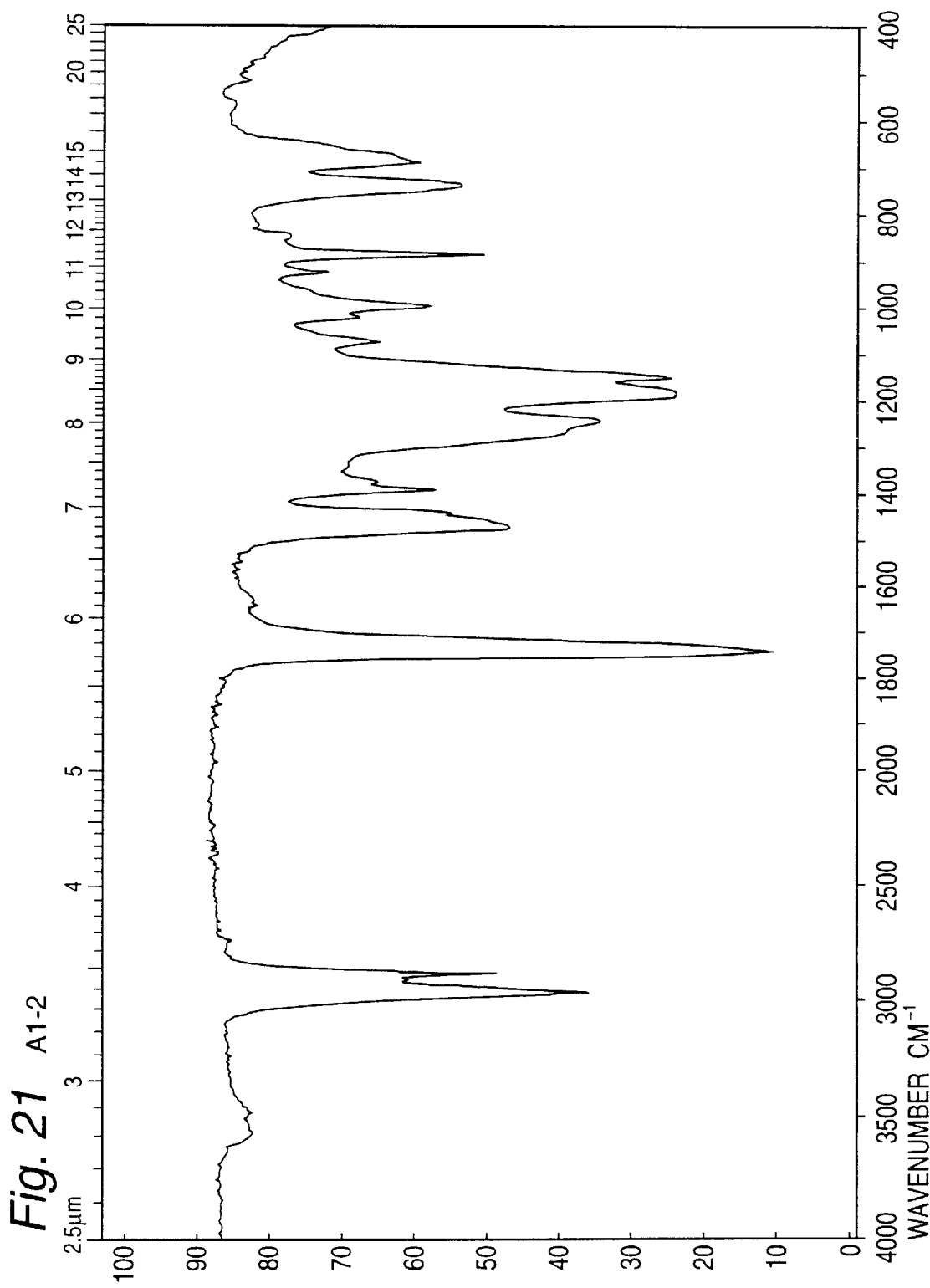
FIG. 21 is a chart of an IR spectrum of the copolymer A1-2.
Figure 22:
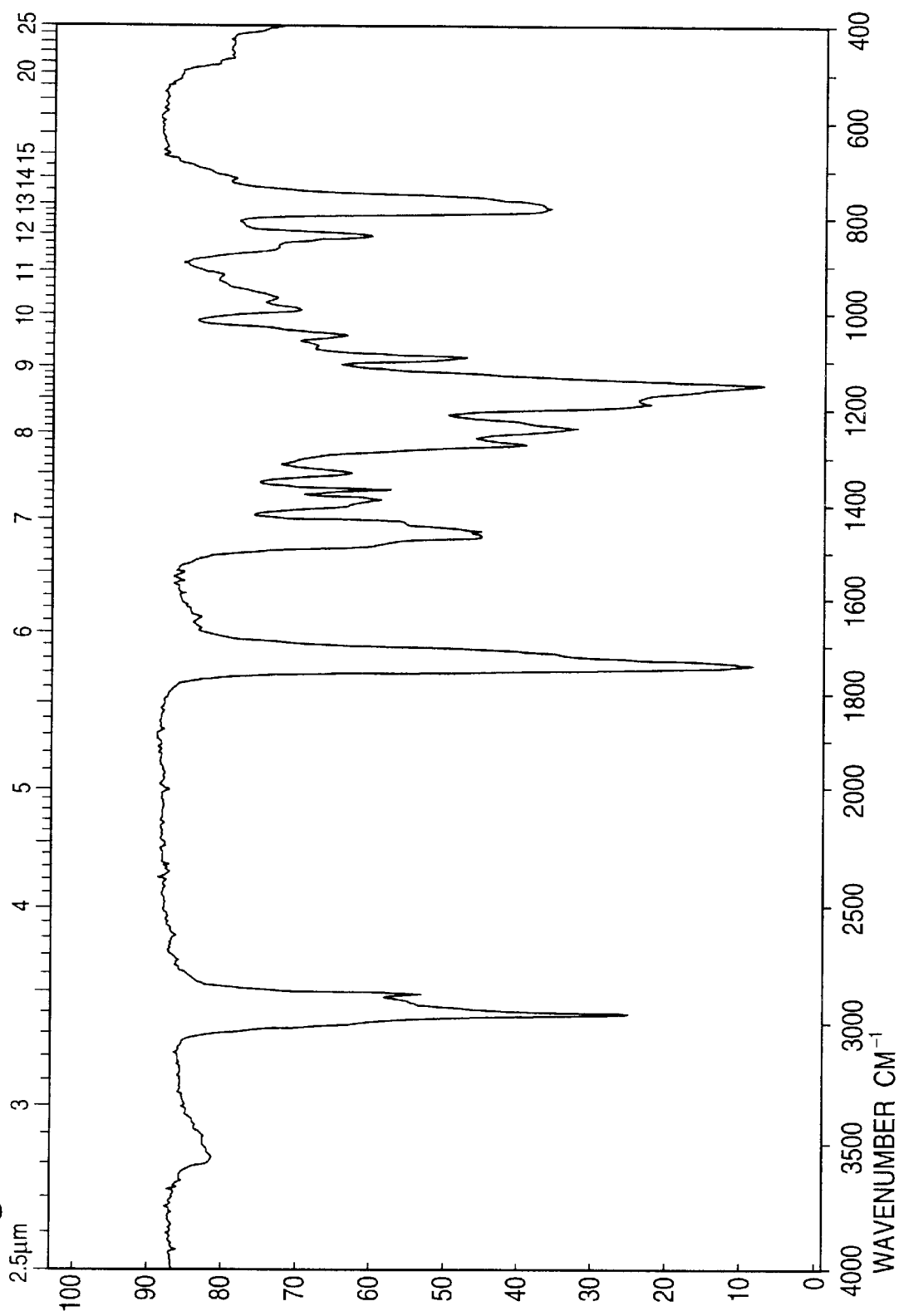
FIG. 22 is a chart of an IR spectrum of the copolymer A1-3.
Figure 23:
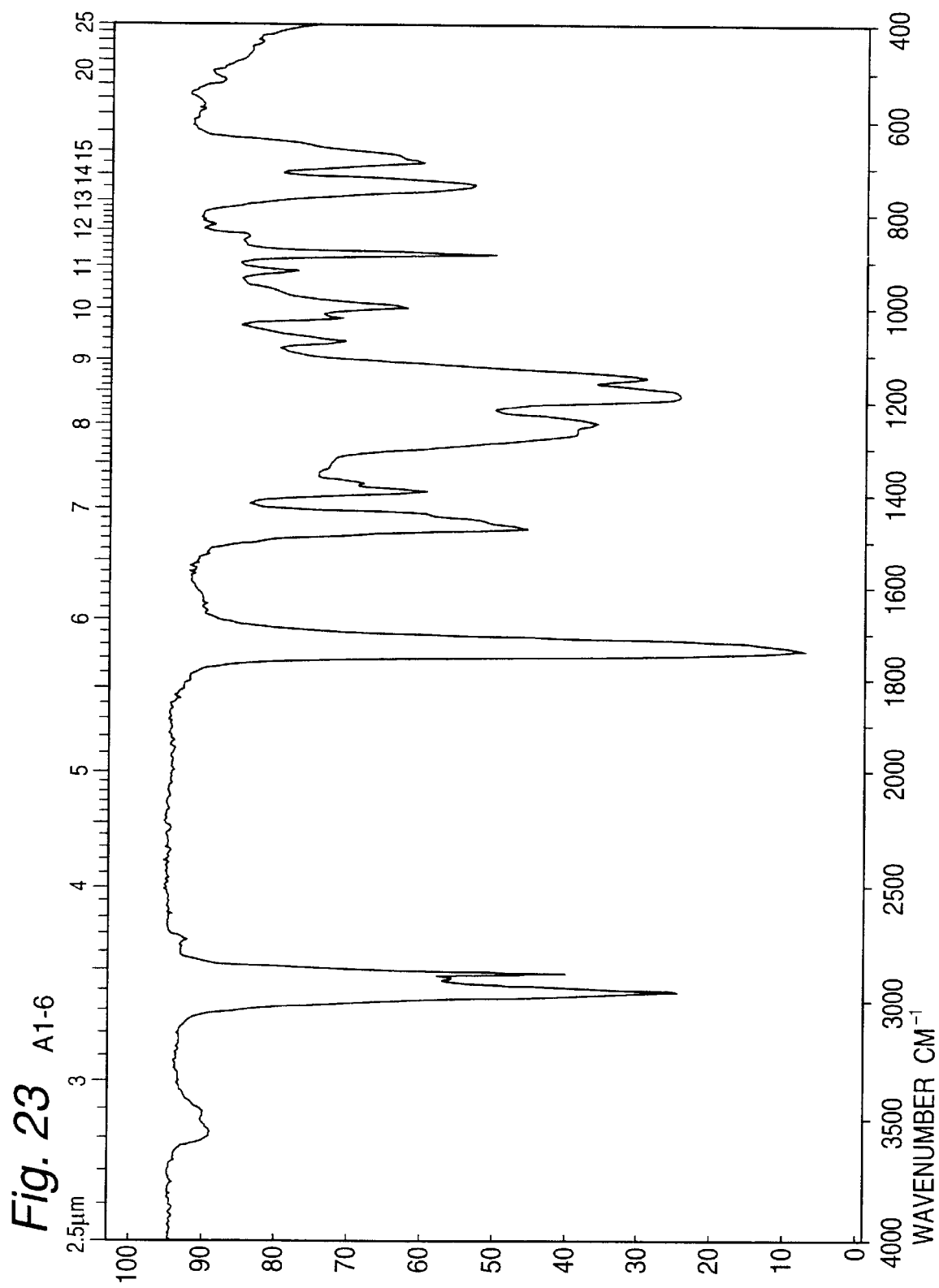
FIG. 23 is a chart of an IR spectrum of the copolymer A1-6.
Figure 24:
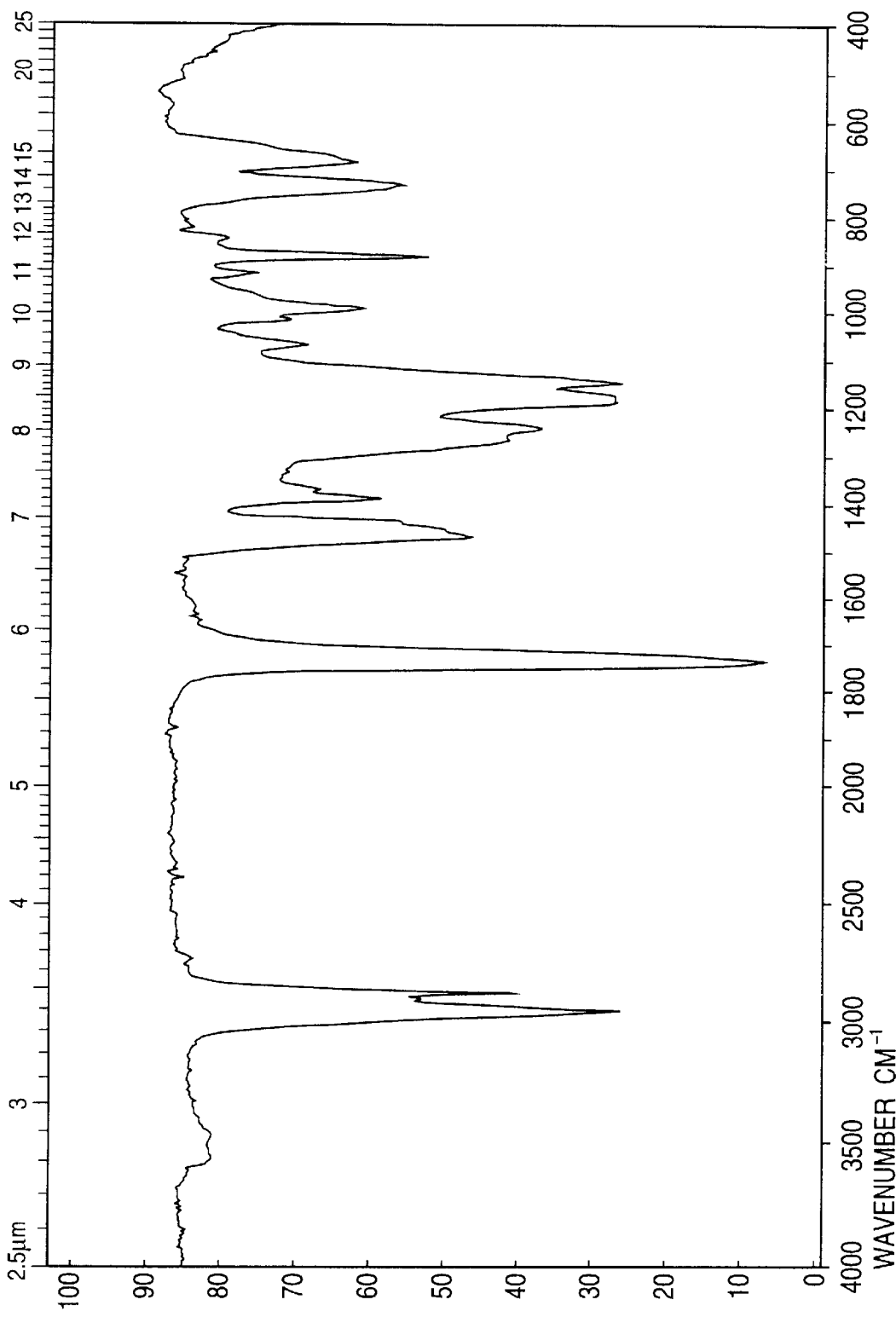
FIG. 24 is a chart of an IR spectrum of the copolymer A1-9.
Figure 25:
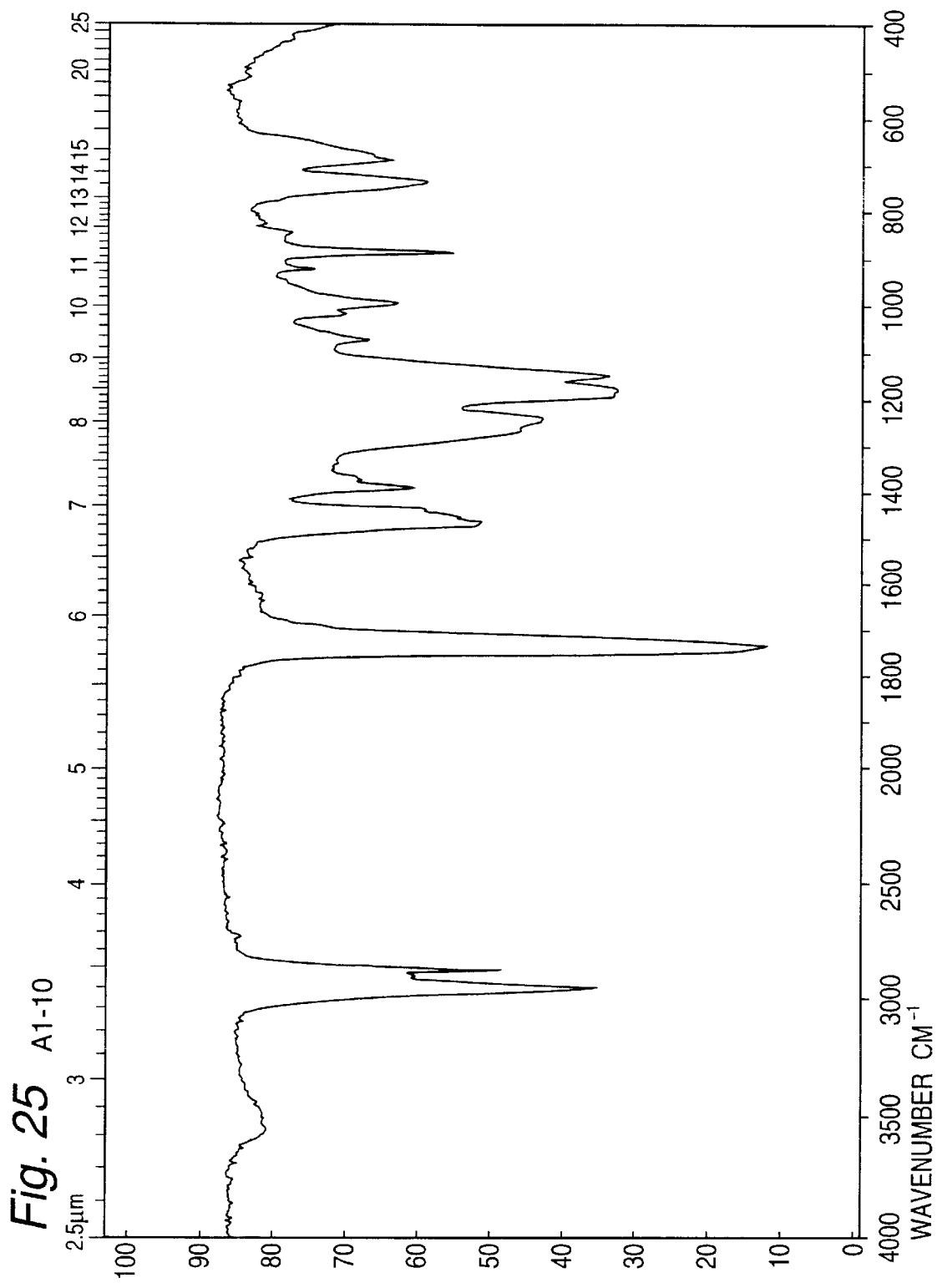
FIG. 25 is a chart of an IR spectrum of the copolymer A1-10.
Figure 26:
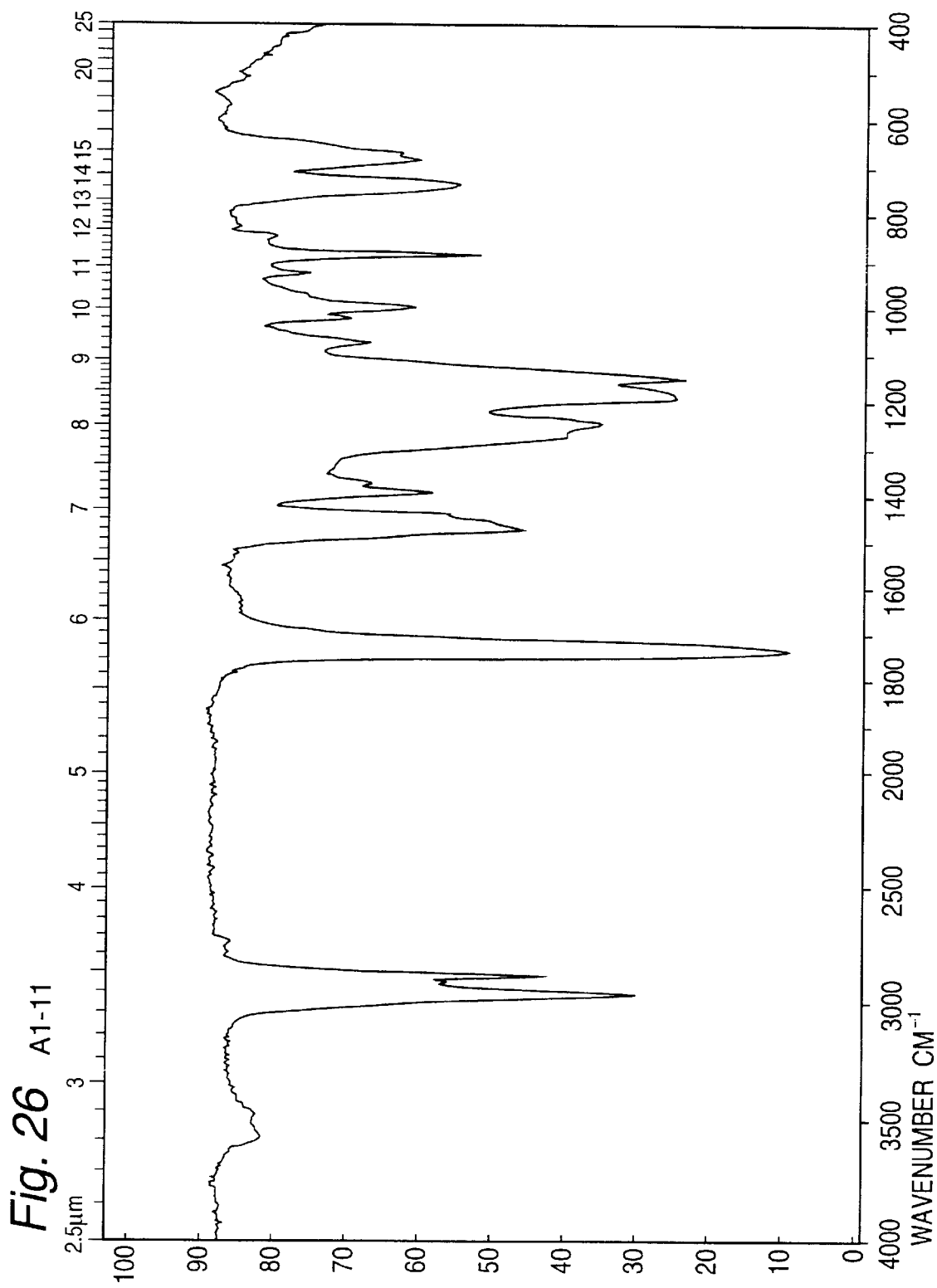
FIG. 26 is a chart of an IR spectrum of the copolymer A1-11.
Figure 27:
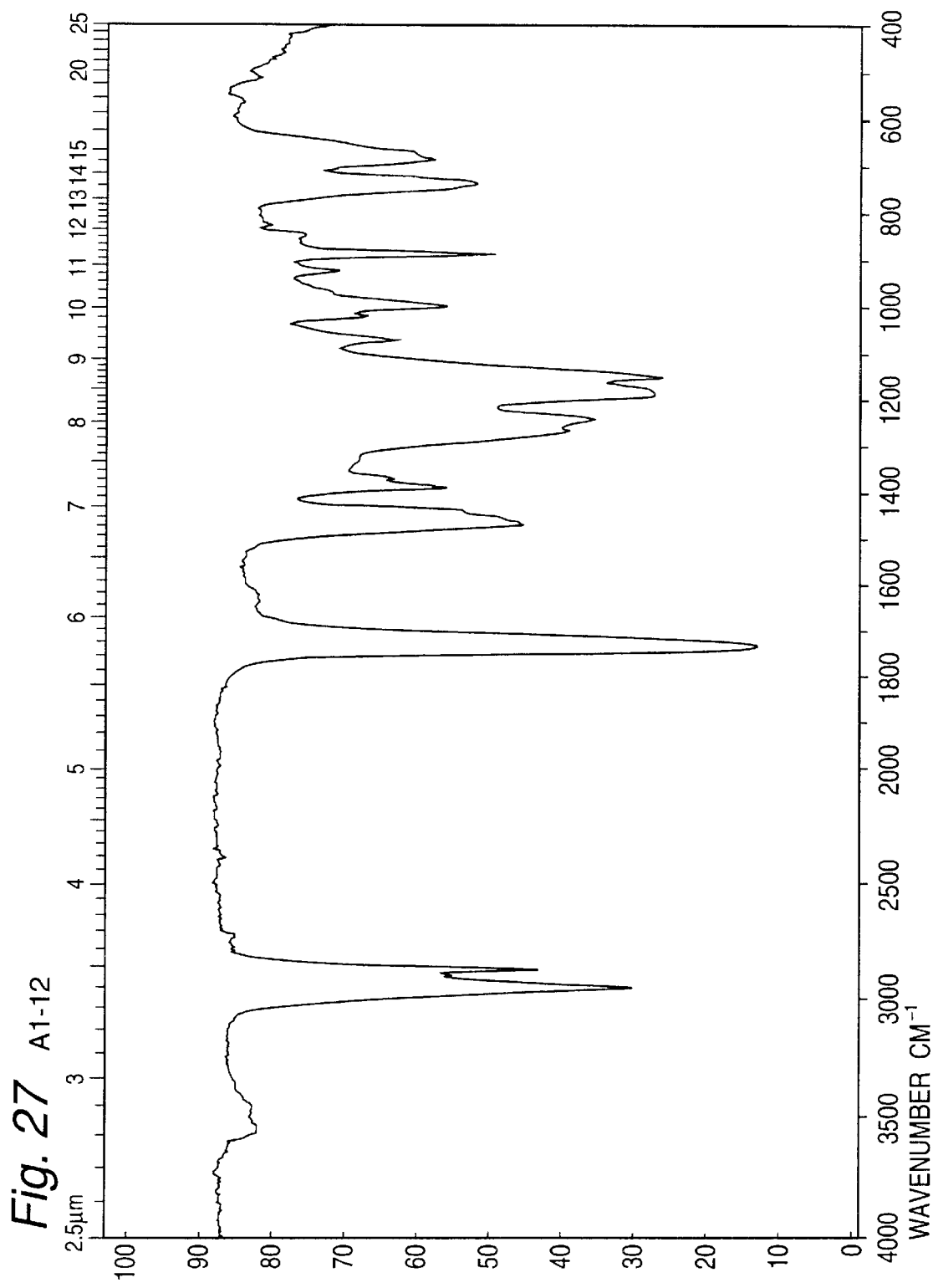
FIG. 27 is a chart of an IR spectrum of the copolymer A1-12.
Figure 28:
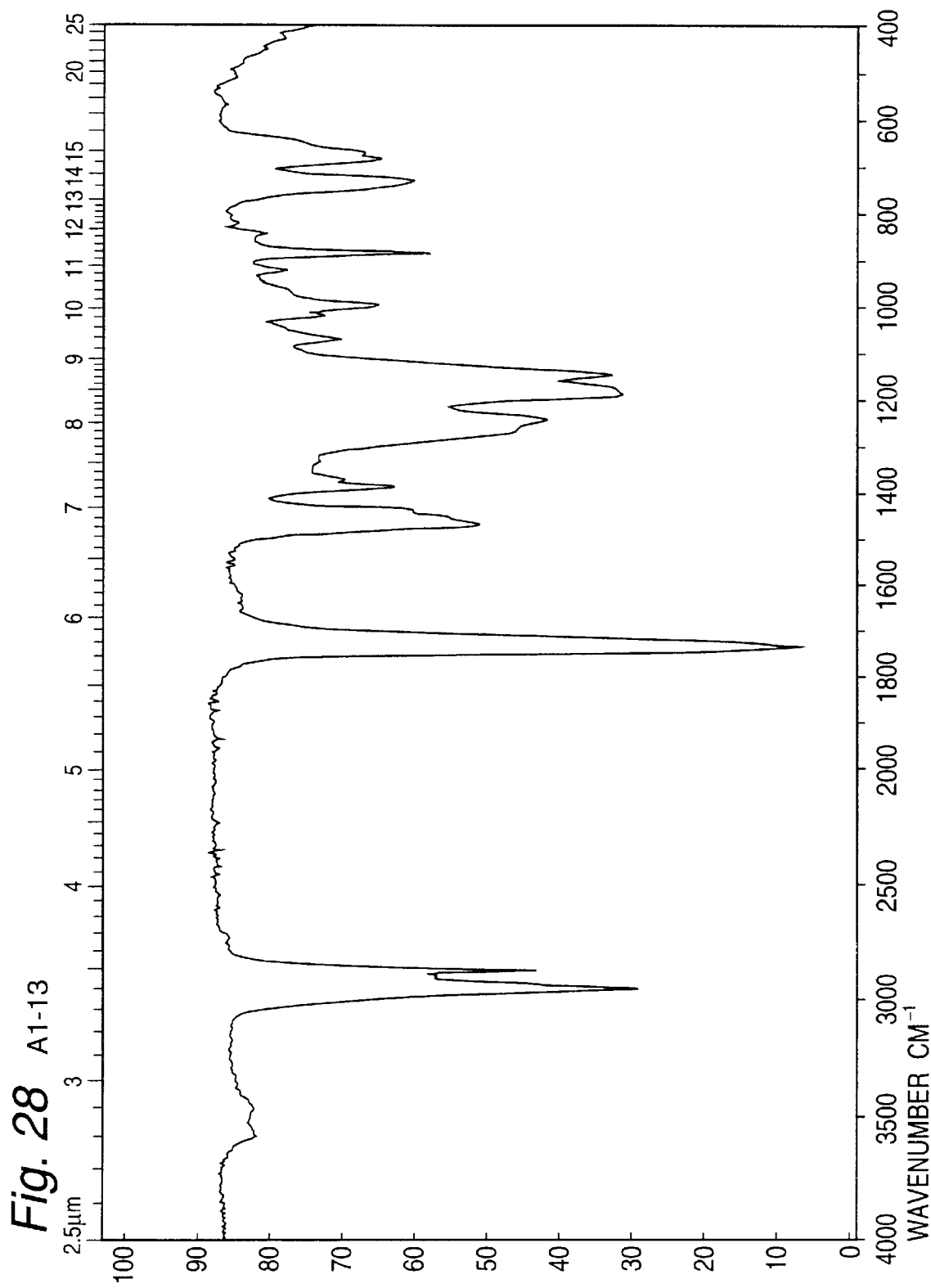
FIG. 28 is a chart of an IR spectrum of the copolymer A1-13.
Figure 29:
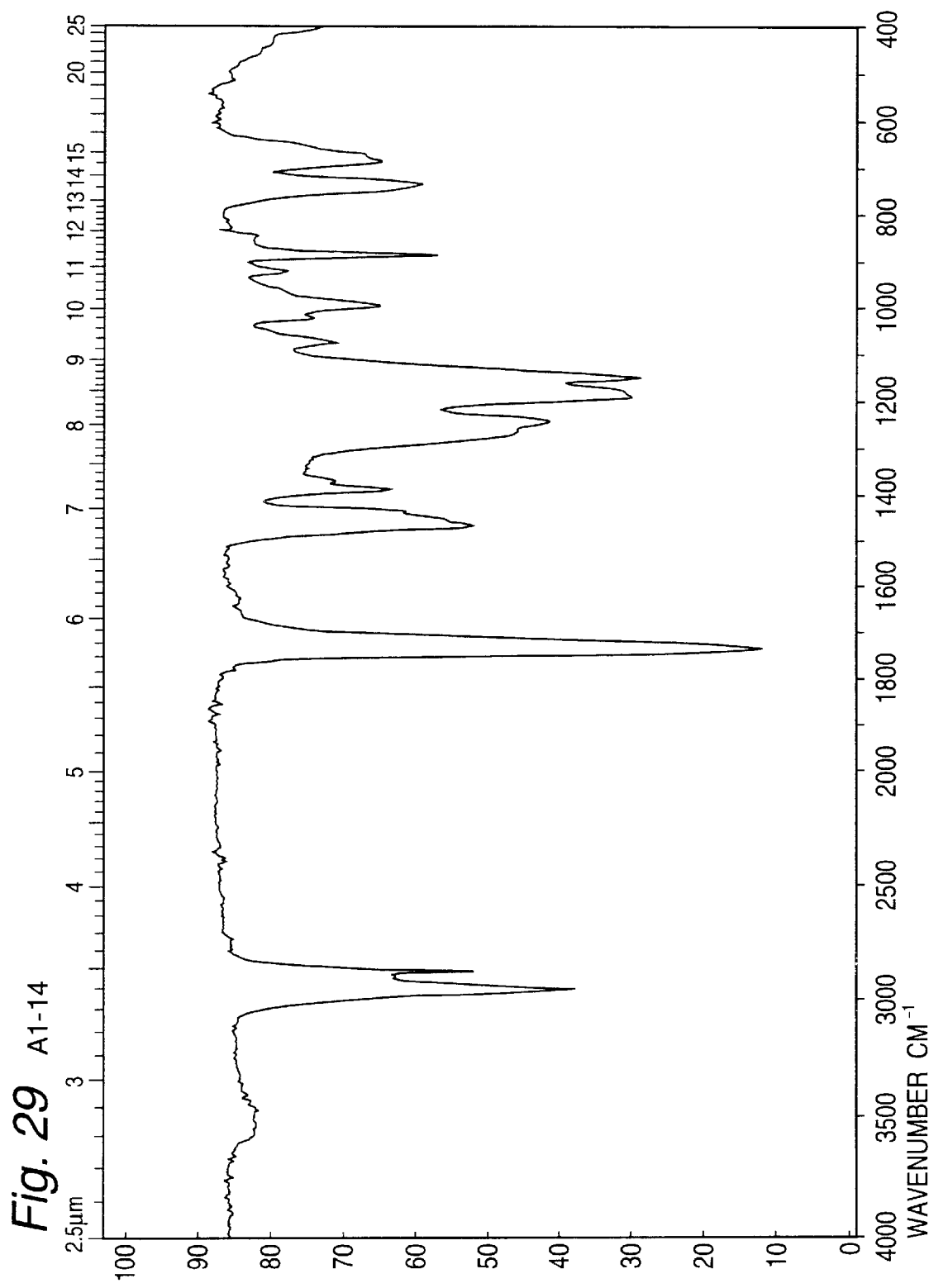
FIG. 29 is a chart of an IR spectrum of the copolymer A1-14.
Figure 30:
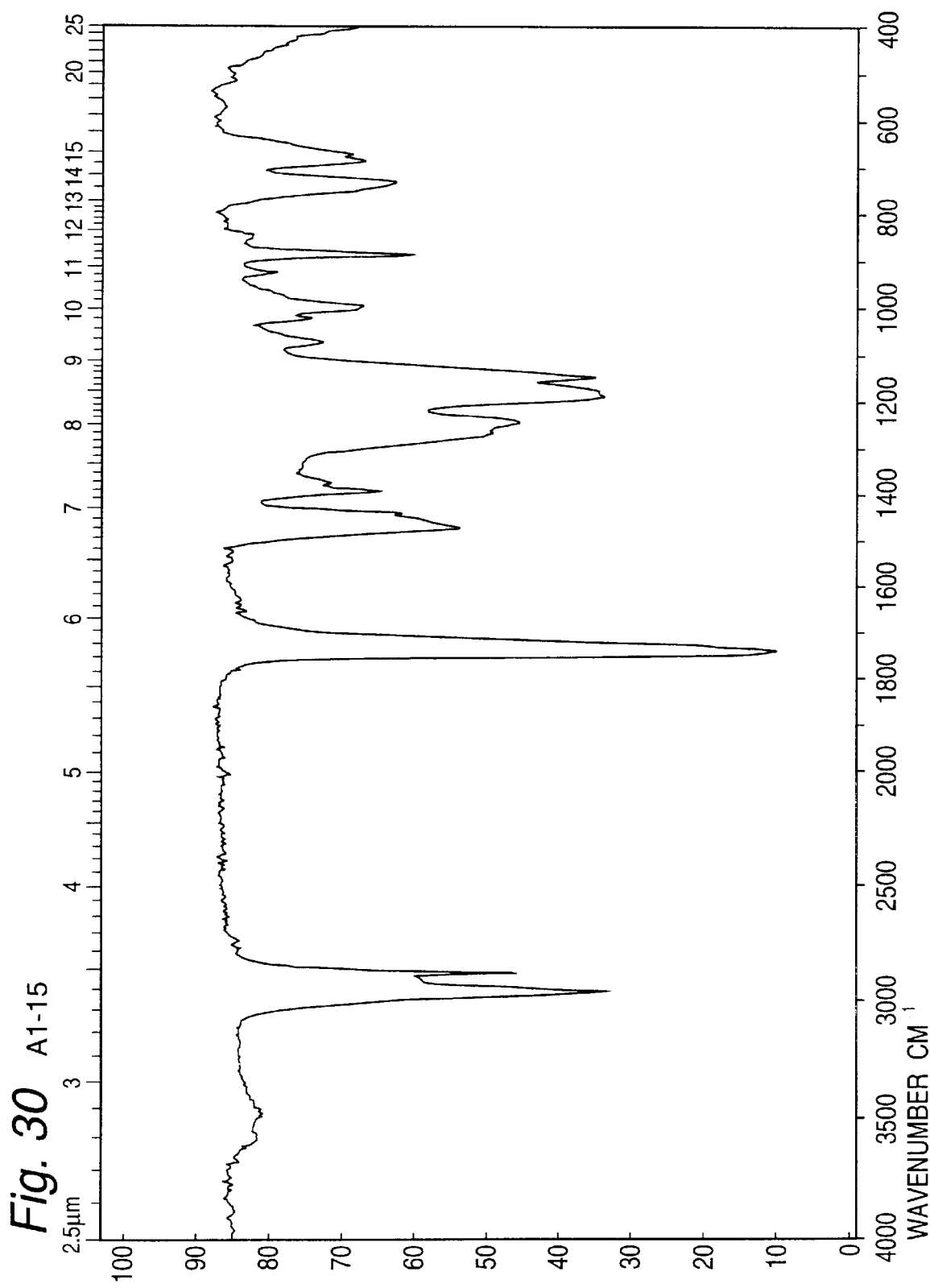
FIG. 30 is a chart of an IR spectrum of the copolymer A1-15.
Figure 31:
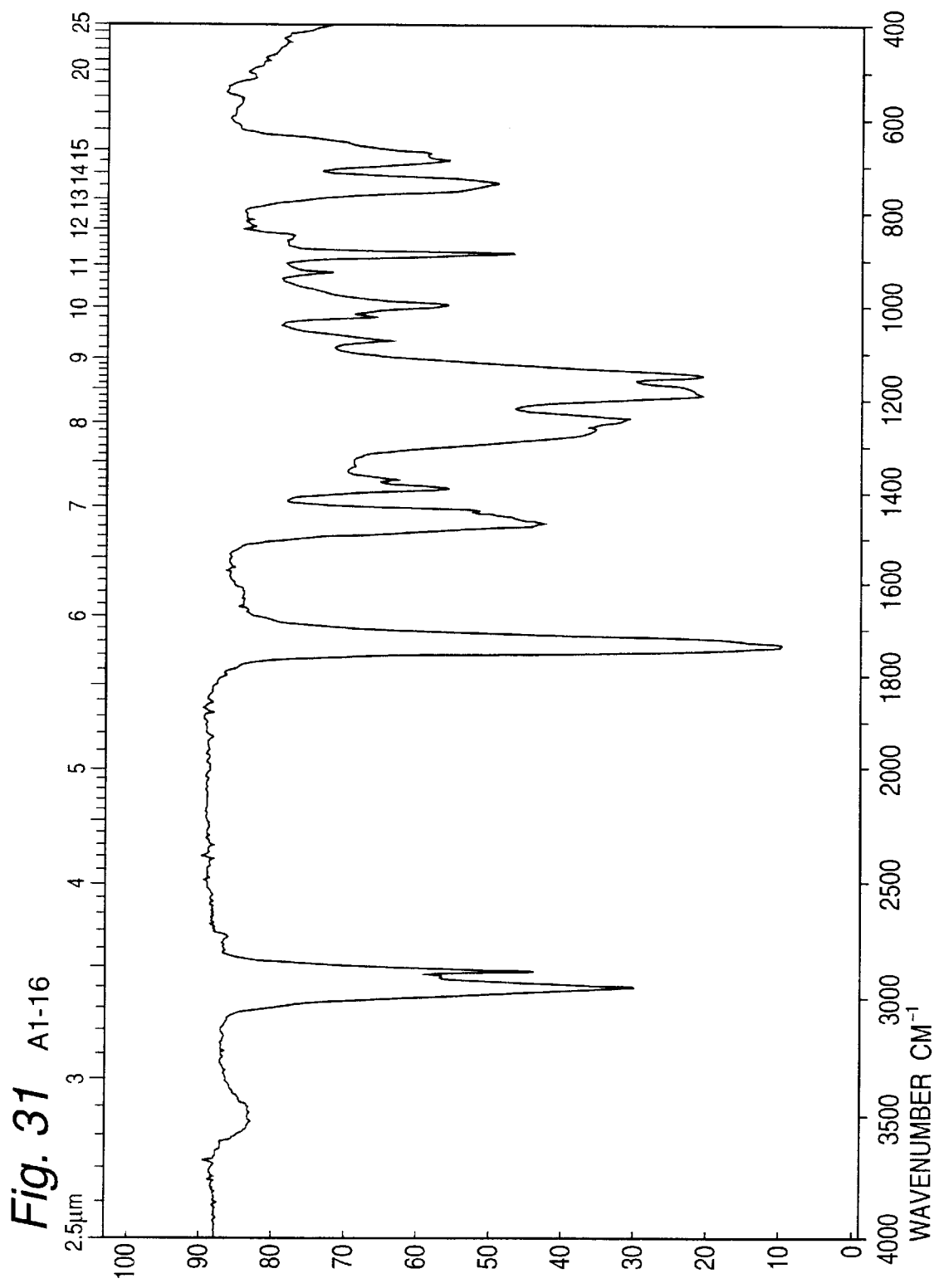
FIG. 31 is a chart of an IR spectrum of the copolymer A1-16.
Figure 32:
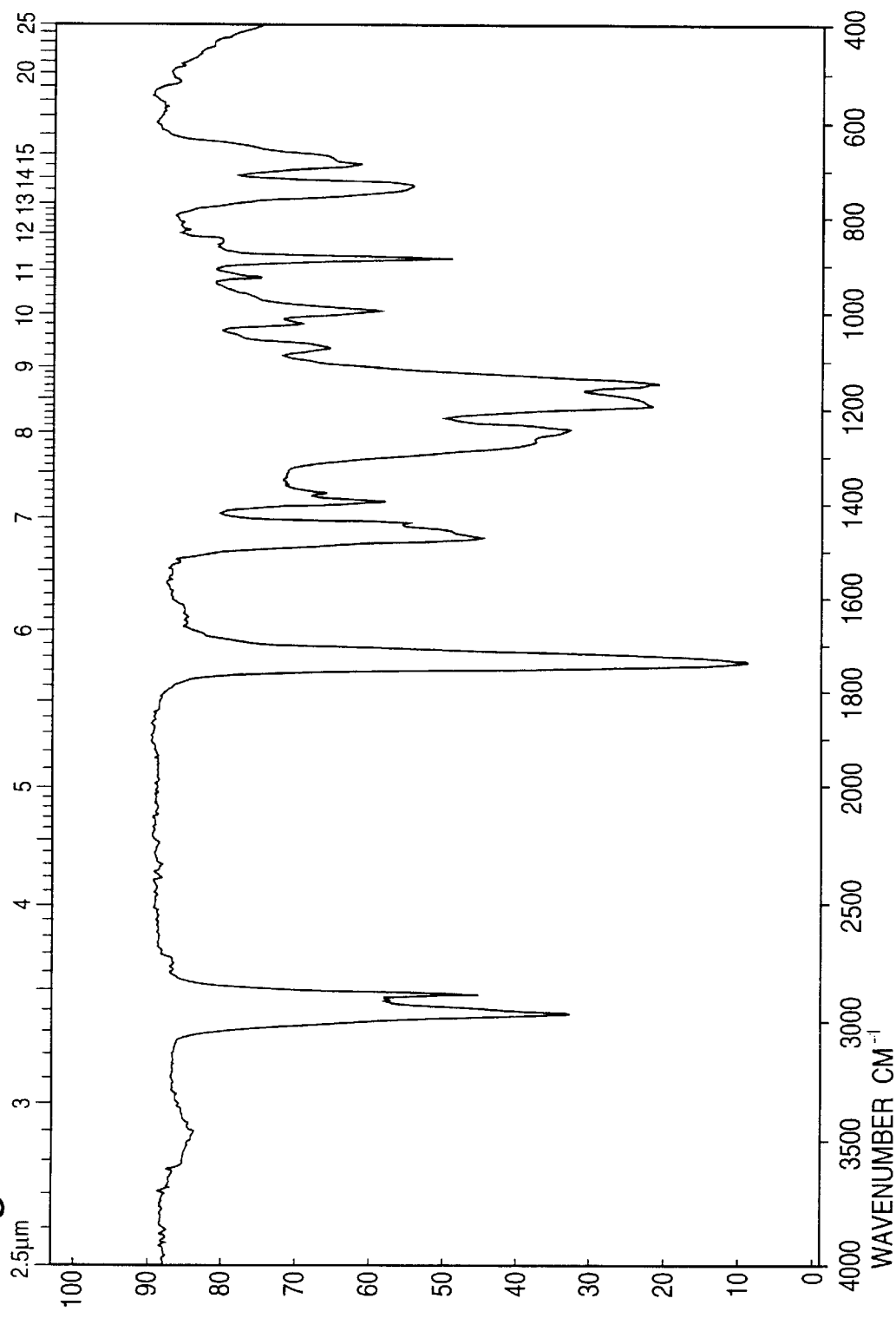
FIG. 32 is a chart of an IR spectrum of the copolymer A1-17.
Figure 33:
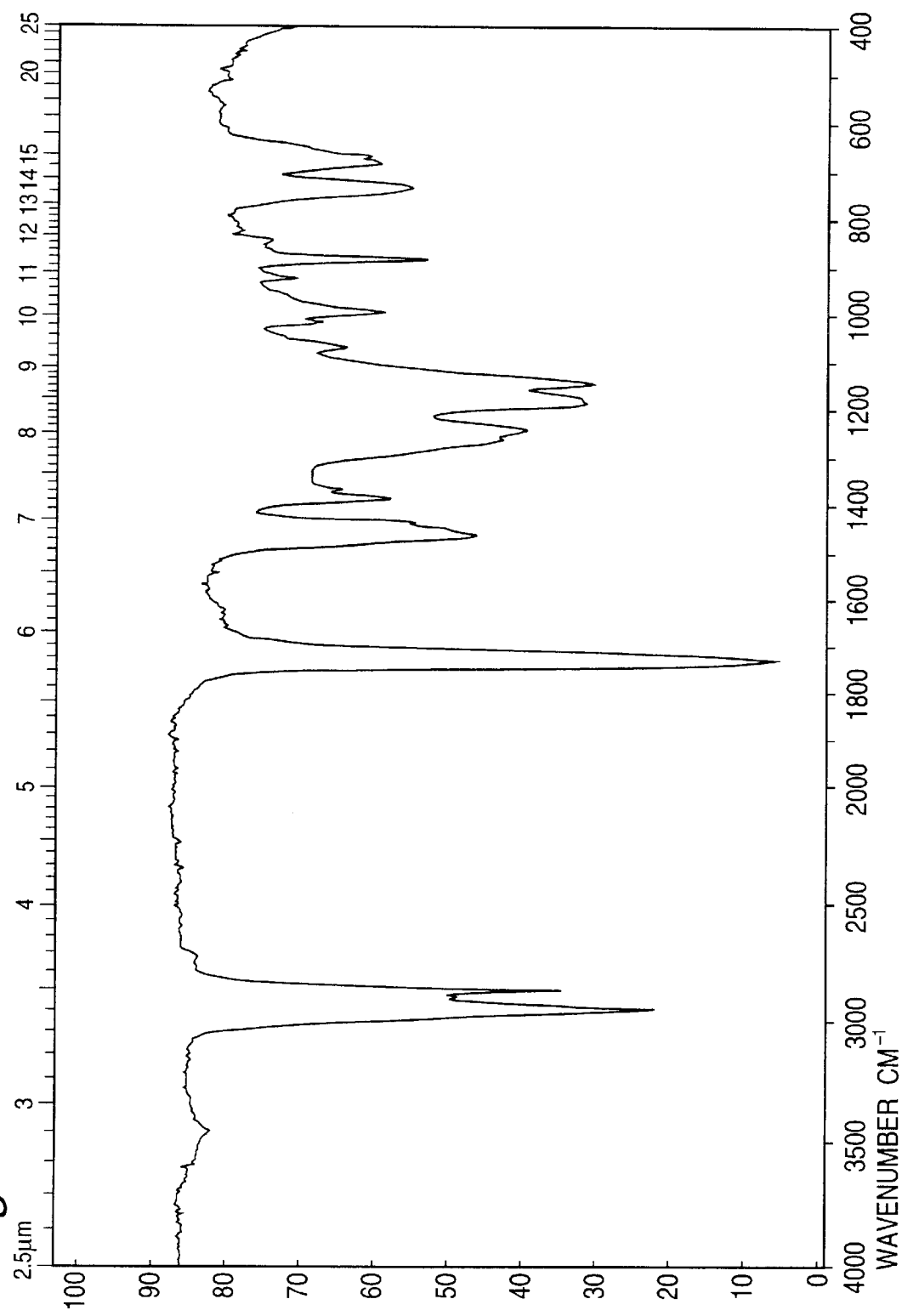
FIG. 33 is a chart of an IR spectrum of the copolymer A1-18.
Figure 34:
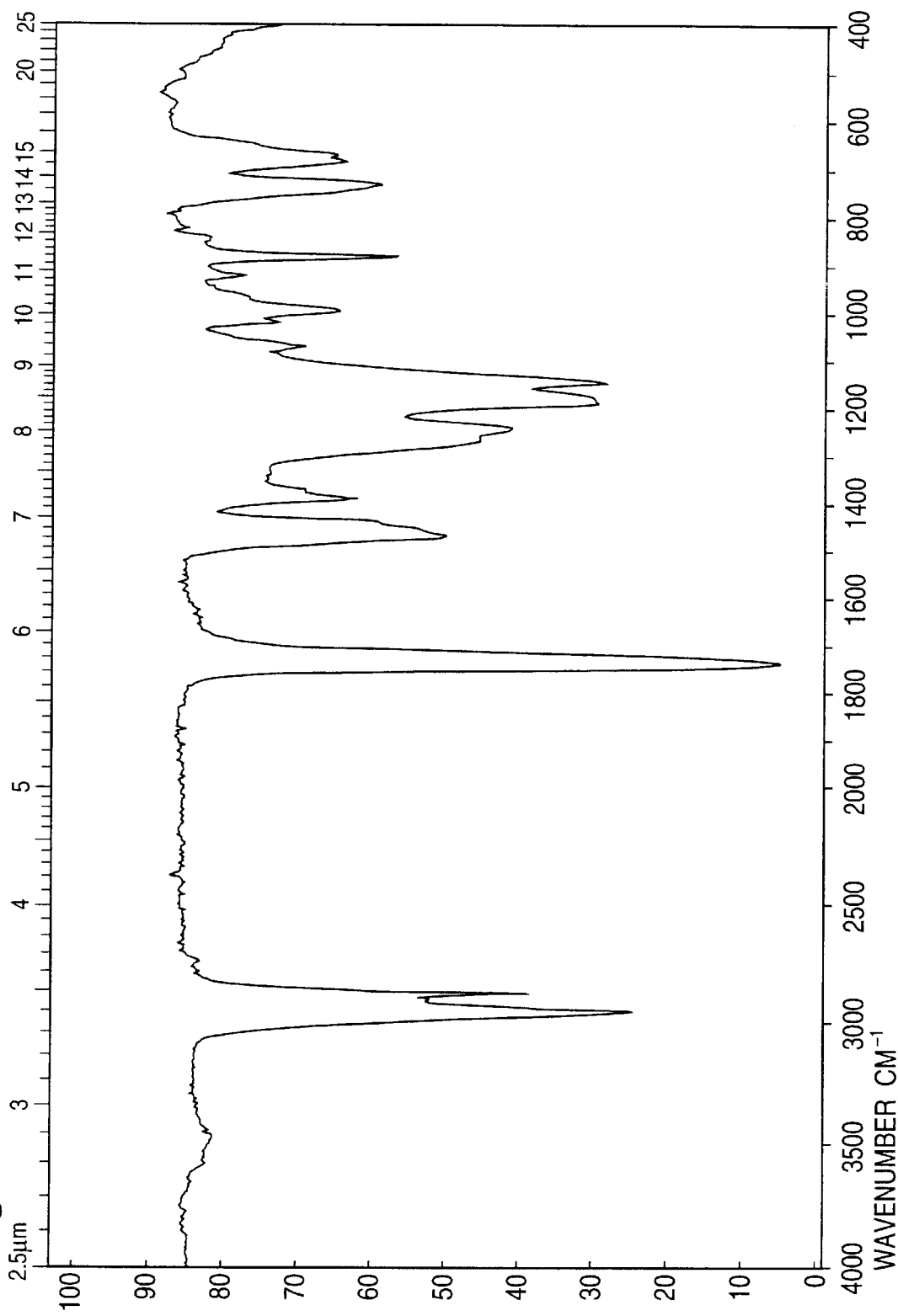
FIG. 34 is a chart of an IR spectrum of the copolymer A1-19.
Figure 35:
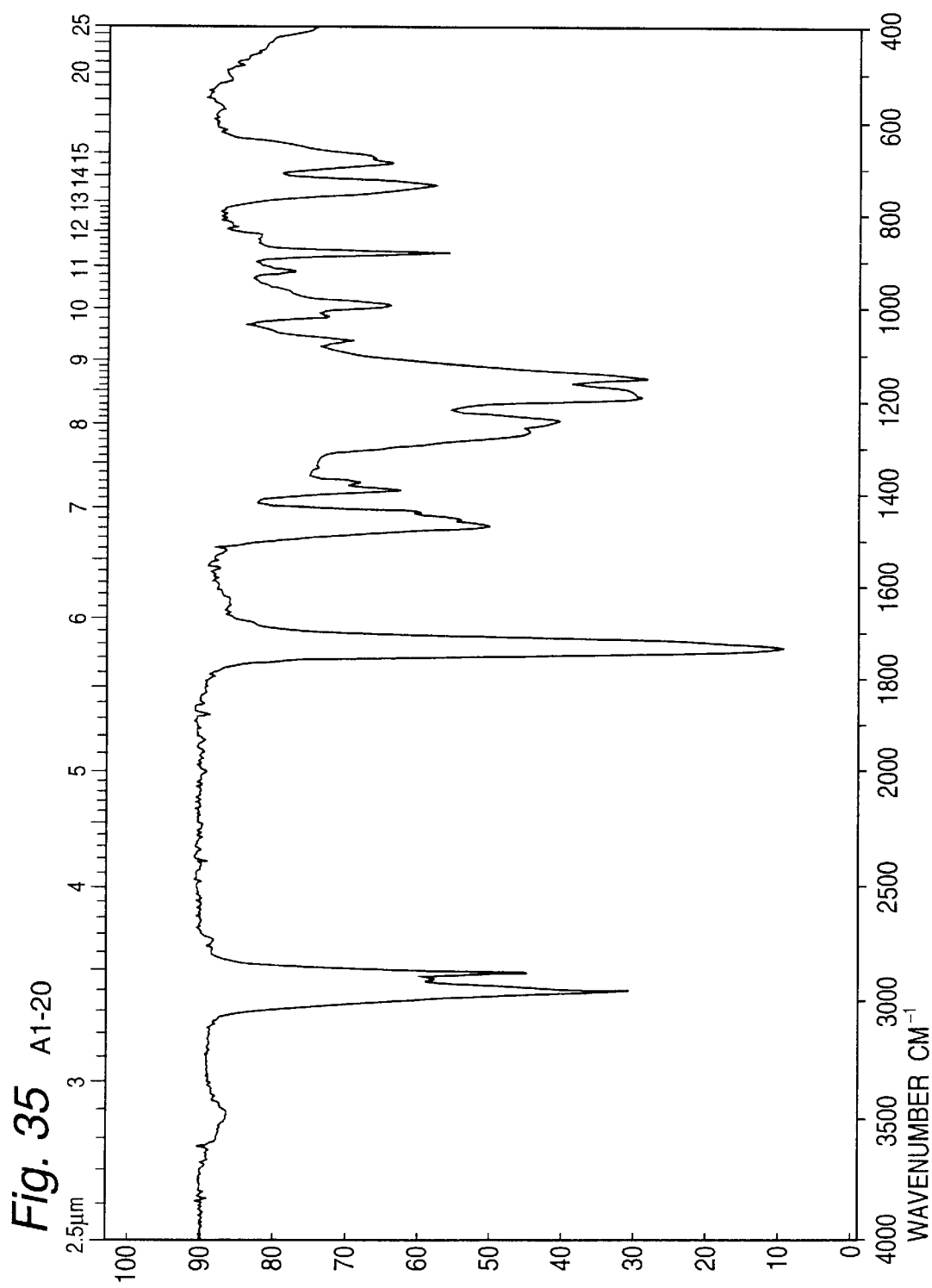
FIG. 35 is a chart of an IR spectrum of the copolymer A1-20.
Figure 36:
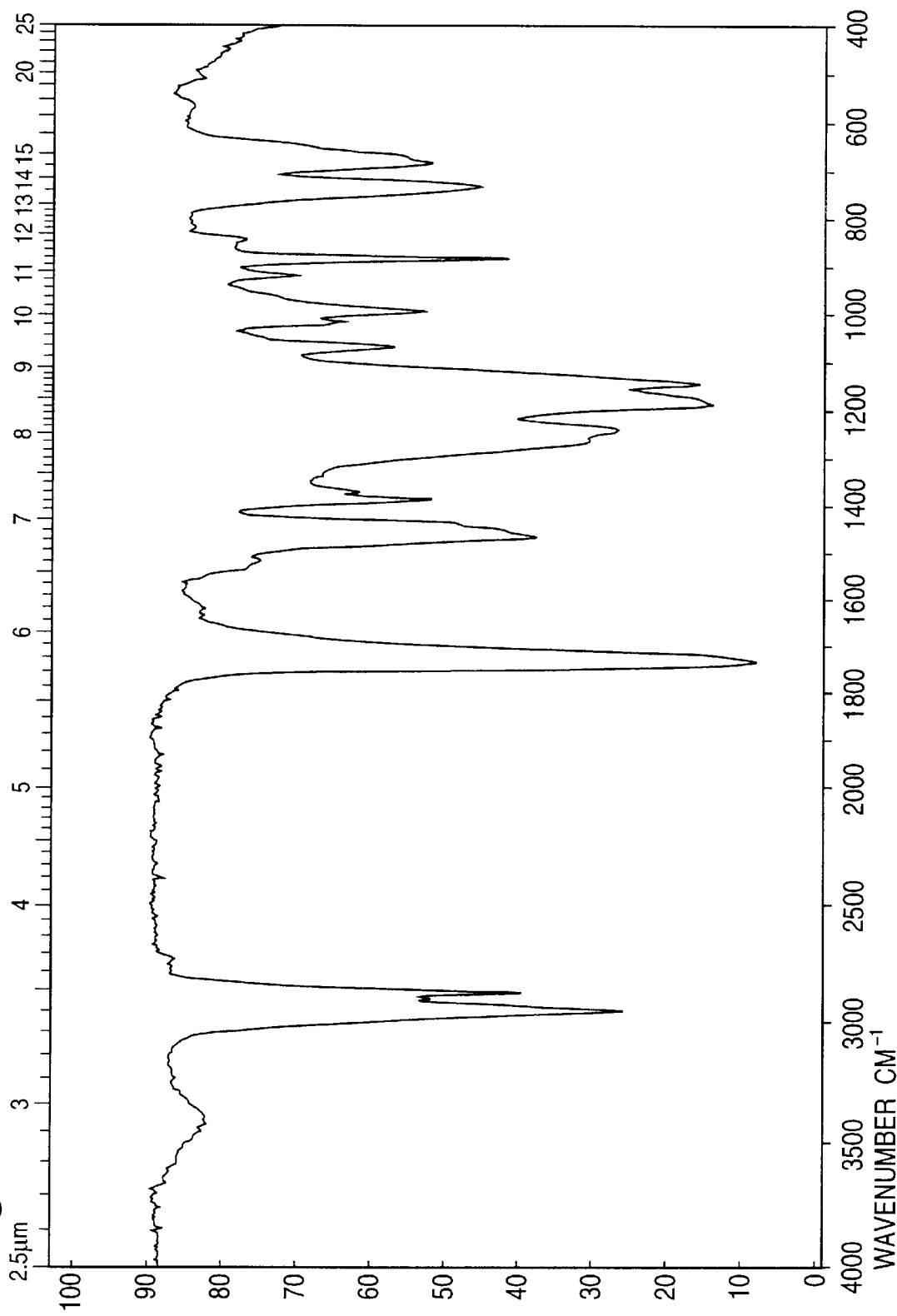
FIG. 36 is a chart of an IR spectrum of the copolymer A1-21.
Figure 37:
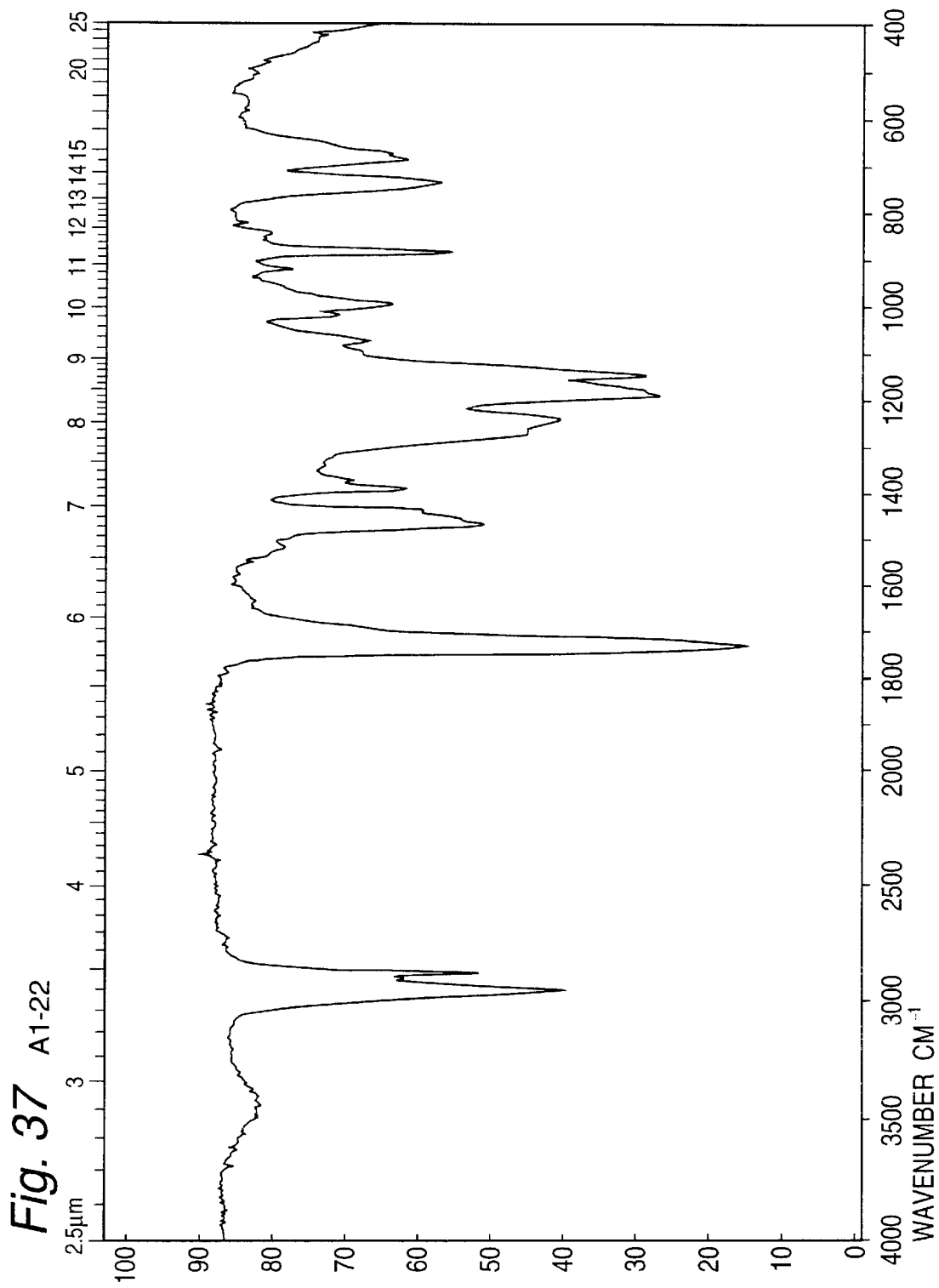
FIG. 37 is a chart of an IR spectrum of the copolymer A1-22.
Figure 38:
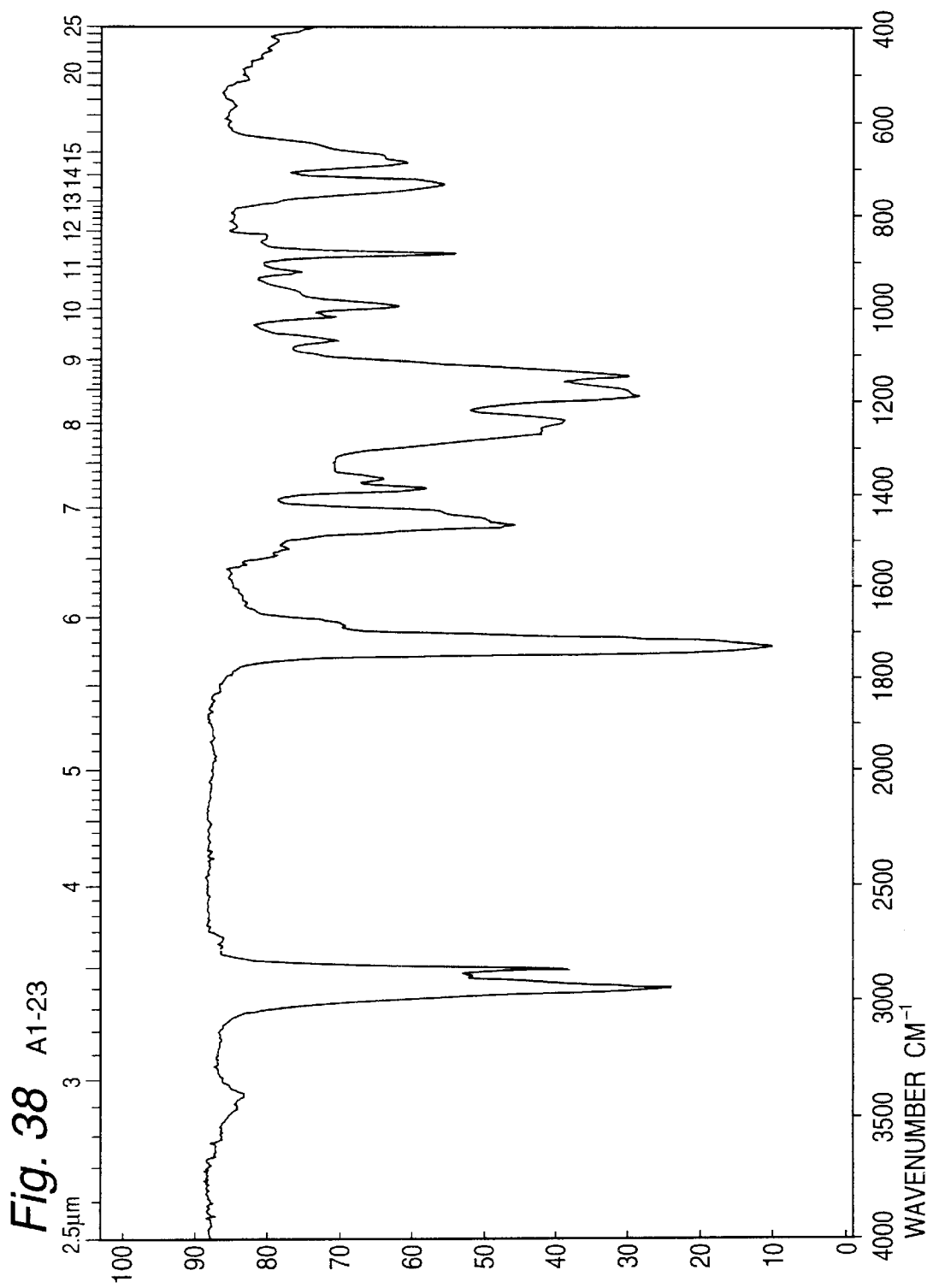
FIG. 38 is a chart of an IR spectrum of the copolymer A1-23.

The thus obtained solution of the copolymer (A1-1) had a heating residue (after drying for 3 hours in a constant temperature vessel at 105° C.) of 50.9%, a viscosity at 25° C. of 353 cps, a number-average molecular weight (Mn), as measured by GPC, of 5,132 and a weight-average molecular weight (Mw), as measured by GPC, of 19,344. A GPC chromatogram of the copolymer (A1-1) is shown in FIG. 1, and a chart of an IR spectrum thereof is shown in FIG. 20.

The conditions for measuring GPC and IR are as follows.
GPC Measuring Conditions
  Apparatus: HLC-8120GPC, manufactured by Tosoh K. K.
  Column: Super H2000+H4000, 6 mm I.D., 15 cm, manufactured by Tosoh K. K.
  Eluent: THF
  Flow rate: 0.500 ml/min
  Detector: RI
  Temperature of column constant temperature bath: 40° C.
IR Measuring Conditions
  Apparatus: 270-30 Model Hitachi Infrared Spectrometer, manufactured by Hitachi, Ltd.
  Measuring method: KBr cell, coating method Examples to Prepare Copolymers (A1-2) to (A1-23) and Comparative Examples to Prepare Copolymers (H1) to (H5) for Comparison Copolymers (A1-2) to (A1-23) and copolymers (H1) to (H5) for comparison were obtained in the same manner as in the preparation of the copolymer (A1-1), except that the ingredients to be dropwise added were changed as shown in Tables 1 to 5. Property values of the copolymers (solutions) were measured in the same manner as described above.

The results are set forth in Tables 1 to 5.

Example to Prepare Copolymer (A2-1)

A colorless transparent solution of a silyl (meth)acrylate copolymer (A2-1) was obtained in the same manner as in the preparation of the copolymer (A1-1), except that 5 parts of tri-n-butylsilyl methacrylate was used instead of 5 parts of 2-hydroxypropyl acrylate.

Figure 39:
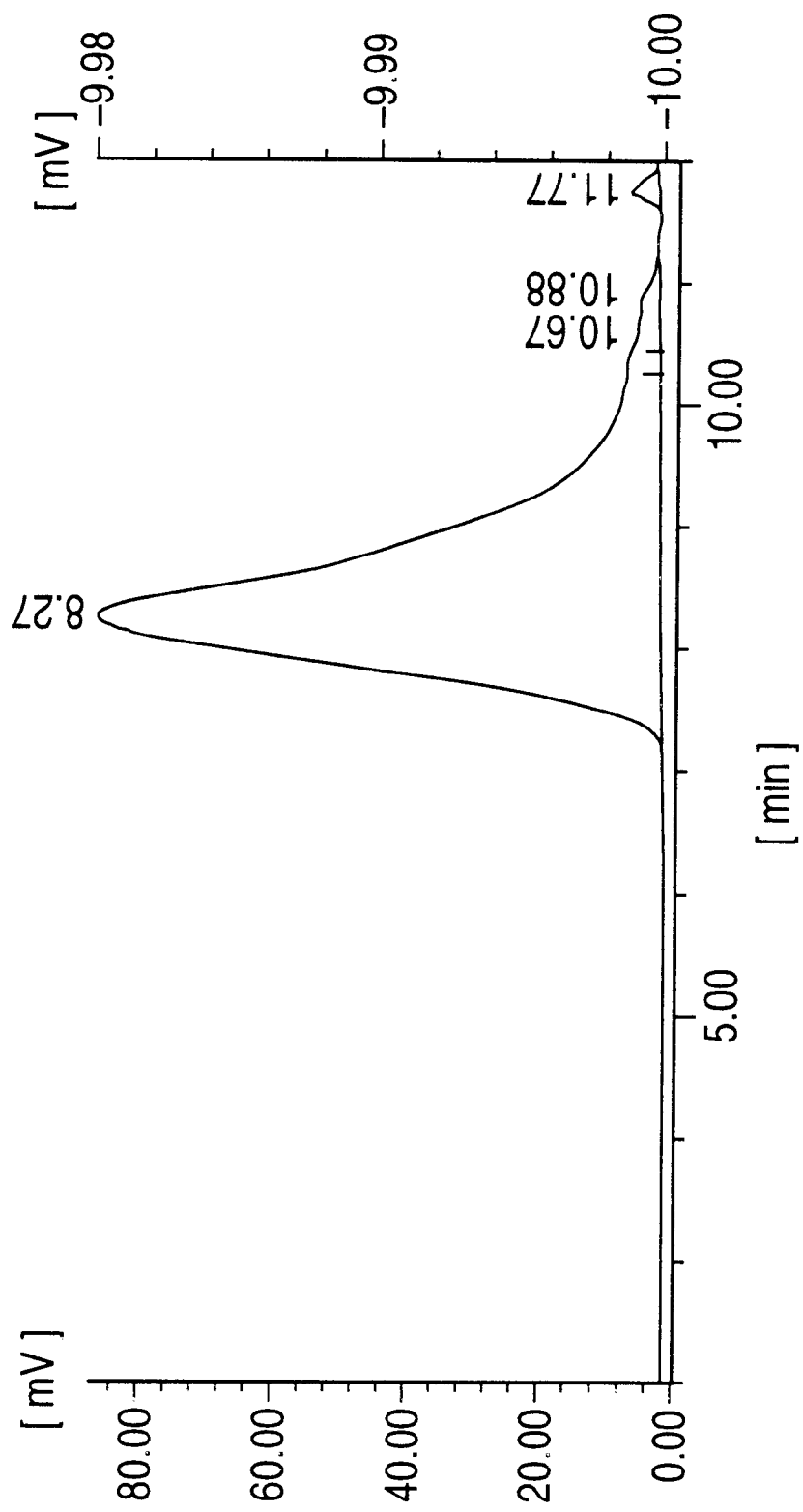
FIG. 39 is a GPC chromatogram of a copolymer A2-1.

The thus obtained solution of the copolymer (A2-1) had a heating residue (after drying for 3 hours in a constant temperature vessel at 105° C.) of 50.7%, a viscosity at 25° C. of 264 cps, a number-average molecular weight (Mn), as measured by GPC, of 5,223 and a weight-average molecular weight (Mw), as measured by GPC, of 19,196. A GPC chromatogram of the copolymer (A2-1) is shown in FIG. 39, and a chart of an IR spectrum thereof is shown in FIG. 42.

The conditions for measuring GPC and IR are the same as those for the copolymer (A1-1).

Examples to Prepare Copolymers (A2-2) to (A2-11) and Comparative Examples to Prepare Copolymers (H1) to (H5) for Comparison Copolymers (A2-2) to (A2-11) were obtained in the same manner as in the preparation of the copolymer (A2-1), except that the ingredients to be dropwise added were changed as shown in Tables 6 and 7. Property values of the copolymers (solutions) were measured in the same manner as described above.

The copolymers (H1) to (H5) for comparison are identical with the copolymers (H1) to (H5) for comparison shown in Table 5.

Figure 40:
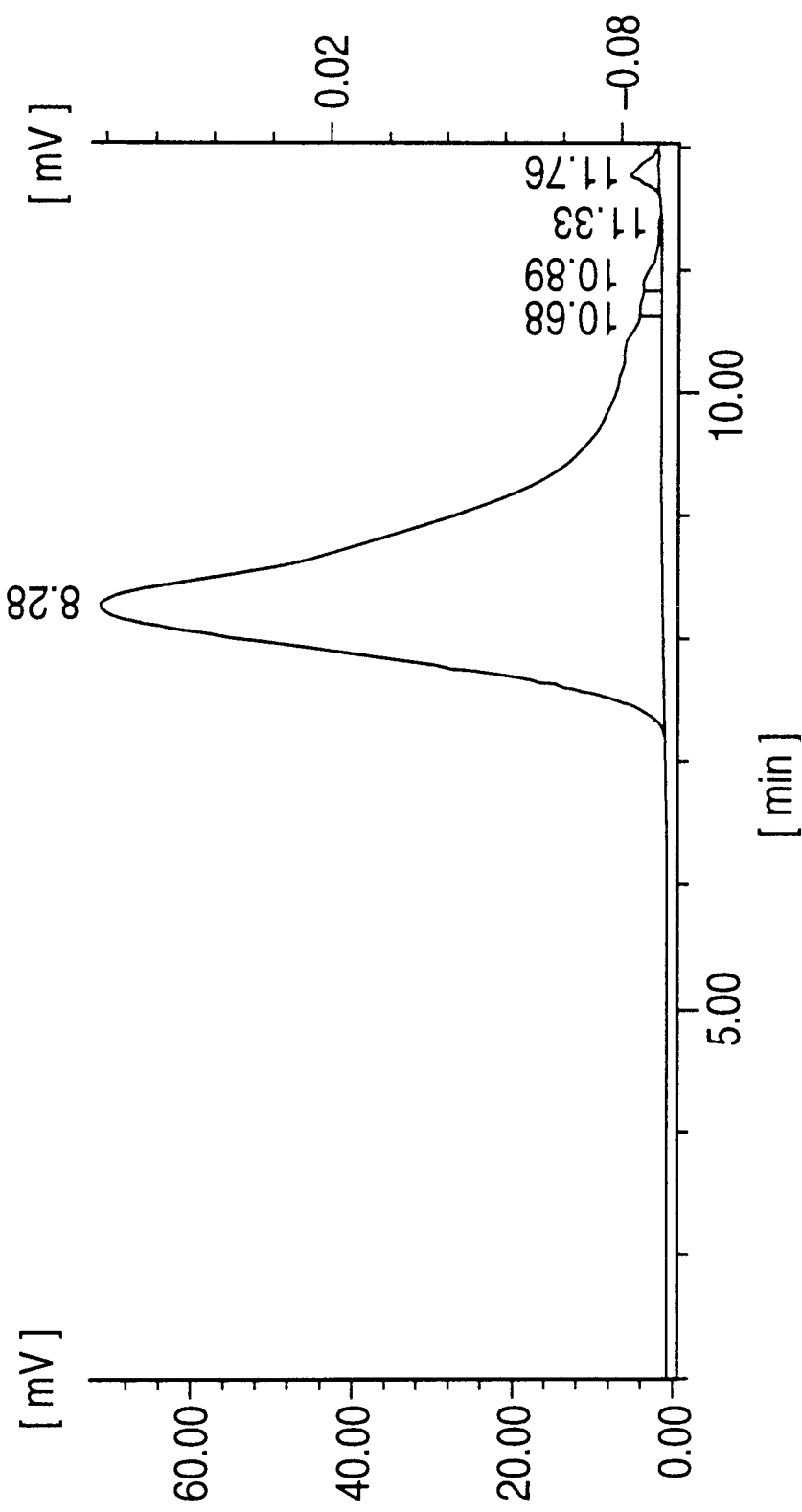
FIG. 40 is a GPC chromatogram of a copolymer A2-2.
Figure 41:
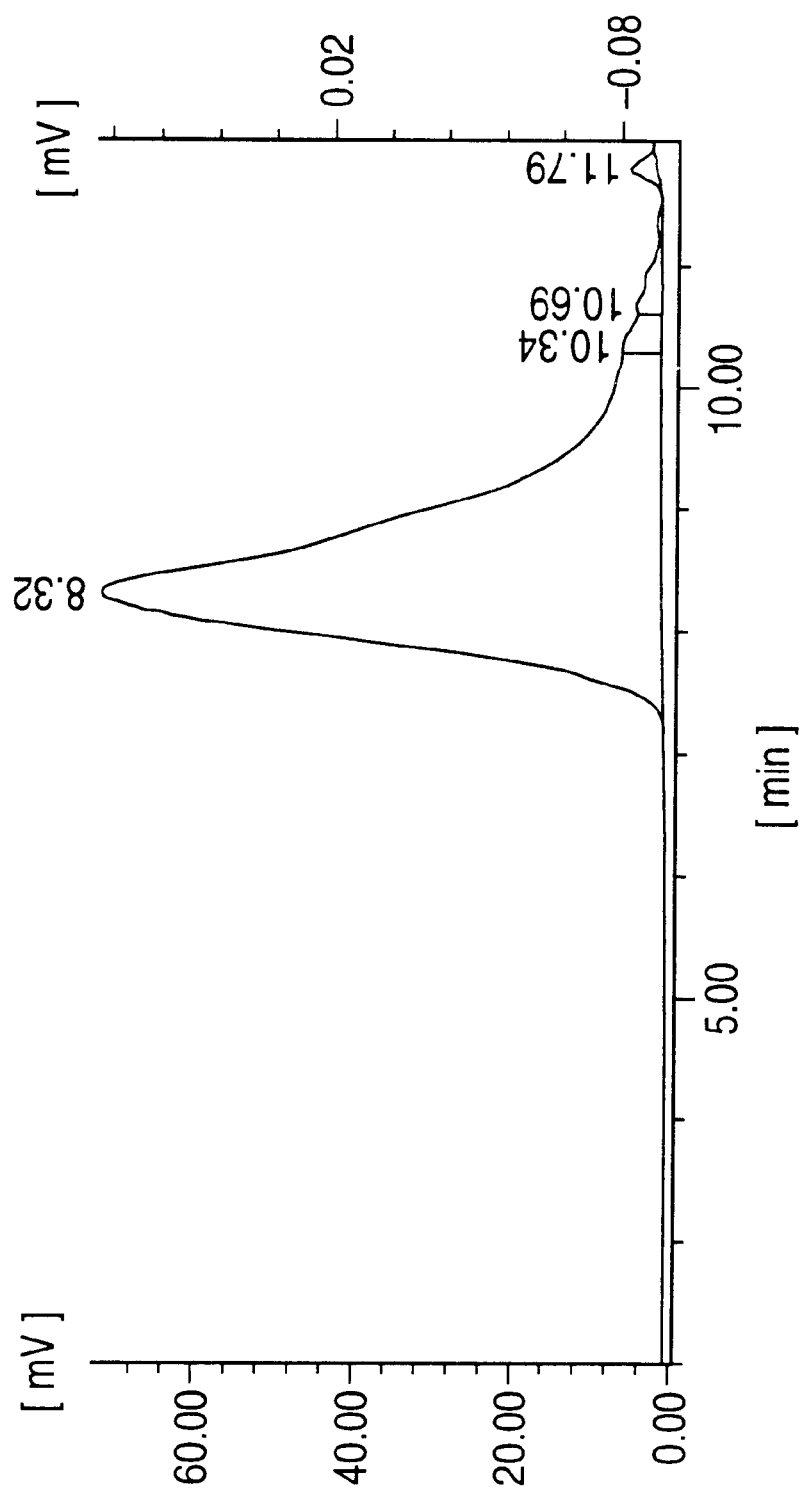
FIG. 41 is a GPC chromatogram of a copolymer A2-3.

The results of property values of the copolymers (A2-1) to (A2-11) are set forth in Tables 6 and 7. GPC chromatograms of the copolymer (A2-2) and the copolymer (A2-3) are shown in FIG. 40 and FIG. 41, respectively, and charts of IR spectra thereof are shown in FIG. 43 and FIG. 44, respectively.

Examples P1 to P29, Examples 01 to 052, Comparative Examples PO1 to PO5, Examples R1 to R23, and Comparative Examples R1 to R5 to Prepare Antifouling Paints Examples to Prepare Antifouling Paint Compositions To prepare antifouling paint compositions having formulations shown in Tables 8 to 11 (Examples P1 to P29), Tables 12 to 18 (Examples Q1 to Q52, Comparative Examples PQ1 to PQ5) and Tables 19 to 21 (Examples R1 to R$^{23}$, Comparative Examples R1 to R5), the ingredients were shaken all together for 2 hours in a paint shaker containing glass beads and then filtered through a 100-mesh filter. Thus, the desired antifouling paint compositions were obtained.

The antifouling paint compositions were stored for 2 months at ordinary temperature to evaluate storage stability. The results are set forth in Tables 8 to 21.

In the evaluation of storage stability, a viscosity (Ku value measured at 25° C. by a Stormer's viscometer) of each antifouling paint composition was measured immediately after the preparation and after storage at ordinary temperature for 2 months, and the storage viscosity was evaluated by the increase in viscosity.

Evaluation Criteria

5: An increase in viscosity is less than 10.

4: An increase in viscosity is less than 20.

3: An increase in viscosity is less than 30.

2: An increase in viscosity is not less than 30.

1: A Ku value is unmeasurable because of no flowability.

Antifouling properties and degree of consumption of a coating film formed from each antifouling paint composition were evaluated in the manner described below.

The results are set forth in Tables 8 to 21, in which the examples and the comparative examples to prepare antifouling paint compositions are referred to as "Ex." and "Comp Ex." for short).

Evaluation of Antifouling Properties

A sandblasted steel plate of 70×200×3 mm was bent so as to be fitted onto the side of a rotating drum placed in seawater in Hiroshima Bay.

The sandblasted steel plate was coated with an epoxy type zinc-rich primer, further with an epoxy type anticorrosive paint next day, and furthermore a vinyl type binder coat two days after, to form coating films superposed in this order and having dry film thicknesses of 20 µm, 15 µm and 50 µm, respectively. Thereafter, the antifouling paint composition under test was applied in such an amount that the film thickness after dried would be 200 µm, to obtain a test plate. The test plate was fitted onto the rotating drum, and a test was carried out at a peripheral speed of 5 knots under 50% working conditions (alternation of 12-hour working at night and 12-hour rest in the day time) for 12 months in a highly fouling environment, to evaluate antifouling properties.

In the evaluation of antifouling properties, the surface of the coating film was visually observed and the antifouling properties were evaluated based on the following criteria.

Evaluation Criteria

5: Any substance sticking to the surface of the coating film is not observed.

4: Slime(biofilm) thinly sticking to the surface of the coating film is observed.

3: Slime thickly sticking to the surface of the coating film is observed.

2: Slime sticking to the surface of the coating film and plants such as ectocarpales sticking partly to the surface thereof are observed.

1: The whole surface of the coating film is covered with plants such as ectocarpales.

The degree of consumption was evaluated under the following conditions.

Evaluation of Degree of Consumption

A disc-shaped sandblasted steel plate having a diameter of 300 mm and a thickness of 3 mm was coated with an epoxy type zinc-rich primer, further with an epoxy type anticorrosive paint next day, and furthermore a vinyl type binder coat two days after, in such amounts that thicknesses of the coating films superposed in this order would become 20 µm, 15 µm and 50 µm, respectively, followed by drying indoors for 7 days. Thereafter, the antifouling paint composition under test was applied radially from the disc center using an applicator having a gap of 500 µm, to obtain a test plate.

The test plate was fitted onto a motor and placed in a constant temperature bath containing seawater at 25° C. The motor was rotated at a peripheral speed of 15 knots for 1 month in Examples P1 to P29, Examples Q1 to Q52 and Comparative Examples PQ1 to PQ5 (Tables 8 to 18) and at a peripheral speed of 15 knots for 2 months in Examples R1 to R23 and Comparative Examples R1 to R5 (Tables 19 to 21), to evaluate degree of consumption (decrease in film thickness) near the periphery.

The results of the evaluation are set forth in Tables 8 to 21.

Further, the condition of the coating film was visually observed in the measurement of decrease in film thickness and evaluated based on the following criteria.

Evaluation Criteria

5: The coating film has nothing unusual.
4: Fine cracks are observed on a part of the surface of the coating film.
3: Fine cracks are observed on the whole surface of the coating film.
2: Conspicuous cracks are observed on a part of the surface of the coating film.
1: Conspicuous cracks are observed on the whole surface of the coating film.

The results of the evaluation are set forth in Tables 8 to 21. The ingredients shown in Tables are as follows.

(1) Toyoparax 150
available from Tosoh K.K., chlorinated paraffin, average carbon number: 14.5, chlorine content: 50%, viscosity: 12 poise/25° C., specific gravity: 1.25/25° C.
(2) Rutonal A-25
available from BASF Co., polyvinyl ethyl ether, viscosity: 2.5 to 6.0 Pa.s/23° C., specific gravity: 0.96/20° C.
(3) Rosin solution
50% xylene solution of WW rosin
(4) Copper naphthenate solution
xylene solution of copper naphthenate, copper content in solution: 8%
(5) Soluble anhydrous gypsum D-1
available from Noritake Co., Ltd., IIICaSO$_4$, white powder, average particle diameter: 15 μm
(6) Disparon 4200-20
available from Kusumoto Kasei K.K., polyethylene oxide wax, 20% xylene paste
(7) Disparon A603-20X
available from Kusumoto Kasei K.K., fatty acid amide wax, 20% xylene paste

TABLE 1

| | | Type of polymer | | | | | |
|---|---|---|---|---|---|---|---|
| | | A1-1 | A1-2 | A1-3 | A1-4 | A1-5 | A1-6 |
| Solvent | Xylene | 100 | 100 | 100 | 100 | 100 | 100 |
| Ingredient dropped | Triisopropylsilyl acrylate | 50 | 50 | | | | 55 |
| | Triisobutylsilyl methacrylate | | | 50 | | | |
| | Di-sec-butylmethylsilyl methacrylate | | | | 45 | | |
| | Diisopropylmethylsilyl methacrylate | | | | | 45 | |
| | Methyl methacrylate | 45 | 45 | 45 | 50 | 50 | 40 |
| | 2-Hydroxypropyl acrylate | 5 | | 5 | 5 | 5 | 5 |
| | 2-Hydroxybutyl acrylate | | 5 | | | | |
| | 2-Hydroxyethyl acrylate | | | | | | |
| | 2-Hydroxyethyl methacrylate | | | | | | |
| | 2-Hydroxypropyl methacrylate | | | | | | |
| | 4-Hydroxybutyl acrylate | | | | | | |
| | 2-Hydroxybutyl methacrylate | | | | | | |
| | 6-Hydroxyhexyl acrylate | | | | | | |
| | 3-Chloro-2-hydroxypropyl methacrylate | | | | | | |
| | Polyethylene glycol monomethacrylate (n = 5) | | | | | | |
| | Polyethylene glycol monomethacrylate (n = 15) | | | | | | |
| | Polypropylene glycol monomethacrylate (n = 5) | | | | | | |
| | Polypropylene glycol monomethacrylate (n = 12) | | | | | | |
| | N-Methoxymethyl acrylamide | | | | | | |
| | N-Ethoxymethyl acrylamide | | | | | | |
| | Diacetone acrylamide | | | | | | |
| | 2,2'-Azobisisobutyronitrile | 1 | 1 | 1 | 1 | 1 | 1 |
| Properties of Product | Heating residue (wt. %) | 50.9 | 50.9 | 49.1 | 48.9 | 51.5 | 50.4 |
| | Viscosity/25° C. (cps) | 353 | 297 | 210 | 387 | 721 | 258 |
| | GPC measured value Mn | 5132 | 5167 | 4255 | 4124 | 7003 | 5184 |
| | Mw | 19344 | 17963 | 14740 | 16958 | 16737 | 18581 |
| | Mw/Mn | 3.77 | 3.48 | 3.46 | 4.11 | 2.39 | 3.58 |

TABLE 2

| | | Type of polymer | | | | | |
|---|---|---|---|---|---|---|---|
| | | A1-7 | A1-8 | A1-9 | A1-10 | A1-11 | A1-12 |
| Solvent | Xylene | 100 | 100 | 100 | 100 | 100 | 100 |
| Ingredient dropped | Triisopropylsilyl acrylate | 60 | 55 | 50 | 50 | 50 | 50 |
| | Triisobutylsilyl methacrylate | | | | | | |
| | Di-sec-butylmetbylsilyl methacrylate | | | | | | |
| | Diisopropylmethylsilyl methacrylate | | | | | | |
| | Methyl methacrylate | 35 | 35 | 47 | 45 | 45 | 45 |
| | 2-Hydroxypropyl acrylate | 5 | 10 | 3 | | | |
| | 2-Hydroxybutyl acrylate | | | | | | |
| | 2-Hydroxyethyl acrylate | | | | 5 | | |
| | 2-Hydroxyethyl methacrylate | | | | | 5 | |

TABLE 2-continued

|  |  |  | Type of polymer | | | | | |
|---|---|---|---|---|---|---|---|---|
|  |  |  | A1-7 | A1-8 | A1-9 | A1-10 | A1-11 | A1-12 |
|  | 2-Hydroxypropyl methacrylate |  |  |  |  |  |  | 5 |
|  | 4-Hydroxybutyl acrylate |  |  |  |  |  |  |  |
|  | 2-Hydroxybutyl methacrylate |  |  |  |  |  |  |  |
|  | 6-Hydroxyhexyl acrylate |  |  |  |  |  |  |  |
|  | 3-chloro-2-hydroxypropyl methacrylate |  |  |  |  |  |  |  |
|  | Polyethylene glycol monomethacrylate (n = 5) |  |  |  |  |  |  |  |
|  | Polyethylene glycol monomethacrylate (n = 15) |  |  |  |  |  |  |  |
|  | Polypropylene glycol monomethacrylate (n = 5) |  |  |  |  |  |  |  |
|  | Polypropylene glycol monomethacrylate (n = 12) |  |  |  |  |  |  |  |
|  | N-Methoxymethyl acrylamide |  |  |  |  |  |  |  |
|  | N-Ethoxymethyl acrylamide |  |  |  |  |  |  |  |
|  | Diacetone acrylamide |  |  |  |  |  |  |  |
|  | 2,2'-Azobisisobutyronitrile |  | 1 | 1 | 1 | 1 | 1 | 1 |
| Properties | Heating residue (wt. %) |  | 50.1 | 49.9 | 51.2 | 51.2 | 51.3 | 51.3 |
| of Product | Viscosity/250° C. (cps) |  | 349 | 207 | 346 | 364 | 463 | 438 |
|  | GPC measured value | Mn | 5023 | 4992 | 4166 | 5214 | 5046 | 5207 |
|  |  | Mw | 18159 | 18419 | 18387 | 19155 | 17928 | 18985 |
|  |  | Mw/Mn | 3.62 | 3.69 | 4.41 | 3.67 | 3.55 | 3.65 |

TABLE 3

|  |  |  | Type of polymer | | | | | |
|---|---|---|---|---|---|---|---|---|
|  |  |  | A1-13 | A1-14 | A1-15 | A1-16 | A1-17 | A1-18 |
| Solvent | Xylene |  | 100 | 100 | 100 | 100 | 100 | 100 |
| Ingredient | Triisopropylsilyl acrylate |  | 50 | 50 | 50 | 50 | 50 | 50 |
| dropped | Triisobutylsilyl methacrylate |  |  |  |  |  |  |  |
|  | Di-sec-butylmethylsilyl methacrylate |  |  |  |  |  |  |  |
|  | Diisopropylmethylsilyl methacrylate |  |  |  |  |  |  |  |
|  | Methyl methacrylate |  | 45 | 45 | 45 | 45 | 45 | 45 |
|  | 2-Hydroxypropyl acrylate |  |  |  |  |  |  |  |
|  | 2-Hydroxybutyl acrylate |  |  |  |  |  |  |  |
|  | 2-Hydroxyethyl acrylate |  |  |  |  |  |  |  |
|  | 2-Hydroxyethyl methacrylate |  |  |  |  |  |  |  |
|  | 2-Hydroxypropyl methacrylate |  |  |  |  |  |  |  |
|  | 4-Hydroxybutyl acrylate |  | 5 |  |  |  |  |  |
|  | 2-Hydroxybutyl methacrylate |  |  | 5 |  |  |  |  |
|  | 6-Hydroxyhexyl acrylate |  |  |  | 5 |  |  |  |
|  | 3-Chloro-2-hydroxypropyl methacrylate |  |  |  |  | 5 |  |  |
|  | Polyethylene glycol monomethacrylate (n = 5) |  |  |  |  |  | 5 |  |
|  | Polyethylene glycol monomethacrylate (n = 15) |  |  |  |  |  |  | 5 |
|  | Polypropylene glycol monomethacrylate (n = 5) |  |  |  |  |  |  |  |
|  | Polypropylene glycol monomethacrylate (n = 12) |  |  |  |  |  |  |  |
|  | N-Methoxymethyl acrylamide |  |  |  |  |  |  |  |
|  | N-Ethoxymethyl acrylamide |  |  |  |  |  |  |  |
|  | Diacetone acrylamide |  |  |  |  |  |  |  |
|  | 2,2'-Azobisisobutyronitrile |  | 1 | 1 | 1 | 1 | 1 | 1 |
| Properties | Heating residue (wt. %) |  | 50.7 | 51.0 | 50.5 | 50.9 | 50.9 | 49.8 |
| of Product | Viscosity/25° C. (cps) |  | 345 | 414 | 314 | 422 | 374 | 369 |
|  | GPC measured value | Mn | 5290 | 5206 | 5351 | 5195 | 5382 | 5338 |
|  |  | Mw | 20198 | 19495 | 19792 | 18969 | 27009 | 31479 |
|  |  | Mw/Mn | 3.82 | 3.75 | 3.70 | 3.65 | 5.02 | 5.90 |

TABLE 4

|  |  | Type of polymer | | | | |
|---|---|---|---|---|---|---|
|  |  | A1-19 | A1-20 | A1-21 | A1-22 | A1-23 |
| Solvent | Xylene | 100 | 100 | 100 | 100 | 100 |
| Ingredient | Triisopropylsilyl acrylate | 50 | 50 | 50 | 50 | 50 |
| dropped | Triisobutylsilyl methacrylate |  |  |  |  |  |
|  | Di-sec-butylmethylsilyl methacrylate |  |  |  |  |  |
|  | Diisopropylmethylsilyl methacrylate |  |  |  |  |  |
|  | Methyl methacrylate | 45 | 45 | 45 | 45 | 45 |
|  | 2-Hydroxypropyl acrylate |  |  |  |  |  |
|  | 2-Hydroxybutyl acrylate |  |  |  |  |  |
|  | 2-Hydroxyethyl acrylate |  |  |  |  |  |
|  | 2-Hydroxyethyl methacrylate |  |  |  |  |  |

TABLE 4-continued

|  |  |  | Type of polymer | | | | |
|---|---|---|---|---|---|---|---|
|  |  |  | A1-19 | A1-20 | A1-21 | A1-22 | A1-23 |
|  | 2-Hydroxypropyl methacrylate |  |  |  |  |  |  |
|  | 4-Hydroxybutyl acrylate |  |  |  |  |  |  |
|  | 2-Hydroxybutyl methacrylate |  |  |  |  |  |  |
|  | 6-Hydroxyhexyl acrylate |  |  |  |  |  |  |
|  | 3-Chloro-2-hydroxypropyl methacrylate |  |  |  |  |  |  |
|  | Polyethylene glycol monomethacrylate (n = 5) |  |  |  |  |  |  |
|  | Polyethylene glycol monomethacrylate (n = 15) |  |  |  |  |  |  |
|  | Polypropylene glycol monomethacrylate (n = 5) |  | 5 |  |  |  |  |
|  | Polypropylene glycol monomethacrylate (n = 12) |  |  | 5 |  |  |  |
|  | N-Methoxymethyl acrylamide |  |  |  | 5 |  |  |
|  | N-Ethoxymethyl acrylamide |  |  |  |  | 5 |  |
|  | Diacetone acrylamide |  |  |  |  |  | 5 |
|  | 2,2'-Azobisisobutyronitrile |  | 1 | 1 | 1 | 1 | 1 |
| Properties | Heating residue (wt. %) |  | 50.5 | 50.6 | 51.3 | 50.9 | 51.4 |
| of Product | Viscosity/25° C. (cps) |  | 321 | 299 | 709 | 466 | 323 |
|  | GPC measured value | Mn | 5246 | 5086 | 5448 | 5470 | 5305 |
|  |  | Mw | 21142 | 23172 | 22232 | 20894 | 18408 |
|  |  | Mw/Mn | 4.03 | 4.56 | 4.08 | 3.82 | 3.47 |

TABLE 5

|  |  |  | Type of polymer | | | | |
|---|---|---|---|---|---|---|---|
|  |  |  | H-1 | H-2 | H-3 | H-4 | H-5 |
| Solvent | Xylene |  | 100 | 100 | 100 | 100 | 100 |
| Ingredient | Triisopropylsilyl acrylate |  | 50 | 70 | 50 | 60 | 50 |
| dropped | Methyl methacrylate |  | 50 | 30 | 45 | 30 | 48 |
|  | 2-Methoxyethyl acrylate |  |  |  | 5 | 10 |  |
|  | Diethylaminoethyl methacrylate |  |  |  |  |  | 2 |
|  | 2,2'-Azobisisobutyronitrile |  | 1 | 1 | 1 | 1 | 1 |
| Properties | Heating residue (wt. %) |  | 51.2 | 50.1 | 49.5 | 49.3 | 51.4 |
| of Product | Viscosity/25° C. (cps) |  | 408 | 111 | 196 | 179 | 506 |
|  | GPC measured value | Mn | 6618 | 4449 | 5016 | 5108 | 6538 |
|  |  | Mw | 19434 | 15773 | 17337 | 18007 | 19357 |
|  |  | Mw/Mn | 2.94 | 3.55 | 3.46 | 3.53 | 2.96 |

TABLE 6

|  |  | Type of plymer Example | | | | | |
|---|---|---|---|---|---|---|---|
|  | (part(s) by weight) | A2-1 | A2-2 | A2-3 | A2-4 | A2-5 | A2-6 |
| Solvent |  | 100 | 100 | 100 | 100 | 100 | 100 |
| Ingredient | Triisopropylsilyl acrylate | 50 | 55 | 60 | 60 | 55 |  |
| dropped | Triisobutylsilyl methacrylate |  |  |  |  |  | 45 |
|  | Di-sec-butylmethylsilyl methacrylate |  |  |  |  |  |  |
|  | Diisopropylmethylsilyl methacrylate |  |  |  |  |  |  |
|  | Triisopropylsilyl methacrylate |  |  |  |  |  |  |
|  | Tri-n-butylsilyl methacrylate | 5 | 5 | 5 | 5 | 5 | 3 |
|  | Dimethylhexylsilyl methacrylate |  |  |  |  |  |  |
|  | Trimethyl silyloxydimethylsilyl methacrylate |  |  |  |  |  |  |
|  | Methyl methacrylate | 45 | 40 | 35 | 20 | 25 | 52 |
|  | Ethyl acrylate |  |  |  | 15 | 15 |  |
|  | 2-Methoxyethyl acrylate |  |  |  |  |  |  |
|  | Diethylaminoethyl methacrylate |  |  |  |  |  |  |
|  | 2,2'-Azobisisobutyronitrile | 1 | 1 | 1 | 1 | 1 | 1 |
|  | Total (part(s) by weight) | 201 | 201 | 201 | 201 | 201 | 201 |
| Properties | Heating residue (wt. %) | 50.7 | 50.4 | 50.0 | 49.7 | 49.9 | 50.1 |
| of Product | Viscosity/25° C. (cps) | 264 | 200 | 154 | 109 | 131 | 207 |
|  | GPC measured value Mn | 5223 | 4938 | 4809 | 4628 | 4690 | 4187 |
|  | Mw | 19196 | 18197 | 16718 | 15425 | 16073 | 14112 |
|  | Mw/Mn | 3.68 | 3.69 | 3.48 | 3.33 | 3.43 | 3.37 |

TABLE 7

|  | (part(s) by weight) | Type of polymer Example | | | | |
|---|---|---|---|---|---|---|
|  |  | A2-7 | A2-8 | A2-9 | A2-10 | A2-11 |
| Solvent |  | 100 | 100 | 100 | 100 | 100 |
| Ingredient dropped | Triisopropylsilyl acrylate |  |  |  | 55 | 60 |
|  | Triisobutylsilyl methacrylate |  |  |  |  |  |
|  | Di-sec-butylmethylsilyl methacrylate | 45 |  |  |  |  |
|  | Diisopropylmethylsilyl methacrylate |  | 45 |  |  |  |
|  | Triisopropylsilyl methacrylate |  |  |  |  | 55 |
|  | Tri-n-butylsilyl methacrylate | 3 | 3 |  |  | 5 |
|  | Dimethylhexylsilyl methacrylate |  |  | 3 |  |  |
|  | Trimethylsilyloxydimethylsilyl methacrylate |  |  |  | 5 |  |
|  | Methyl methacrylate | 52 | 52 | 42 | 35 | 40 |
|  | Ethyl acrylate |  |  |  |  |  |
|  | 2-Methoxyethyl acrylate |  |  |  |  |  |
|  | Diethylaminoethyl methacrylate |  |  |  |  |  |
|  | 2,2'-Azobisisobutyronitrile | 1 | 1 | 1 | 1 | 1 |
|  | Total (part(s) by weight) | 201 | 201 | 201 | 201 | 201 |
| Properties of Product | Heating residue (wt. %) | 50.3 | 49.3 | 50.3 | 49.1 | 50.4 |
|  | Viscosity/25° C. (cps) | 310 | 551 | 194 | 129 | 200 |
|  | GPC measured value  Mn | 4042 | 5990 | 5068 | 4673 | 5123 |
|  | Mw | 16841 | 15319 | 19856 | 15837 | 19864 |
|  | Mw/Mn | 4.17 | 2.56 | 3.92 | 3.39 | 3.88 |

TABLE 8

| Ingredients | Ex. P1 | Ex. P2 | Ex. P3 | Ex. P4 | Ex. P5 | Ex. P6 | Ex. P7 | Ex. P8 | Ex. P9 |
|---|---|---|---|---|---|---|---|---|---|
| Copolymer solution |  |  |  |  |  |  |  |  |  |
| A1-1 | 26 |  |  |  |  |  |  |  |  |
| A1-2 |  | 26 |  |  |  |  |  |  |  |
| A1-3 |  |  | 26 |  |  |  |  |  |  |
| A1-4 |  |  |  | 26 |  |  |  |  |  |
| A1-5 |  |  |  |  | 26 |  |  |  |  |
| A1-6 |  |  |  |  |  | 26 |  |  |  |
| A1-7 |  |  |  |  |  |  | 26 |  |  |
| A1-8 |  |  |  |  |  |  |  | 26 |  |
| A1-9 |  |  |  |  |  |  |  |  | 26 |
| A1-10 |  |  |  |  |  |  |  |  |  |
| A1-11 |  |  |  |  |  |  |  |  |  |
| A1-12 |  |  |  |  |  |  |  |  |  |
| A1-13 |  |  |  |  |  |  |  |  |  |
| A1-14 |  |  |  |  |  |  |  |  |  |
| A1-15 |  |  |  |  |  |  |  |  |  |
| A1-16 |  |  |  |  |  |  |  |  |  |
| A1-17 |  |  |  |  |  |  |  |  |  |
| A1-18 |  |  |  |  |  |  |  |  |  |
| A1-19 |  |  |  |  |  |  |  |  |  |
| A1-20 |  |  |  |  |  |  |  |  |  |
| A1-21 |  |  |  |  |  |  |  |  |  |
| A1-22 |  |  |  |  |  |  |  |  |  |
| A1-23 |  |  |  |  |  |  |  |  |  |
| H-1 |  |  |  |  |  |  |  |  |  |
| H-2 |  |  |  |  |  |  |  |  |  |
| H-3 |  |  |  |  |  |  |  |  |  |
| H-4 |  |  |  |  |  |  |  |  |  |
| H-5 |  |  |  |  |  |  |  |  |  |
| Toyoparax 150 |  |  |  | 4 | 4 |  |  |  |  |
| Rutonal A-25 |  |  |  |  |  |  |  |  |  |
| Rosin solution |  |  |  |  |  |  |  |  |  |
| Copper naphthenate solution |  |  |  |  |  |  |  |  |  |
| Titanium white | 2 | 2 | 2 | 2 | 2 | 2 | 2 | 2 | 2 |
| Cuprous oxide | 43 | 43 | 43 | 43 | 43 | 43 | 43 | 43 | 43 |
| Zinc white | 6 | 6 | 6 | 6 | 6 | 6 | 6 | 6 | 6 |
| Copper pyrithione | 3 | 3 | 3 | 3 | 3 | 3 | 3 | 3 | 3 |
| Anhydrous gypsum D-1 | 1 | 1 | 1 | 1 | 1 | 1 | 1 | 1 | 1 |
| Disparon 4200-20 | 1.5 | 1.5 | 1.5 | 1.5 | 1.5 | 1.5 | 1.5 | 1.5 | 1.5 |

TABLE 8-continued

| Ingredients | Ex. P1 | Ex. P2 | Ex. P3 | Ex. P4 | Ex. P5 | Ex. P6 | Ex. P7 | Ex. P8 | Ex. P9 |
|---|---|---|---|---|---|---|---|---|---|
| Disparon A603-20X | 4 | 4 | 4 | 4 | 4 | 4 | 4 | 4 | 4 |
| Xylene | 13.5 | 13.5 | 13.5 | 9.5 | 9.5 | 13.5 | 13.5 | 13.5 | 13.5 |
| Total | 100 | 100 | 100 | 100 | 100 | 100 | 100 | 100 | 100 |
| Evaluation result | | | | | | | | | |
| Storage stability | 5 | 5 | 5 | 5 | 5 | 5 | 5 | 5 | 5 |
| Antifouling properties | 5 | 5 | 5 | 5 | 5 | 5 | 5 | 5 | 5 |
| Degree of consumption ($\mu$/month) | 5 | 4 | 3 | 3 | 5 | 6 | 8 | 7 | 3 |
| Condition of coating film | 5 | 5 | 5 | 5 | 5 | 5 | 5 | 5 | 5 |

TABLE 9

| Ingredients | Ex. P10 | Ex. P11 | Ex. P12 | Ex. P13 | Ex. P14 | Ex. P15 | Ex. P16 | Ex. P17 | Ex. P18 |
|---|---|---|---|---|---|---|---|---|---|
| Copolymer solution | | | | | | | | | |
| A1-1 | | | | | | | | | |
| A1-2 | | | | | | | | | |
| A1-3 | | | | | | | | | |
| A1-4 | | | | | | | | | |
| A1-5 | | | | | | | | | |
| A1-6 | | | | | | | | | |
| A1-7 | | | | | | | | | |
| A1-8 | | | | | | | | | |
| A1-9 | | | | | | | | | |
| A1-10 | 26 | | | | | | | | |
| A1-11 | | 26 | | | | | | | |
| A1-12 | | | 26 | | | | | | |
| A1-13 | | | | 26 | | | | | |
| A1-14 | | | | | 26 | | | | |
| A1-15 | | | | | | 26 | | | |
| A1-16 | | | | | | | 26 | | |
| A1-17 | | | | | | | | 26 | |
| A1-18 | | | | | | | | | 26 |
| A1-19 | | | | | | | | | |
| A1-20 | | | | | | | | | |
| A1-21 | | | | | | | | | |
| A1-22 | | | | | | | | | |
| A1-23 | | | | | | | | | |
| H-1 | | | | | | | | | |
| H-2 | | | | | | | | | |
| H-3 | | | | | | | | | |
| H-4 | | | | | | | | | |
| H-5 | | | | | | | | | |
| Toyoparax 150 | | | | | | | | | |
| Rutonal A-25 | | | | | | | | | |
| Rosin solution | | | | | | | | | |
| Copper naphthenate solution | | | | | | | | | |
| Titanium white | 2 | 2 | 2 | 2 | 2 | 2 | 2 | 2 | 2 |
| Cuprous oxide | 43 | 43 | 43 | 43 | 43 | 43 | 43 | 43 | 43 |
| Zinc white | 6 | 6 | 6 | 6 | 6 | 6 | 6 | 6 | 6 |
| Copper pyrithione | 3 | 3 | 3 | 3 | 3 | 3 | 3 | 3 | 3 |
| Anhydrous gypsum D-1 | 1 | 1 | 1 | 1 | 1 | 1 | 1 | 1 | 1 |
| Disparon 4200-20 | 1.5 | 1.5 | 1.5 | 1.5 | 1.5 | 1.5 | 1.5 | 1.5 | 1.5 |
| Disparon A603-20X | 4 | 4 | 4 | 4 | 4 | 4 | 4 | 4 | 4 |
| Xylene | 13.5 | 13.5 | 13.5 | 13.5 | 13.5 | 13.5 | 13.5 | 13.5 | 13.5 |
| Total | 100 | 100 | 100 | 100 | 100 | 100 | 100 | 100 | 100 |
| Evaluation result | | | | | | | | | |
| Storage stability | 5 | 5 | 5 | 5 | 5 | 5 | 5 | 5 | 5 |
| Antifouling properties | 5 | 5 | 5 | 5 | 5 | 5 | 5 | 5 | 5 |
| Degree of consumption ($\mu$/month) | 6 | 4 | 4 | 4 | 3 | 3 | 2 | 6 | 3 |
| Condition of coating film | 5 | 5 | 5 | 5 | 5 | 5 | 5 | 5 | 5 |

TABLE 10

| Ingredients | Ex. P19 | Ex. P20 | Ex. P21 | Ex. P22 | Ex. P23 | Ex. P24 | Ex. P25 | Ex. P26 | Ex. P27 |
|---|---|---|---|---|---|---|---|---|---|
| Copolymer solution | | | | | | | | | |
| A1-1 | | | | | | 22 | 22 | 20 | 20 |
| A1-2 | | | | | | | | | |
| A1-3 | | | | | | | | | |
| A1-4 | | | | | | | | | |
| A1-5 | | | | | | | | | |
| A1-6 | | | | | | | | | |
| A1-7 | | | | | | | | | |
| A1-8 | | | | | | | | | |
| A1-9 | | | | | | | | | |
| A1-10 | | | | | | | | | |
| A1-11 | | | | | | | | | |
| A1-12 | | | | | | | | | |
| A1-13 | | | | | | | | | |
| A1-14 | | | | | | | | | |
| A1-15 | | | | | | | | | |
| A1-16 | | | | | | | | | |
| A1-17 | | | | | | | | | |
| A1-18 | | | | | | | | | |
| A1-19 | 26 | | | | | | | | |
| A1-20 | | 26 | | | | | | | |
| A1-21 | | | 26 | | | | | | |
| A1-22 | | | | 26 | | | | | |
| A1-23 | | | | | 26 | | | | |
| H-1 | | | | | | | | | |
| H-2 | | | | | | | | | |
| H-3 | | | | | | | | | |
| H-4 | | | | | | | | | |
| H-5 | | | | | | | | | |
| Toyoparax 150 | | | | | | | | | |
| Rutonal A-25 | | | | | | 2 | 2 | | |
| Rosin solution | | | | | | | | 6 | 6 |
| Copper naphthenate solution | | | | | | | | | |
| Titanium white | 2 | 2 | 2 | 2 | 2 | 2 | 2 | 2 | 2 |
| Cuprous oxide | 43 | 43 | 43 | 43 | 43 | 43 | 43 | 43 | 43 |
| Zinc white | 6 | 6 | 6 | 6 | 6 | 6 | 6 | 6 | 6 |
| Copper pyrithione | 3 | 3 | 3 | 3 | 3 | 3 | 3 | 3 | 3 |
| Anhydrous gypsum D-1 | 1 | 1 | 1 | 1 | 1 | 1 | 1 | 1 | 1 |
| Disparon 4200-20 | 1.5 | 1.5 | 1.5 | 1.5 | 1.5 | 1.5 | 1.5 | 1.5 | 1.5 |
| Disparon A603-20X | 4 | 4 | 4 | 4 | 4 | 4 | 4 | 4 | 4 |
| Xylene | 13.5 | 13.5 | 13.5 | 13.5 | 13.5 | 15.5 | 15.5 | 13.5 | 13.5 |
| Total | 100 | 100 | 100 | 100 | 100 | 100 | 100 | 100 | 100 |
| Evaluation result | | | | | | | | | |
| Storage stability | 5 | 5 | 5 | 5 | 5 | 5 | 5 | 4 | 4 |
| Antifouling properties | 5 | 5 | 5 | 5 | 5 | 5 | 5 | 5 | 5 |
| Degree of consumption (μ/month) | 9 | 10 | 9 | 9 | 10 | 8 | 8 | 11 | 11 |
| Condition of coating film | 5 | 5 | 5 | 5 | 5 | 5 | 5 | 5 | 5 |

TABLE 11

| Ingredients | Ex. P28 | Ex. P29 |
|---|---|---|
| Copolymer solution | | |
| A1-1 | 22 | 22 |
| A1-2 | | |
| A1-3 | | |
| A1-4 | | |
| A1-5 | | |
| A1-6 | | |
| A1-7 | | |
| A1-8 | | |
| A1-9 | | |
| A1-10 | | |
| A1-11 | | |
| A1-12 | | |
| A1-13 | | |
| A1-14 | | |
| A1-15 | | |
| A1-16 | | |
| A1-17 | | |
| A1-18 | | |
| A1-19 | | |
| A1-20 | | |
| A1-21 | | |
| A1-22 | | |
| A1-23 | | |
| H-1 | | |

TABLE 11-continued

| Ingredients | Ex. P28 | Ex. P29 |
|---|---|---|
| H-2 | | |
| H-3 | | |
| H-4 | | |
| H-5 | | |
| Toyoparax 150 | | |
| Rutonal A-25 | | |
| Rosin solution | | |
| Copper naphthenate solution | 4 | 4 |
| Titanium white | 2 | 2 |
| Cuprous oxide | 43 | 43 |
| Zinc white | 6 | 6 |
| Copper pyrithione | 3 | 3 |
| Anhydrous gypsum D-1 | 1 | 1 |
| Disparon 4200-20 | 1.5 | 1.5 |
| Disparon A603-20X | 4 | 4 |

TABLE 11-continued

| Ingredients | Ex. P28 | Ex. P29 |
|---|---|---|
| Xylene | 13.5 | 13.5 |
| Total | 100 | 100 |
| Evaluation result | | |
| Storage stability | 4 | 4 |
| Antifouling properties | 5 | 5 |
| Degree of Consumption ($\mu$/month) | 10 | 10 |
| Condition of coating film | 5 | 5 |

TABLE 12

| Ingredients | Ex. Q1 | Ex. Q2 | Ex. Q3 | Ex. Q4 | Ex. Q5 | Ex. Q6 | Ex. Q7 | Ex. Q8 | Ex. Q9 |
|---|---|---|---|---|---|---|---|---|---|
| Copolymer solution | | | | | | | | | |
| A1-1 | 22 | | | | | | | | |
| A1-2 | | 22 | | | | | | | |
| A1-3 | | | 22 | | | | | | |
| A1-4 | | | | 22 | | | | | |
| A1-5 | | | | | 22 | | | | |
| A1-6 | | | | | | 22 | | | |
| A1-7 | | | | | | | 22 | | |
| A1-8 | | | | | | | | 22 | |
| A1-9 | | | | | | | | | 22 |
| A1-10 | | | | | | | | | |
| A1-11 | | | | | | | | | |
| A1-12 | | | | | | | | | |
| A1-13 | | | | | | | | | |
| A1-14 | | | | | | | | | |
| A1-15 | | | | | | | | | |
| A1-16 | | | | | | | | | |
| A1-17 | | | | | | | | | |
| A1-18 | | | | | | | | | |
| A1-19 | | | | | | | | | |
| A1-20 | | | | | | | | | |
| A1-21 | | | | | | | | | |
| A1-22 | | | | | | | | | |
| A1-23 | | | | | | | | | |
| H-1 | | | | | | | | | |
| H-2 | | | | | | | | | |
| H-3 | | | | | | | | | |
| H-4 | | | | | | | | | |
| H-5 | | | | | | | | | |
| Toyoparax 150 | | | | 4 | 4 | | | | |
| Rutonal A-25 | 2 | 2 | 2 | 2 | 2 | 2 | 2 | 2 | 2 |
| Rosin solution | | | | | | | | | |
| Copper naphthenate solution | | | | | | | | | |
| Titanium white | 2 | 2 | 2 | 2 | 2 | 2 | 2 | 2 | 2 |
| Cuprous oxide | 43 | 43 | 43 | 43 | 43 | 43 | 43 | 43 | 43 |
| Zinc white | 6 | 6 | 6 | 6 | 6 | 6 | 6 | 6 | 6 |
| Copper pyrithione | 3 | 3 | 3 | 3 | 3 | 3 | 3 | 3 | 3 |
| Anhydrous gypsum D-1 | 1 | 1 | 1 | 1 | 1 | 1 | 1 | 1 | 1 |
| Disparon 4200-20 | 1.5 | 1.5 | 1.5 | 1.5 | 1.5 | 1.5 | 1.5 | 1.5 | 1.5 |
| Disparon A603-20X | 4 | 4 | 4 | 4 | 4 | 4 | 4 | 4 | 4 |
| Xylene | 15.5 | 15.5 | 15.5 | 11.5 | 11.5 | 15.5 | 15.5 | 15.5 | 15.5 |
| Total | 100 | 100 | 100 | 100 | 100 | 100 | 100 | 100 | 100 |
| Evaluation result | | | | | | | | | |
| Storage stability | 5 | 5 | 5 | 5 | 5 | 5 | 5 | 5 | 5 |
| Antifouling properties | 5 | 5 | 5 | 5 | 5 | 5 | 5 | 5 | 5 |
| Degree of consumption ($\mu$/month) | 8 | 6 | 7 | 8 | 7 | 9 | 13 | 10 | 4 |

TABLE 12-continued

| Ingredients | Ex. Q1 | Ex. Q2 | Ex. Q3 | Ex. Q4 | Ex. Q5 | Ex. Q6 | Ex. Q7 | Ex. Q8 | Ex. Q9 |
|---|---|---|---|---|---|---|---|---|---|
| Condition of coating film | 5 | 5 | 5 | 5 | 5 | 5 | 5 | 5 | 5 |

TABLE 13

| Ingredients | Ex. Q10 | Ex. Q11 | Ex. Q12 | Ex. Q13 | Ex. Q14 | Ex. Q15 | Ex. Q16 | Ex. Q17 | Ex. Q18 |
|---|---|---|---|---|---|---|---|---|---|
| Copolymer solution | | | | | | | | | |
| A1-1 | | | | | | | | | |
| A1-2 | | | | | | | | | |
| A1-3 | | | | | | | | | |
| A1-4 | | | | | | | | | |
| A1-5 | | | | | | | | | |
| A1-6 | | | | | | | | | |
| A1-7 | | | | | | | | | |
| A1-8 | | | | | | | | | |
| A1-9 | | | | | | | | | |
| A1-10 | 22 | | | | | | | | |
| A1-11 | | 22 | | | | | | | |
| A1-12 | | | 22 | | | | | | |
| A1-13 | | | | 22 | | | | | |
| A1-14 | | | | | 22 | | | | |
| A1-15 | | | | | | 22 | | | |
| A1-16 | | | | | | | 22 | | |
| A1-17 | | | | | | | | 22 | |
| A1-18 | | | | | | | | | 22 |
| A1-19 | | | | | | | | | |
| A1-20 | | | | | | | | | |
| A1-21 | | | | | | | | | |
| A1-22 | | | | | | | | | |
| A1-23 | | | | | | | | | |
| H-1 | | | | | | | | | |
| H-2 | | | | | | | | | |
| H-3 | | | | | | | | | |
| H-4 | | | | | | | | | |
| H-5 | | | | | | | | | |
| Toyoparax 150 | | | | | | | | | |
| Rutonal A-25 | 2 | 2 | 2 | 2 | 2 | 2 | 2 | 2 | 2 |
| Rosin solution | | | | | | | | | |
| Copper naphthenate solution | | | | | | | | | |
| Titanium white | 2 | 2 | 2 | 2 | 2 | 2 | 2 | 2 | 2 |
| Cuprous oxide | 43 | 43 | 43 | 43 | 43 | 43 | 43 | 43 | 43 |
| Zinc white | 6 | 6 | 6 | 6 | 6 | 6 | 6 | 6 | 6 |
| Copper pyrithione | 3 | 3 | 3 | 3 | 3 | 3 | 3 | 3 | 3 |
| Anhydrous gypsum D-1 | 1 | 1 | 1 | 1 | 1 | 1 | 1 | 1 | 1 |
| Disparon 4200-20 | 1.5 | 1.5 | 1.5 | 1.5 | 1.5 | 1.5 | 1.5 | 1.5 | 1.5 |
| Disparon A603-20X | 4 | 4 | 4 | 4 | 4 | 4 | 4 | 4 | 4 |
| Xylene | 15.5 | 15.5 | 15.5 | 15.5 | 15.5 | 15.5 | 15.5 | 15.5 | 15.5 |
| Total | 100 | 100 | 100 | 100 | 100 | 100 | 100 | 100 | 100 |
| Evaluation result | | | | | | | | | |
| Storage stability | 5 | 5 | 5 | 5 | 5 | 5 | 5 | 5 | 5 |
| Antifouling properties | 5 | 5 | 5 | 5 | 5 | 5 | 5 | 5 | 5 |
| Degree of consumption ($\mu$/month) | 8 | 6 | 6 | 7 | 4 | 5 | 4 | 10 | 13 |
| Condition of coating film | 5 | 5 | 5 | 5 | 5 | 5 | 5 | 5 | 5 |

TABLE 14

| Ingredients | Ex. Q19 | Ex. Q20 | Ex. Q21 | Ex. Q22 | Ex. Q23 |
|---|---|---|---|---|---|
| Copolymer solution | | | | | |
| A1-1 | | | | | |
| A1-2 | | | | | |
| A1-3 | | | | | |
| A1-4 | | | | | |
| A1-5 | | | | | |
| A1-6 | | | | | |
| A1-7 | | | | | |
| A1-8 | | | | | |
| A1-9 | | | | | |
| A1-10 | | | | | |
| A1-11 | | | | | |
| A1-12 | | | | | |
| A1-13 | | | | | |
| A1-14 | | | | | |
| A1-15 | | | | | |
| A1-16 | | | | | |
| A1-17 | | | | | |
| A1-18 | | | | | |
| A1-19 | 22 | | | | |
| A1-20 | | 22 | | | |
| A1-21 | | | 22 | | |
| A1-22 | | | | 22 | |
| A1-23 | | | | | 22 |
| H-1 | | | | | |
| H-2 | | | | | |
| H-3 | | | | | |
| H-4 | | | | | |
| H-5 | | | | | |
| Toyoparax 150 | | | | | |
| Rutonal A-25 | 2 | 2 | 2 | 2 | 2 |
| Rosin solution | | | | | |
| Copper naphthenate solution | | | | | |
| Titanium white | 2 | 2 | 2 | 2 | 2 |
| Cuprous oxide | 43 | 43 | 43 | 43 | 43 |
| Zinc white | 6 | 6 | 6 | 6 | 6 |
| Copper pyrithione | 3 | 3 | 3 | 3 | 3 |
| Anhydrous gypsum D-1 | 1 | 1 | 1 | 1 | 1 |
| Disparon 4200-20 | 1.5 | 1.5 | 1.5 | 1.5 | 1.5 |
| Disparon A603-20X | 4 | 4 | 4 | 4 | 4 |
| Xylene | 15.5 | 15.5 | 15.5 | 15.5 | 15.5 |
| Total | 100 | 100 | 100 | 100 | 100 |
| Evaluation result | | | | | |
| Storage stability | 5 | 5 | 5 | 5 | 5 |
| Antifouling properties | 5 | 5 | 5 | 5 | 5 |
| Degree of consumption ($\mu$/month) | 15 | 18 | 14 | 16 | 17 |
| Condition of coating film | 5 | 5 | 5 | 5 | 5 |

TABLE 15

| Ingredients | Ex. Q24 | Ex. Q25 | Ex. Q26 | Ex. Q27 | Ex. Q28 | Ex. Q29 | Ex. Q30 | Ex. Q31 | Ex. Q32 |
|---|---|---|---|---|---|---|---|---|---|
| Copolymer solution | | | | | | | | | |
| A1-1 | 20 | | | | | | | | |
| A1-2 | | 20 | | | | | | | |
| A1-3 | | | 20 | | | | | | |
| A1-4 | | | | 20 | | | | | |
| A1-5 | | | | | 20 | | | | |
| A1-6 | | | | | | 20 | | | |
| A1-7 | | | | | | | 20 | | |
| A1-8 | | | | | | | | 20 | |
| A1-9 | | | | | | | | | 20 |
| A1-10 | | | | | | | | | |
| A1-11 | | | | | | | | | |
| A1-12 | | | | | | | | | |
| A1-13 | | | | | | | | | |
| A1-14 | | | | | | | | | |
| A1-15 | | | | | | | | | |
| A1-16 | | | | | | | | | |
| A1-17 | | | | | | | | | |
| A1-18 | | | | | | | | | |
| A1-19 | | | | | | | | | |
| A1-20 | | | | | | | | | |
| A1-21 | | | | | | | | | |
| A1-22 | | | | | | | | | |
| A1-23 | | | | | | | | | |
| H-1 | | | | | | | | | |
| H-2 | | | | | | | | | |
| H-3 | | | | | | | | | |

TABLE 15-continued

| Ingredients | Ex. Q24 | Ex. Q25 | Ex. Q26 | Ex. Q27 | Ex. Q28 | Ex. Q29 | Ex. Q30 | Ex. Q31 | Ex. Q32 |
|---|---|---|---|---|---|---|---|---|---|
| H-4 | | | | | | | | | |
| H-5 | | | | | | | | | |
| Toyoparax 150 | | | | 4 | 4 | | | | |
| Rutonal A-25 | | | | | | | | | |
| Rosin solution | 6 | 6 | 6 | 6 | 6 | 6 | 6 | 6 | 6 |
| Copper naphthenate solution | | | | | | | | | |
| Titanium white | 2 | 2 | 2 | 2 | 2 | 2 | 2 | 2 | 2 |
| Cuprous oxide | 43 | 43 | 43 | 43 | 43 | 43 | 43 | 43 | 43 |
| Zinc white | 6 | 6 | 6 | 6 | 6 | 6 | 6 | 6 | 6 |
| Copper pyrithione | 3 | 3 | 3 | 3 | 3 | 3 | 3 | 3 | 3 |
| Anhydrous gypsum D-1 | 1 | 1 | 1 | 1 | 1 | 1 | 1 | 1 | 1 |
| Disparon 4200-20 | 1.5 | 1.5 | 1.5 | 1.5 | 1.5 | 1.5 | 1.5 | 1.5 | 1.5 |
| Disparon A603-20X | 4 | 4 | 4 | 4 | 4 | 4 | 4 | 4 | 4 |
| Xylene | 13.5 | 13.5 | 13.5 | 9.5 | 9.5 | 13.5 | 13.5 | 13.5 | 13.5 |
| Total | 100 | 100 | 100 | 100 | 100 | 100 | 100 | 100 | 100 |
| Evaluation result | | | | | | | | | |
| Storage stability | 4 | 4 | 4 | 4 | 5 | 4 | 4 | 4 | 4 |
| Antifouling properties | 5 | 5 | 5 | 5 | 5 | 5 | 5 | 5 | 5 |
| Degree of consumption (μ/month) | 11 | 10 | 9 | 14 | 12 | 13 | 18 | 15 | 8 |
| Condition of coating film | 5 | 5 | 5 | 5 | 5 | 5 | 5 | 5 | 5 |

TABLE 16

| Ingredients | Ex. Q33 | Ex. Q34 | Ex. Q35 | Ex. Q36 | Ex. Q37 | Ex. Q38 | Ex. Q39 | Ex. O40 | Ex. Q41 |
|---|---|---|---|---|---|---|---|---|---|
| Copolymer Solution | | | | | | | | | |
| A1-1 | | | | | | | | | |
| A1-2 | | | | | | | | | |
| A1-3 | | | | | | | | | |
| A1-4 | | | | | | | | | |
| A1-5 | | | | | | | | | |
| A1-6 | | | | | | | | | |
| A1-7 | | | | | | | | | |
| A1-8 | | | | | | | | | |
| A1-9 | | | | | | | | | |
| A1-10 | 20 | | | | | | | | |
| A1-11 | | 20 | | | | | | | |
| A1-12 | | | 20 | | | | | | |
| A1-13 | | | | 20 | | | | | |
| A1-14 | | | | | 20 | | | | |
| A1-15 | | | | | | 20 | | | |
| A1-16 | | | | | | | 20 | | |
| A1-17 | | | | | | | | 20 | |
| A1-18 | | | | | | | | | 20 |
| A1-19 | | | | | | | | | |
| A1-20 | | | | | | | | | |
| A1-21 | | | | | | | | | |
| A1-22 | | | | | | | | | |
| A1-23 | | | | | | | | | |
| H-1 | | | | | | | | | |
| H-2 | | | | | | | | | |
| H-3 | | | | | | | | | |
| H-4 | | | | | | | | | |
| H-5 | | | | | | | | | |
| Toyoparax 150 | | | | | | | | | |
| Rutonal A-25 | | | | | | | | | |
| Rosin solution | 6 | 6 | 6 | 6 | 6 | 6 | 6 | 6 | 6 |
| Copper naphthenate solution | | | | | | | | | |
| Titanium white | 2 | 2 | 2 | 2 | 2 | 2 | 2 | 2 | 2 |
| Cuprous oxide | 43 | 43 | 43 | 43 | 43 | 43 | 43 | 43 | 43 |
| Zinc white | 6 | 6 | 6 | 6 | 6 | 6 | 6 | 6 | 6 |
| Copper pyrithione | 3 | 3 | 3 | 3 | 3 | 3 | 3 | 3 | 3 |
| Anhydrous gypsum D-1 | 1 | 1 | 1 | 1 | 1 | 1 | 1 | 1 | 1 |
| Disparon 4200-20 | 1.5 | 1.5 | 1.5 | 1.5 | 1.5 | 1.5 | 1.5 | 1.5 | 1.5 |
| Disparon A603-20X | 4 | 4 | 4 | 4 | 4 | 4 | 4 | 4 | 4 |

TABLE 16-continued

| Ingredients | Ex. Q33 | Ex. Q34 | Ex. Q35 | Ex. Q36 | Ex. Q37 | Ex. Q38 | Ex. Q39 | Ex. O40 | Ex. Q41 |
|---|---|---|---|---|---|---|---|---|---|
| Xylene | 13.5 | 13.5 | 13.5 | 13.5 | 13.5 | 13.5 | 13.5 | 13.5 | 13.5 |
| Total | 100 | 100 | 100 | 100 | 100 | 100 | 100 | 100 | 100 |
| Evaluation result | | | | | | | | | |
| Storage stability | 4 | 4 | 4 | 4 | 4 | 4 | 4 | 4 | 4 |
| Antifouling properties | 5 | 5 | 5 | 5 | 5 | 5 | 5 | 5 | 5 |
| Degree of consumption ($\mu$/month) | 13 | 10 | 11 | 11 | 8 | 8 | 7 | 14 | 18 |
| Condition of coating film | 5 | 5 | 5 | 5 | 5 | 5 | 5 | 5 | 5 |

TABLE 17

| Ingredients | Ex. Q42 | Ex. Q43 | Ex. Q44 | Ex. Q45 | Ex. Q46 | Ex. Q47 | Ex. Q48 | Ex. Q49 | Ex. Q50 |
|---|---|---|---|---|---|---|---|---|---|
| Copolymer solution | | | | | | | | | |
| A1-1 | | | | | | 22 | | 20 | |
| A1-2 | | | | | | | 22 | | 20 |
| A1-3 | | | | | | | | | |
| A1-4 | | | | | | | | | |
| A1-5 | | | | | | | | | |
| A1-6 | | | | | | | | | |
| A1-7 | | | | | | | | | |
| A1-8 | | | | | | | | | |
| A1-9 | | | | | | | | | |
| A1-10 | | | | | | | | | |
| A1-11 | | | | | | | | | |
| A1-12 | | | | | | | | | |
| A1-13 | | | | | | | | | |
| A1-14 | | | | | | | | | |
| A1-15 | | | | | | | | | |
| A1-16 | | | | | | | | | |
| A1-17 | | | | | | | | | |
| A1-18 | | | | | | | | | |
| A1-19 | 20 | | | | | | | | |
| A1-20 | | 20 | | | | | | | |
| A1-21 | | | 20 | | | | | | |
| A1-22 | | | | 20 | | | | | |
| A1-23 | | | | | 20 | | | | |
| H-1 | | | | | | | | | |
| H-2 | | | | | | | | | |
| H-3 | | | | | | | | | |
| H-4 | | | | | | | | | |
| H-5 | | | | | | | | | |
| Toyoparax 150 | | | | | | | | 1 | 1 |
| Rutonal A-25 | | | | | | | | | |
| Rosin solution | 6 | 6 | 6 | 6 | 6 | | | 5 | 5 |
| Copper naphthenate solution | | | | | | 4 | 4 | | |
| Titanium white | 2 | 2 | 2 | 2 | 2 | 2 | 2 | 2 | 2 |
| Cuprous oxide | 43 | 43 | 43 | 43 | 43 | 43 | 43 | 43 | 43 |
| Zinc white | 6 | 6 | 6 | 6 | 6 | 6 | 6 | 6 | 6 |
| Copper pyrithione | 3 | 3 | 3 | 3 | 3 | 3 | 3 | 3 | 3 |
| Anhydrous gypsum D-1 | 1 | 1 | 1 | 1 | 1 | 1 | 1 | 1 | 1 |
| Disparon 4200-20 | 1.5 | 1.5 | 1.5 | 1.5 | 1.5 | 1.5 | 1.5 | 1.5 | 1.5 |
| Disparon A603-20X | 4 | 4 | 4 | 4 | 4 | 4 | 4 | 4 | 4 |
| Xylene | 13.5 | 13.5 | 13.5 | 13.5 | 13.5 | 13.5 | 13.5 | 13.5 | 13.5 |
| Total | 100 | 100 | 100 | 100 | 100 | 100 | 100 | 100 | 100 |
| Evaluation result | | | | | | | | | |
| Storage stability | 4 | 4 | 4 | 4 | 4 | 4 | 4 | 4 | 4 |
| Antifouling properties | 5 | 5 | 5 | 5 | 5 | 5 | 5 | 5 | 5 |
| Degree of consumption ($\mu$/month) | 18 | 19 | 18 | 19 | 22 | 10 | 10 | 12 | 11 |
| Condition of coating film | 5 | 5 | 5 | 5 | 5 | 5 | 5 | 5 | 5 |

TABLE 18

| Ingredients | Ex. Q51 | Ex. Q52 | Comp Ex. PQ1 | Comp Ex. PQ2 | Comp Ex. PQ3 | Comp Ex. PQ4 | Comp Ex. PQ5 |
|---|---|---|---|---|---|---|---|
| Copolymer solution | | | | | | | |
| A1-1 | 22 | | | | | | |
| A1-2 | | 22 | | | | | |
| A1-3 | | | | | | | |
| A1-4 | | | | | | | |
| A1-5 | | | | | | | |
| A1-6 | | | | | | | |
| A1-7 | | | | | | | |
| A1-8 | | | | | | | |
| A1-9 | | | | | | | |
| A1-10 | | | | | | | |
| A1-11 | | | | | | | |
| A1-12 | | | | | | | |
| A1-13 | | | | | | | |
| A1-14 | | | | | | | |
| A1-15 | | | | | | | |
| A1-16 | | | | | | | |
| A1-17 | | | | | | | |
| A1-18 | | | | | | | |
| A1-19 | | | | | | | |
| A1-20 | | | | | | | |
| A1-21 | | | | | | | |
| A1-22 | | | | | | | |
| A1-23 | | | | | | | |
| H-1 | | | 26 | | | | |
| H-2 | | | | 26 | | | |
| H-3 | | | | | 26 | | |
| H-4 | | | | | | 26 | |
| H-5 | | | | | | | 26 |
| Toyoparax 150 | | | | | | | |
| Rutonal A-25 | 1 | 1 | | | | | |
| Rosin solution | | | | | | | |
| Copper naphthenate solution | 3 | 3 | | | | | |
| Titanium white | 2 | 2 | 2 | 2 | 2 | 2 | 2 |
| Cuprous oxide | 43 | 43 | 43 | 43 | 43 | 43 | 43 |
| Zinc white | 6 | 6 | 6 | 6 | 6 | 6 | 6 |
| Copper pyrithione | 3 | 3 | 3 | 3 | 3 | 3 | 3 |
| Anhydrous gypsum D-1 | 1 | 1 | 1 | 1 | 1 | 1 | 1 |
| Disparon 4200-20 | 1.5 | 1.5 | 1.5 | 1.5 | 1.5 | 1.5 | 1.5 |
| Disparon A603-20X | 4 | 4 | 4 | 4 | 4 | 4 | 4 |
| Xylene | 13.5 | 13.5 | 13.5 | 13.5 | 13.5 | 13.5 | 13.5 |
| Total | 100 | 100 | 100 | 100 | 100 | 100 | 100 |
| Evaluation result | | | | | | | |
| Storage stability | 4 | 4 | 5 | 5 | 5 | 5 | 2 |
| Antifouling properties | 5 | 5 | 1 | 1 | 2 | 2 | 5 |
| Degree of consumption ($\mu$/month) | 13 | 12 | 1 | 1 | 2 | 2 | 53 |
| Condition of coating film | 5 | 5 | 5 | 5 | 5 | 5 | 1 |

TABLE 19

| Ingredients | Ex. R1 | Ex. R2 | Ex. R3 | Ex. R4 | Ex. R5 | Ex. R6 | Ex. R7 | Ex. R8 | Ex. R9 | Ex. R10 |
|---|---|---|---|---|---|---|---|---|---|---|
| Copolymer solution | | | | | | | | | | |
| A2-1 | 26 | | | | | | | | | |
| A2-2 | | 26 | | | | | | | | |
| A2-3 | | | 26 | | | | | | | |
| A2-4 | | | | 26 | | | | | | |
| A2-5 | | | | | 26 | | | | | |
| A2-6 | | | | | | 26 | | | | |
| A2-7 | | | | | | | 26 | | | |
| A2-8 | | | | | | | | 26 | | |
| A2-9 | | | | | | | | | 26 | |
| A2-10 | | | | | | | | | | 26 |
| A2-11 | | | | | | | | | | |

TABLE 19-continued

| Ingredients | Ex. R1 | Ex. R2 | Ex. R3 | Ex. R4 | Ex. R5 | Ex. R6 | Ex. R7 | Ex. R8 | Ex. R9 | Ex. R10 |
|---|---|---|---|---|---|---|---|---|---|---|
| H-1 | | | | | | | | | | |
| H-2 | | | | | | | | | | |
| H-3 | | | | | | | | | | |
| H-4 | | | | | | | | | | |
| H-5 | | | | | | | | | | |
| Toyoparax 150 | | | | | | 4 | 4 | 4 | | |
| Rutonal A-25 | | | | | | | | | | |
| Rosin solution | | | | | | | | | | |
| Copper naphthenate solution | | | | | | | | | | |
| Titanium white | 2 | 2 | 2 | 2 | 2 | 2 | 2 | 2 | 2 | 2 |
| Cuprous oxide | 43 | 43 | 43 | 43 | 43 | 43 | 43 | 43 | 43 | 43 |
| Zinc white | 6 | 6 | 6 | 6 | 6 | 6 | 6 | 6 | 6 | 6 |
| Copper pyrithione | 3 | 3 | 3 | 3 | 3 | 3 | 3 | 3 | 3 | 3 |
| 4,5-Dichloro-2-n-octyl-4-isothiazoline-3-one | | | | | | | | | | |
| Pyridine triphenylborane | | | | | | | | | | |
| 2,4,5,6-Tetrachloroiso phthalonitrile | | | | | | | | | | |
| 2,4,6-Trichlorophenyl maleimide | | | | | | | | | | |
| N,N-Dimethyldichloro phenylurea | | | | | | | | | | |
| Anhydrous gypsum D-1 | 1 | 1 | 1 | 1 | 1 | 1 | 1 | 1 | 1 | 1 |
| Disparon 4200-20 | 1.5 | 1.5 | 1.5 | 1.5 | 1.5 | 1.5 | 1.5 | 1.5 | 1.5 | 1.5 |
| Disparon A603-20X | 4 | 4 | 4 | 4 | 4 | 4 | 4 | 4 | 4 | 4 |
| Xylene | 13.5 | 13.5 | 13.5 | 13.5 | 13.5 | 9.5 | 9.5 | 9.5 | 13.5 | 13.5 |
| Total (parts by weight) | 100 | 100 | 100 | 100 | 100 | 100 | 100 | 100 | 100 | 100 |
| Evaluation result | | | | | | | | | | |
| Storage stability | 5 | 5 | 5 | 5 | 5 | 4 | 4 | 4 | 4 | 4 |
| Antifouling properties | 5 | 5 | 5 | 5 | 5 | 5 | 5 | 5 | 5 | 5 |
| Degree of consumption ($\mu$/2 months) | 11 | 12 | 15 | 18 | 14 | 12 | 13 | 15 | 12 | 19 |
| Condition of coating film | 5 | 5 | 5 | 5 | 5 | 5 | 5 | 5 | 5 | 5 |

TABLE 20

| Ingredients | Ex. R11 | Ex. R12 | Ex. R13 | Ex. R14 | Ex. R15 | Ex. R16 | Ex. R17 | Ex. R18 | Ex. R19 |
|---|---|---|---|---|---|---|---|---|---|
| Copolymer solution | | | | | | | | | |
| A2-1 | 22 | 20 | 22 | | | | | | |
| A2-2 | | | | 22 | 20 | 22 | | | 26 |
| A2-3 | | | | | | | | | |
| A2-4 | | | | | | | 20 | 20 | |
| A2-5 | | | | | | | | | |
| A2-6 | | | | | | | | | |
| A2-7 | | | | | | | | | |
| A2-8 | | | | | | | | | |
| A2-9 | | | | | | | | | |
| A2-10 | | | | | | | | | |
| A2-11 | | | | | | | | | |
| H-1 | | | | | | | | | |
| H-2 | | | | | | | | | |
| H-3 | | | | | | | | | |
| H-4 | | | | | | | | | |
| H-5 | | | | | | | | | |
| Toyoparax 150 | | | | | | | | | |
| Rutonal A-25 | 2 | | | 2 | | | | 1 | |
| Rosin solution | | 6 | | | 6 | | 6 | 5 | |
| Copper naphthenate solution | | | 4 | | | 4 | | | |
| Titanium white | 2 | 2 | 2 | 2 | 2 | 2 | 2 | 2 | 2 |
| Cuprous oxide | 43 | 43 | 43 | 43 | 43 | 43 | 43 | 43 | 43 |
| Zinc white | 6 | 6 | 6 | 6 | 6 | 6 | 6 | 6 | 6 |
| Copper pyrithione | 3 | 3 | 3 | 3 | 3 | 3 | 3 | 3 | |
| 4,5-Dichloro-2-n-octyl- | | | | 1 | 1 | 1 | 1 | 1 | |

TABLE 20-continued

| Ingredients | Ex. R11 | Ex. R12 | Ex. R13 | Ex. R14 | Ex. R15 | Ex. R16 | Ex. R17 | Ex. R18 | Ex. R19 |
|---|---|---|---|---|---|---|---|---|---|
| 4-isothiazoline-3-one | | | | | | | | | |
| Pyridine triphenylborane | | | | | | | | | 3 |
| 2,4,5,6-Tetrachloroiso phthalonitrile | | | | | | | | | |
| 2,4,6-Trichlorophenyl maleimide | | | | | | | | | |
| N,N-Dimethyldichloro phenylurea | | | | | | | | | |
| Anhydrous gypsum D-1 | 1 | 1 | 1 | 1 | 1 | 1 | 1 | 1 | 1 |
| Disparon 4200-20 | 1.5 | 1.5 | 1.5 | 1.5 | 1.5 | 1.5 | 1.5 | 1.5 | 1.5 |
| Disparon A603-20X | 4 | 4 | 4 | 4 | 4 | 4 | 4 | 4 | 4 |
| Xylene | 15.5 | 13.5 | 13.5 | 14.5 | 12.5 | 12.5 | 12.5 | 12.5 | 13.5 |
| Total (Parts by weight) | 100 | 100 | 100 | 100 | 100 | 100 | 100 | 100 | 100 |
| Evaluation result | | | | | | | | | |
| Storage stability | 5 | 5 | 4 | 5 | 5 | 4 | 5 | 5 | 5 |
| Antifouling properties | 5 | 5 | 5 | 5 | 5 | 5 | 5 | 5 | 5 |
| Degree of consumption ($\mu$/2 months) | 13 | 21 | 20 | 15 | 24 | 22 | 25 | 26 | 14 |
| Condition of coating film | 5 | 5 | 5 | 5 | 5 | 5 | 5 | 5 | 5 |

TABLE 21

| Ingredients | Ex. R20 | Ex. R21 | Ex. R22 | Ex. R23 | Comp Ex. R1 | Comp Ex. R2 | Comp Ex. R3 | Comp Ex. R4 | Comp Ex. R5 |
|---|---|---|---|---|---|---|---|---|---|
| Copolymer solution | | | | | | | | | |
| A2-1 | | | | | | | | | |
| A2-2 | | | 26 | 22 | | | | | |
| A2-3 | | | | | | | | | |
| A2-4 | | | | | | | | | |
| A2-5 | | | | | | | | | |
| A2-6 | | | | | | | | | |
| A2-7 | | | | | | | | | |
| A2-8 | | | | | | | | | |
| A2-9 | | | | | | | | | |
| A2-10 | | | | | | | | | |
| A2-11 | 26 | 22 | | | | | | | |
| H-1 | | | | | 26 | | | | |
| H-2 | | | | | | 26 | | | |
| H-3 | | | | | | | 26 | | |
| H-4 | | | | | | | | 26 | |
| H-5 | | | | | | | | | 26 |
| Toyoparax 150 | | | | 0.5 | | | | | |
| Rutonal A-25 | | 2 | | 2 | | | | | |
| Rosin solution | | | | | | | | | |
| Copper naphthenate solution | | | | | | | | | |
| Titanium white | 2 | 2 | 2 | 2 | 2 | 2 | 2 | 2 | 2 |
| Cuprous oxide | 43 | 43 | 43 | 43 | 43 | 43 | 43 | 43 | 43 |
| Zinc white | 6 | 6 | 6 | 6 | 6 | 6 | 6 | 6 | 6 |
| Copper pyrithione | 3 | 2 | | | 3 | 3 | 3 | 3 | 3 |
| 4,5-Dichloro-2-n-octyl-4-isothiazoline-3-one | | 1 | | 1 | | | | | |
| Pyridine triphenylborane | | | | | | | | | |
| 2,4,5,6-Tetrachloroiso phthalonitrile | | | 2 | | | | | | |
| 2,4,6-Trichlorophenyl maleimide | | | 1 | | | | | | |
| N,N-Dimethyldichloro phenylurea | | | | 3 | | | | | |
| Anhydrous gypsum D-1 | 1 | 1 | 1 | 1 | 1 | 1 | 1 | 1 | 1 |
| Disparon 4200-20 | 1.5 | 1.5 | 1.5 | 1.5 | 1.5 | 1.5 | 1.5 | 1.5 | 1.5 |

TABLE 21-continued

| Ingredients | Ex. R20 | Ex. R21 | Ex. R22 | Ex. R23 | Comp Ex. R1 | Comp Ex. R2 | Comp Ex. R3 | Comp Ex. R4 | Comp Ex. R5 |
|---|---|---|---|---|---|---|---|---|---|
| Disparon A603-20X | 4 | 4 | 4 | 4 | 4 | 4 | 4 | 4 | 4 |
| Xylene | 13.5 | 15.5 | 13.5 | 14.0 | 13.5 | 13.5 | 13.5 | 13.5 | 13.5 |
| Total (Parts by weight) | 100 | 100 | 100 | 100 | 100 | 100 | 100 | 100 | 100 |
| Evaluation result | | | | | | | | | |
| Storage stability | 5 | 5 | 5 | 5 | 5 | 5 | 5 | 5 | 2 |
| Antifouling properties | 5 | 5 | 5 | 5 | 1 | 1 | 2 | 2 | 5 |
| Degree of consumption (μ/2 months) | 11 | 12 | 13 | 14 | 4 | 4 | 5 | 6 | 109 |
| Condition of coating film | 5 | 5 | 5 | 5 | 5 | 5 | 5 | 5 | 1 |

What is claimed is:

1. A silyl (meth)acrylate copolymer (A-1) comprising:
   (a) silyl (meth)acrylate constituent units represented by the following formula (I) in amounts of 20 to 80% by weight:

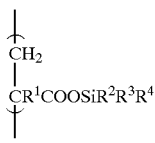

(I)

wherein $R^1$ is a hydrogen atom or a methyl group, and $R^2$, $R^3$ and $R^4$ may be the same or different and are each an alkyl group, a cycloalkyl group or a phenyl group, (b) acrylic unsaturated monomer constituent units represented by the following formula (II) in amounts of 0.01 to 40% by weight:

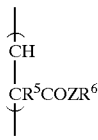

(II)

wherein $R^5$ is a hydrogen atom or a methyl group, Z is an oxygen atom or —$NR^7$, when Z is an oxygen atom, $R^6$ is a hydroxyalkyl or hydroxycycloalkyl group or a polyalkylene glycol group represented by the formula —$(R^8O)_nH$ (wherein $R^8$ is an alkylene group and n is an integer of 2 to 50), and when Z is —$NR^7$, $R^7$ is an unsubstituted alkyl group or an alkyl group substituted with any of a halogen atom, a hydroxyl group, an amino group, an acyl group and an alkoxy group, and $R^6$ is a hydrogen atom, and (c) unsaturated monomer constituent units other than the constituent units (a) and (b) in amounts of 5 to 79.99% by weight,
      with the proviso that the total amount of the constituent units (a), (b) and (c) is 100% by weight,
         said silyl (meth)acrylate copolymer (A-1) having a weight-average molecular weight, as measured by gel permeation chromatography (GPC), of not more than 200,000.

2. An antifouling paint composition comprising the silyl (meth)acrylate copolymer (A-1), as set forth in claim 1.

3. An antifouling paint composition comprising the silyl (meth)acrylate copolymer (A-1) as set forth in claim 1 and an antifouling agent (B).

4. An antifouling paint composition comprising the silyl (meth)acrylate copolymer (A-1) as set forth in claim 1, an antifouling agent (B) and zinc oxide (C).

5. An antifouling paint composition comprising the silyl (meth)acrylate copolymer (A-1) as set forth in claim 1, an antifouling agent (B) and an inorganic dehydrating agent (D).

6. An antifouling paint composition comprising the silyl (meth)acrylate copolymer (A-1) as set forth in claim 1, an antifouling agent (B), zinc oxide (C) and an inorganic dehydrating agent (D).

7. An antifouling paint composition comprising the silyl (meth)acrylate copolymer (A-1) as set forth in claim 1, an antifouling agent (B) and a (co)polymer (E) containing constituent units derived from a vinyl ether represented by the following formula (V):

$H_2C=CHO=R$ (V)

wherein R is a hydrocarbon group.

8. An antifouling paint composition comprising the silyl (meth)acrylate copolymer (A-1) as set forth in claim 1, an antifouling agent (B) and an elution accelerating component (F).

9. An antifouling paint composition comprising the (meth)acrylate copolymer (A-1) as set forth in claim 1, an antifouling agent (B), a vinyl ether (co)polymer (E) containing constituent units derived from a vinyl ether represented by the following formula (V):

$H_2C=CHO—R$ (V)

wherein R is a hydrocarbon group and an elution accelerating component (F).

10. An antifouling coating film formed from the antifouling paint composition as claimed in claim 3.

11. A method of protecting a substrate subject to exposure to aqueous environments against fouling caused by organisms present in said aqueous environments comprising applying to said substrate a coating of an antifouling paint composition as set forth in claim 3.

12. A hull or underwater structure, the surface of which is coated with a coating film comprising the antifouling paint composition comprising copolymer (A-1) as claimed in claim 3.

13. The silyl (meth)acrylate copolymer (A-1) as set forth in claim 1, wherein in the constituent units (a) of formula (I), when any of groups $R^2$, $R^3$ and $R^4$ is a phenyl group, the phenyl group may be unsubstituted or substituted with alkyl, aryl or halogen atom.

14. The silyl (meth)acrylate copolymer (A-1) as set forth in claim 1, wherein in the acrylic unsaturated monomer constituent units represented by formula (II), when $R^6$ is said hydroxyalkyl group, said group may be unsubstituted or substituted with chlorine atom or phenoxy group.

15. The silyl (meth)acrylate copolymer (A-1) as set forth in claim 1, wherein in the constituent units (b) of formula (II) said amino group is unsubstituted amino group or is a methyl substituted amino group.

16. The silyl (meth)acrylate copolymer according to claim 1, wherein, in the silyl (meth)acrylate constituent units (a) of formula (I), $R^2$, $R^3$, and $R^4$, independently, represent alkyl of 1 to 6 carbon atoms, cycloalkyl of 3 to 8 carbon atoms, phenyl, or phenyl substituted with alkyl, aryl or halogen, at least one of $R^2$, $R^3$, and $R^4$, having at least 3 carbon atoms, and further wherein the total number of carbon atoms in $R^2$, $R^3$, and $R^4$ is from 5 to 21.

17. The silyl (meth)acrylate copolymer according to claim 1 or claim 16, wherein, in the acrylic unsaturated monomer units (b) of formula (II), Z represents oxygen.

18. The silyl (meth)acrylate copolymer according to claim 17, wherein, in formula (II), $R^6$ represents hydroxyalkyl having from 2 to 9 carbon atoms, said hydroxyalkyl substituted with chlorine atom or phenoxy group, hydroxycycloalkyl having from 3 to 8 carbon atoms, said hydroxycycloalkyl substituted with chlorine atom or phenoxy group, or said polyalkylene glycol group represented by said formula —$(R^8O)_nH$, and having from 2 to 4 carbon atoms.

19. The silyl (meth)acrylate copolymer according to claim 1, wherein the acrylic unsaturated monomer units represented by formula (II) are selected from the group consisting of 2-hydroxypropyl acrylate and 2-hydroxybutyl methacrylate.

20. The silyl (meth)acrylate copolymer according to claim 1, wherein, in the acrylic unsaturated monomer units (b) of formula (II), Z represents —$NR^7$.

21. The silyl (meth)acrylate copolymer according to any one of claims 1, 16, 17 or 20 wherein the unsaturated monomer constituent units (c) are derived from one or more monomers selected from the group consisting of (meth) acrylic esters, styrenes, vinyl esters, itaconic esters, fumaric esters and maleic esters.

22. The silyl (meth)acrylate copolymer according to any one of claims 1, 16, 17 or 20, wherein the unsaturated monomer constituent units (c) are selected from the group consisting of methyl (meth)acrylate, ethyl (meth)acrylate, octyl (meth)acrylate, styrene, vinyltoluene, α-methylstyrene, vinyl acetate, vinyl benzoate, vinyl propionate and vinyl butyrate.

23. The silyl (meth)acrylate copolymer according to any one of claims 1, 16, 17 or 20, wherein the amounts of constituent units (a), (b) and (c) are, 30 to 70 percent by weight, 0.1 to 20 percent by weight, and 10 to 60 percent by weight, respectively.

24. A process for preparing a silyl (meth)acrylate copolymer (A-1) as set forth in claim 1, comprising polymerizing (a1) 20 to 80% by weight, silyl (meth)acrylate represented by the following formula (I-a):

(I-a)

where $R^1$, $R^2$, $R^3$ and $R^4$ are defined above;

(b1) 0.01 to 40% by weight of an acrylic unsaturated monomer represented by the following formula (II-a):

(II-a)

where $R^5$, $R^6$ and Z are as defined above, and (c1) 5 to 79.99% by weight of unsaturated monomer other than the monomers (a1) and (b1) and which is copolymerizable with monomers (a1) and (b1), with the proviso that the sum of monomers (a1), (b1) and (c1) is 100% by weight, in the absence of a radical polymerization initiator.

25. The process for preparing a silyl (meth)acrylate copolymer (A-1) as set forth in claim 24, wherein in the silyl (meth)acrylate represented by formula (I-a), when any of groups $R^2$, $R^3$ and $R^4$ is a phenyl group, the phenyl group may be unsubstituted or substituted with alkyl, aryl or halogen atom.

26. The process for preparing a silyl (meth)acrylate copolymer (A-1) as set forth in claim 24, wherein in the acrylic unsaturated monomer represented by formula (II-a), when $R^6$ is said hydroxyalkyl group, said group may be unsubstituted or substituted with chlorine atom or phenoxy group.

27. The process for preparing a silyl (meth)acrylate copolymer (A-1) as set forth in claim 24, wherein in the acrylic unsaturated monomer of formula (II-a), said amino group is an unsubstituted amino group or is a methyl substituted amino group.

28. The process according to claim 24, wherein the silyl (meth)acrylate (a1) represented by formula (I-a) is at least one monomer selected from the group consisting of trimethylsilyl (meth)acrylate, triethylsilyl (meth)acrylate, tripropylsilyl (meth)acrylate, triisopropylsilyl (meth)acrylate, tributylsilyl (meth)acrylate, tri-sec-butylsilyl (meth) acrylate, triisobutylsilyl (meth)acrylate, sec-butylmethylsilyl (meth)acrylate, sec-butyldimethylsilyl (meth)acrylate, dimethylpropylsilyl (meth)acrylate, monomethyldipropylsilyl (meth)acrylate, and methylethylpropylsilyl (meth)acrylate; the acrylic unsaturated monomer (b1) represented by the formula (II-a) is at least one monomer selected from the group consisting of 2-hydroxyethyl acrylate, 2-hydroxyethyl methacrylate, 2-hydroxypropyl acrylate, 2-hydroxypropyl methacrylate, 3-chloro-2-hydroxypropyl methacrylate, 3-phenoxy-2-hydroxypropyl acrylate, 4-hydroxybutyl acrylate, 2-hydroxybutyl acrylate, 2-hydroxybutyl methacrylate, 6-hydroxyhexyl acrylate, 1,4-hydroxyhexanedimethanol monoacrylate, polyethylene glycol monomethacrylate (n=2), polyethylene glycol monomethacrylate (n=4), polyethylene glycol monomethacrylate (n=5), polyethylene glycol monomethacrylate (n=8), polyethylene glycol monomethacrylate (n=10), polyethylene glycol monomethacrylate (n=15) polypropylene glycol monomethacrylate (n=5), polypropylene glycol monomethacrylate (n=9) and polypropylene glycol monomethacrylate (n=12); and the unsaturated monomer other (c1) is at least one monomer selected from the group consisting of (meth)acrylic esters, styrenes, vinyl esters, itaconic esters, fumaric esters and maleic esters.

29. The process according to claim 28, wherein the acrylic unsaturated monomer (b1) is 2-hydroxypropyl acrylate or 2-hydroxybutyl methacrylate.

30. The process according to claim 24, wherein the silyl (meth)acrylate (a1) represented by formula (I-a) is at least one monomer selected from the group consisting of trimethylsilyl (meth)acrylate, trimethylsilyl (meth)acrylate, triethylsilyl (meth)acrylate, tripropylsilyl (meth)acrylate, triisopropylsilyl (meth)acrylate, tributylsilyl (meth)acrylate, tri-sec-butylsilyl (meth)acrylate, triisobutylsilyl (meth)acrylate, sec-butylmethylsilyl (meth)acrylate, sec-butyldimethylsilyl (meth)acrylate, dimethylpropylsilyl (meth)acrylate, monomethyldipropylsilyl (meth)acrylate, and methylethylpropylsilyl (meth)acrylate; the acrylic unsaturated monomer (b1) represented by the formula (II-a) is at least one monomer selected from the group consisting of N-methylol acrylamide, N-methoxymethyl acrylamide, N-ethoxymethyl acrylamide, N,N-dimethylaminopropyl acrylamide, N,N-dimethylaminopropyl methacrylamide and diacetone acrylamide; and the unsaturated monomer (c1) is at least one monomer selected from the group consisting of (meth)acrylic esters, styrenes, vinyl esters, itaconic esters, fumaric esters and maleic esters.

* * * * *